(12) United States Patent
Arai et al.

(10) Patent No.: US 9,426,314 B2
(45) Date of Patent: Aug. 23, 2016

(54) IMAGE PROCESSING APPARATUS, IMAGE FORMING SYSTEM, AND IMAGE FORMING APPARATUS FOR CORRECTING PIXEL DENSITY

(71) Applicant: FUJI XEROX CO., LTD., Tokyo (JP)

(72) Inventors: Shigeru Arai, Kanagawa (JP); Masaomi Sakamoto, Kanagawa (JP); Tomoshi Hara, Kanagawa (JP); Masahiko Kubo, Kanagawa (JP); Nobukazu Takahashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/634,963

(22) Filed: Mar. 2, 2015

(65) Prior Publication Data
US 2015/0264190 A1 Sep. 17, 2015

(30) Foreign Application Priority Data
Mar. 14, 2014 (JP) .................. 2014-052512

(51) Int. Cl.
*H04N 1/00* (2006.01)
*G06T 5/00* (2006.01)
*H04N 1/409* (2006.01)

(52) U.S. Cl.
CPC .............. *H04N 1/001* (2013.01); *G06T 5/001* (2013.01); *H04N 1/4092* (2013.01)

(58) Field of Classification Search
None
See application file for complete search history.

(56) References Cited

U.S. PATENT DOCUMENTS

| 6,044,204 | A | 3/2000 | Takamatsu et al. |
| 7,224,481 | B2 * | 5/2007 | Tsuji ........... H04N 1/506 358/1.16 |
| 2012/0099165 | A1 * | 4/2012 | Omori ........... G03G 15/5058 358/475 |

FOREIGN PATENT DOCUMENTS

| JP | 3832519 B2 | 10/2006 |
| JP | 3832521 B2 | 10/2006 |

* cited by examiner

*Primary Examiner* — Thomas D Lee
(74) *Attorney, Agent, or Firm* — Sughrue Mion, PLLC

(57) ABSTRACT

Provided is an image processing apparatus including an acquisition unit that acquires first image information which is image information configured of plural pixels and which includes density information for each pixel, a first correction unit that corrects pixel density based on the first image information, a storage unit that stores image information obtained after the first correction unit performs the correction as second image information, a second correction unit that performs a reverse correction so as to cancel the correction by the first correction unit based on density of a pixel of the second image information, a display unit that displays an image on a display section based on third image information which is image information obtained after the second correction unit performs the reverse correction, and a transmission unit that transmits the second image information to an image forming apparatus.

6 Claims, 35 Drawing Sheets

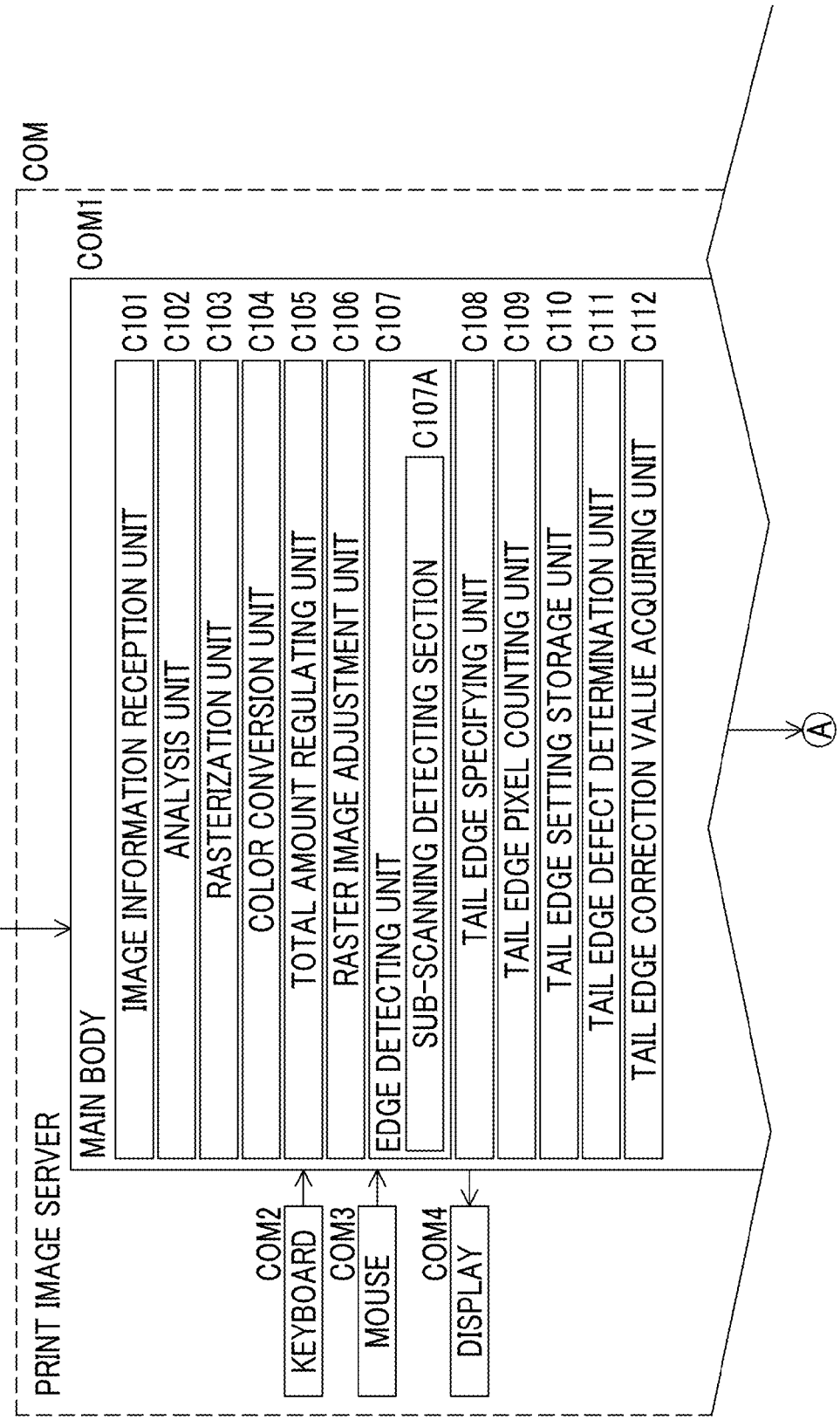

(FIG. 5 Continued)

- C122 RANDOM NUMBER GENERATING UNIT
- C123 RANDOM NUMBER CORRECTION VALUE ACQUIRING UNIT
- C124 CORRECTION UNIT
- C125 POST-CORRECTION STORAGE UNIT
- C126 PREVIEW DETERMINATION UNIT
- C127 PRINT-START DETERMINATION UNIT
- C128 TONE CORRECTING UNIT
- C129 TRANSMISSION UNIT
- C130 PREVIEW PROCESSING UNIT
  - C130A IMAGE INFORMATION ACQUIRING SECTION
  - C130B REVERSE CORRECTION VALUE ACQUIRING SECTION
  - C130C REVERSE CORRECTION SECTION
  - C130D PREVIEW DISPLAY SECTION

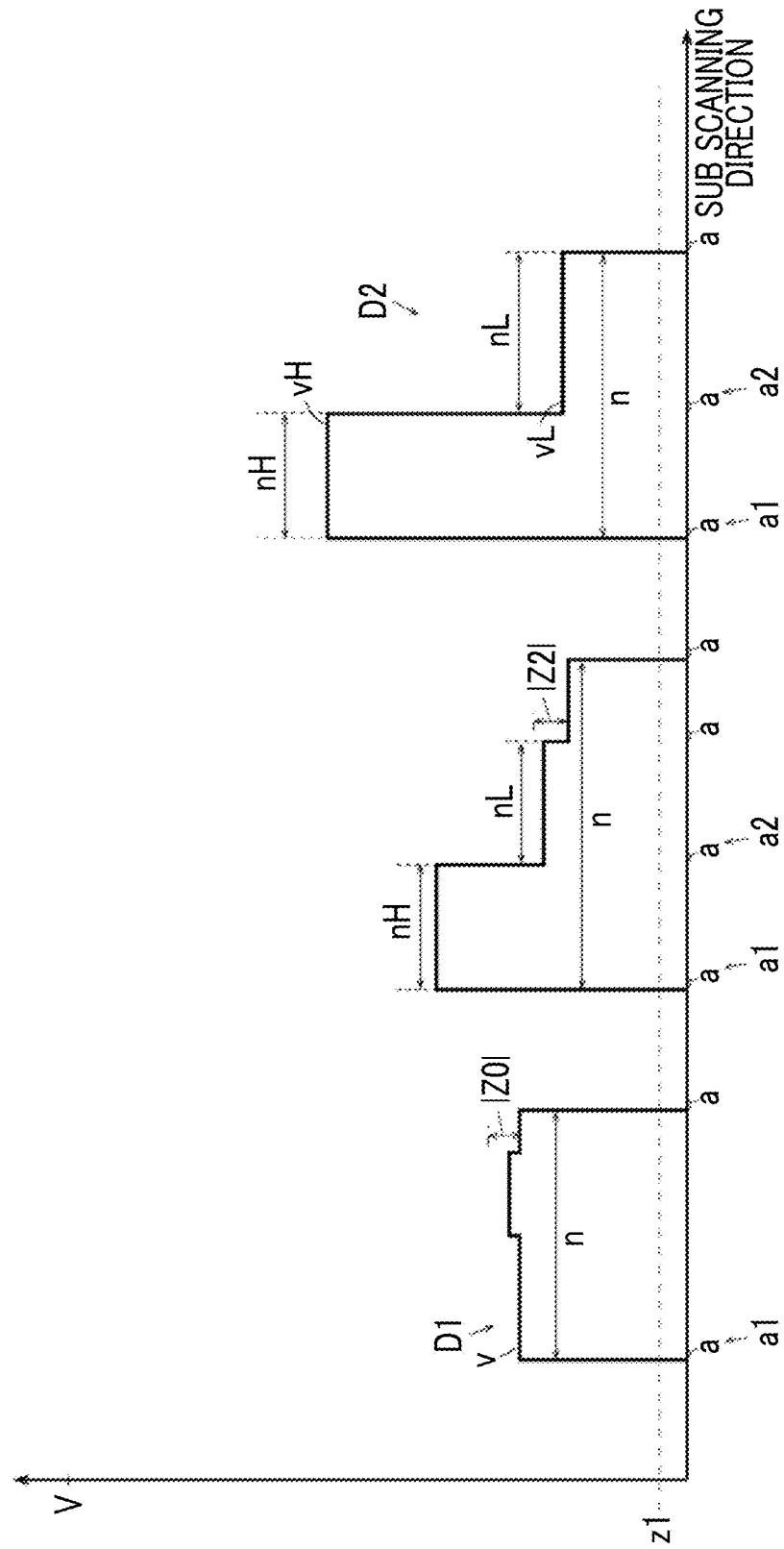

| NOTABLE-PIXEL DENSITY[%] | NOTABLE-PIXEL DENSITY[*/255] | SUPERIMPOSED Bit NUMBER | RANDOM NUMBER ADDITION RANGE |
|---|---|---|---|
| 0 TO 25 | 0 TO 63 | 2bit | -2 TO 1 |
| 25 TO 50 | 64 TO 127 | 3bit | -4 TO 3 |
| 50 TO 75 | 128 TO 191 | 4bit | -8 TO 7 |
| 75 TO 100 | 192 TO 255 | 5bit | -16 TO 15 |

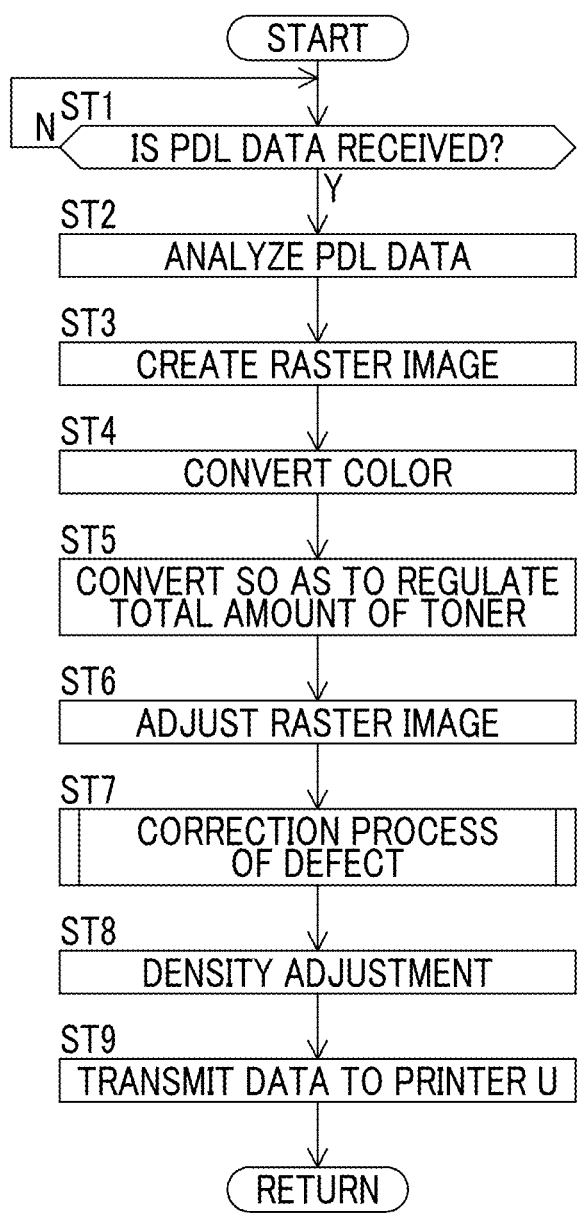

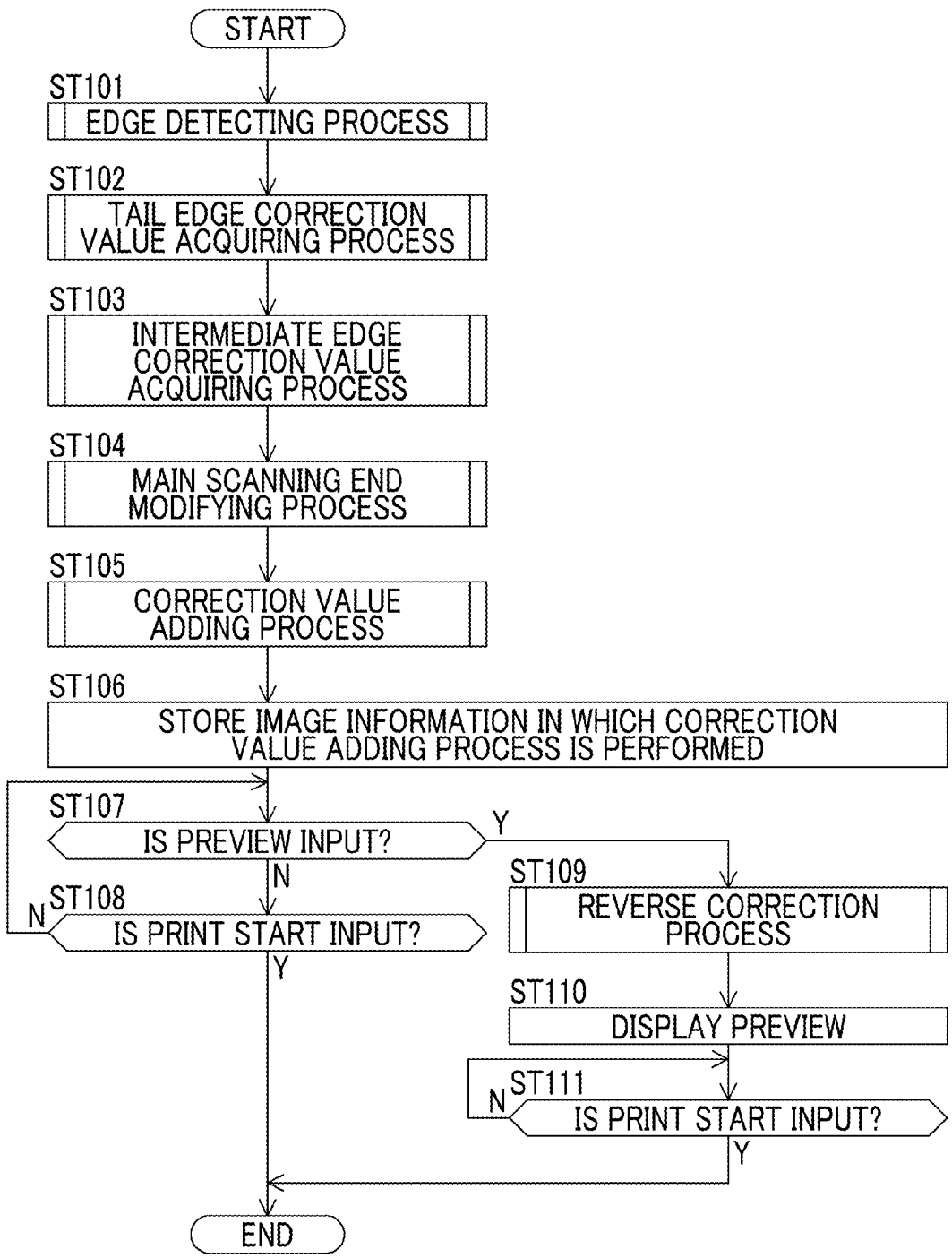

MAIN SCANNING END MODIFYING PROCESS

MAIN SCANNING END MODIFYING PROCESS (CONTINUED)

REVERSE CORRECTION PROCESS

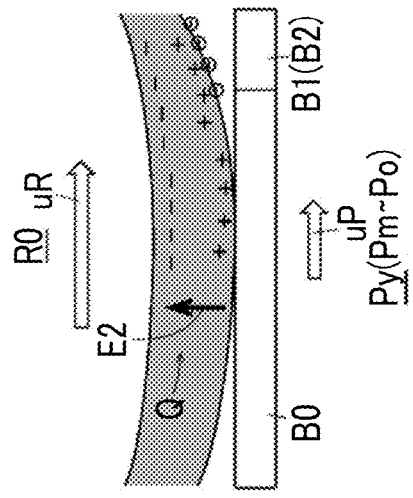
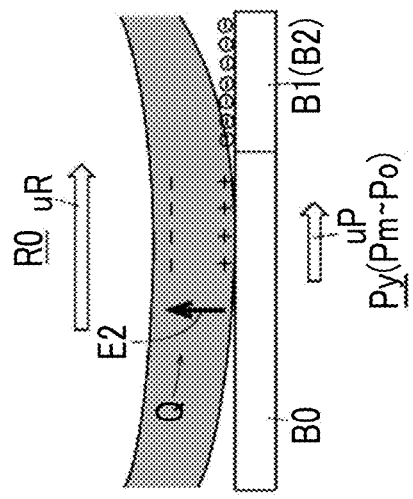
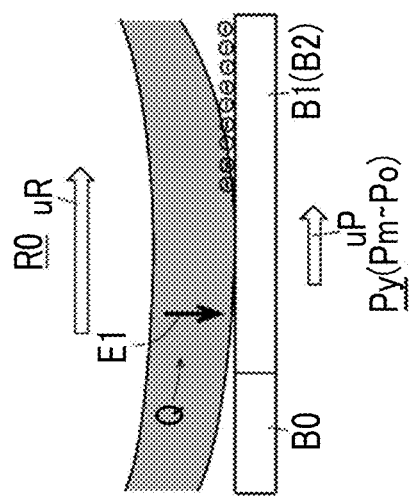

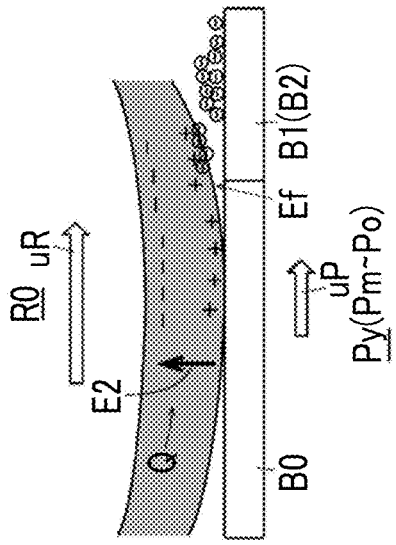
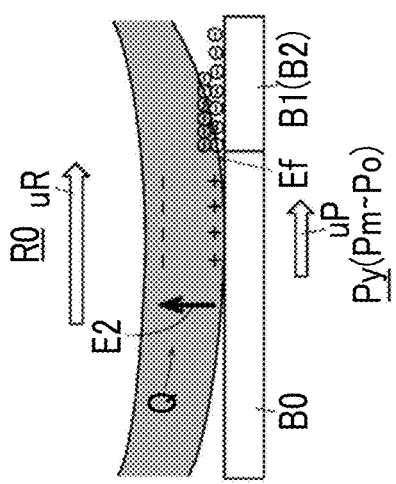
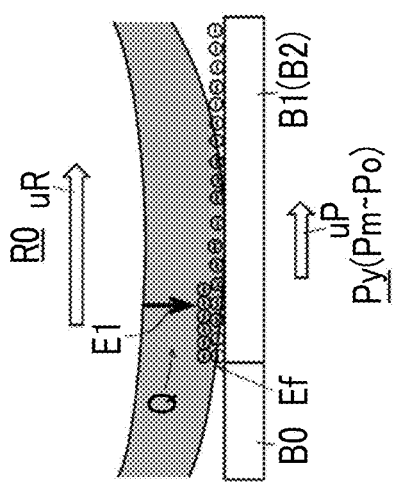

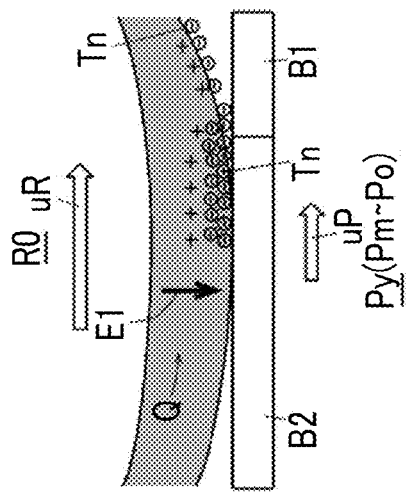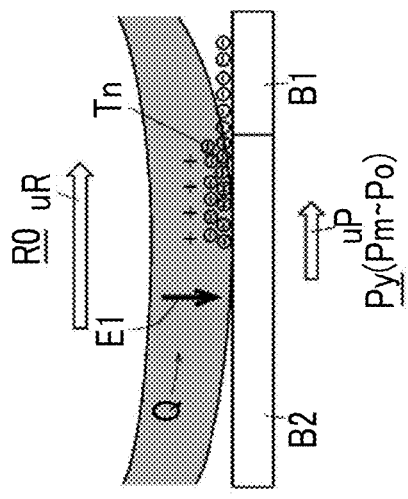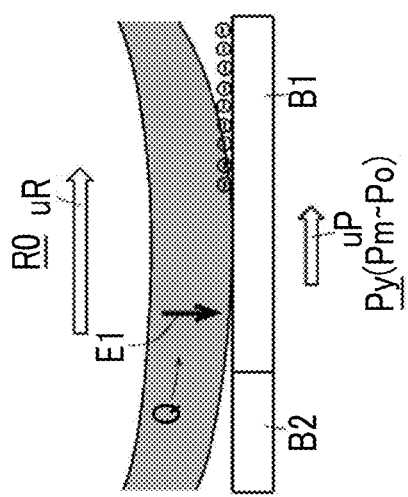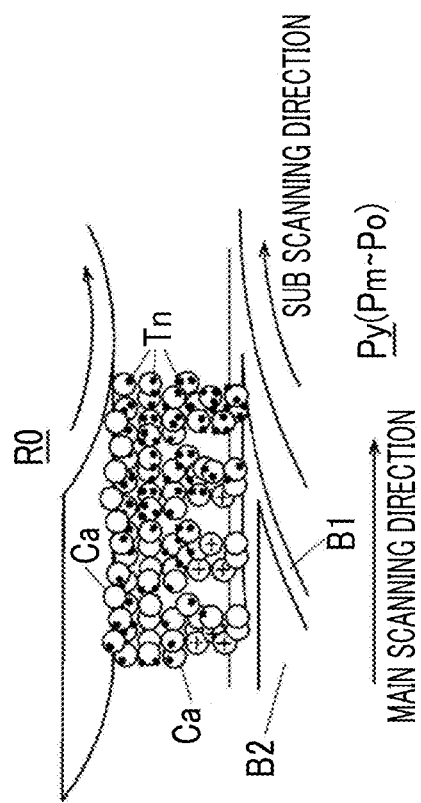

IMAGE PROCESSING APPARATUS, IMAGE FORMING SYSTEM, AND IMAGE FORMING APPARATUS FOR CORRECTING PIXEL DENSITY

CROSS-REFERENCE TO RELATED APPLICATIONS

This application is based on and claims priority under 35 USC 119 from Japanese Patent Application No. 2014-052512 filed Mar. 14, 2014.

BACKGROUND (i) Technical Field

The present invention relates to an image processing apparatus, an image forming system, and an image forming apparatus.

(ii) Related Art

In the related art, in an image forming apparatus, a control signal for each member that writes an image is generated based on image information read by a reading member or image information transmitted from an image processing apparatus.

SUMMARY

According to an aspect of the invention, there is provided an image processing apparatus including:

an acquisition unit that acquires first image information which is image information configured of plural pixels and which includes density information for each pixel;

a first correction unit that corrects pixel density based on the first image information such that no image failure due to developing failure occurs;

a storage unit that stores image information obtained after the first correction unit performs the correction as second image information;

a second correction unit that performs a reverse correction so as to cancel the correction by the first correction unit based on density of a pixel of the second image information in a state in which the first image information is removed;

a display unit that displays an image on a display section based on third image information which is image information obtained after the second correction unit performs the reverse correction; and a transmission unit that transmits the second image information to an image forming apparatus.

BRIEF DESCRIPTION OF THE DRAWINGS

Exemplary embodiments of the present invention will be described in detail based on the following figures, wherein:

FIG. 7 is a diagram illustrating an example of a pixel value of a pixel in a sub scanning direction;

FIG. 8A is a graph illustrating an example of a relationship between a pixel value of a tail edge and the lower limit number of target pixels, FIG. 8B is a graph illustrating an example of a relationship between the pixel value of the tail edge and a correction value of the tail edge, and FIG. 8C is a graph illustrating an example of a relationship between the number of pixels from the tail edge and the correction value;

FIG. 9A is a graph illustrating an example of a relationship between a pixel value of an intermediate edge and the number of target pixels, FIG. 9B is a graph illustrating an example of a relationship between the pixel value of the intermediate edge and a correction value of the intermediate edge, and FIG. 9C is a graph illustrating an example of a relationship between the number of pixels from the intermediate edge and the correction value;

FIG. 10A is a view illustrating setting of a notable pixel and neighboring pixels, FIG. 10B is a view illustrating an example of processing target image information, and FIG. 10C is a view illustrating an example of processing target image information different from FIG. 10B;

FIG. 11A is a graph illustrating Example 1 of the invention, FIG. 11B is a graph illustrating a modification example with respect to Example 1, FIG. 11C is a graph illustrating another modification example different from FIG. 11B with respect to Example 1, and FIG. 11D is a graph illustrating still another modification example different from FIGS. 11B and 11C with respect to Example 1;

FIG. 12A is a diagram illustrating the random number generation, and FIG. 12B is a diagram illustrating a random number and a random number correction value;

FIG. 13 is a flowchart of a main process according to Example 1;

FIG. 14 is a flowchart of a defect correction process according to Example 1, and of a subroutine of ST7 in FIG. 13;

FIG. 23A is a diagram illustrating an example of a pixel value before correction of the tail edge in the sub scanning direction, FIG. 23B is a diagram illustrating an example of a correction value of the tail edge in the sub scanning direction, FIG. 23C is a diagram illustrating an example of a random number correction value of the tail edge in the sub scanning direction, FIG. 23D is a diagram illustrating an example of a pixel value after correction of the tail edge in the sub scanning direction, FIG. 23E is a diagram illustrating an example of a pixel value before correction of the tail edge in the main scanning direction, FIG. 23F is a diagram illustrating an example of a correction value of the tail edge in the main scanning direction, FIG. 23G is a diagram illustrating an example of a random number correction value of the tail edge in the main scanning direction, and FIG. 23H is a diagram illustrating an example of a pixel value after correction of the tail edge in the main scanning direction;

FIG. 24A is a diagram illustrating an example of a pixel value before correction of the intermediate edge in the sub scanning direction, FIG. 24B is a diagram illustrating an example of a correction value of the intermediate edge in the sub scanning direction, FIG. 24C is a diagram illustrating a random number correction value of the intermediate edge in the sub scanning direction, FIG. 24D is a diagram illustrating an example of a pixel value after correction of the intermediate edge in the sub scanning direction, FIG. 24E is a diagram illustrating an example of a pixel value before correction of the intermediate edge in the main scanning direction, FIG. 24F is a diagram illustrating an example of a correction value of the intermediate edge in the main scanning direction, FIG. 24G is a diagram illustrating a random number correction value of the intermediate edge in the main scanning direction, and FIG. 24H is a diagram illustrating an example of a pixel value after correction of the intermediate edge in the main scanning direction;

FIG. 25A is a diagram illustrating a fringe electric field, and FIG. 25B is a diagram illustrating a movement of toner;

FIGS. 26A to 26C are diagrams illustrating an example of developing failure occurred on the boundary, FIG. 26A is a diagram illustrating a developing region of a case where a tail edge is formed, FIG. 26B is a diagram illustrating a state in which a developing roll and a photosensitive drum rotate from the state in FIG. 26A, and FIG. 26C is a diagram illustrating a state in which the developing roll and the photosensitive drum rotate from the state in FIG. 26B;

FIG. 27A is a view illustrating the developing region when viewed from a cross section direction, and FIG. 27B is a view illustrating a tail edge of an image section;

FIGS. 28A to 28C are views illustrating an example of developing failure occurred on the boundary, FIG. 28A is a diagram illustrating a developing region of a case where a tail edge is formed, FIG. 28B is a diagram illustrating a state in which the developing roll and the photosensitive drum rotate from the state in FIG. 28A, and FIG. 28C is a diagram illustrating a state in which the developing roll and the photosensitive drum rotate from a state in FIG. 28B;

FIG. 29A is a view illustrating image data before correction of a defect is performed, FIG. 29B is a view illustrating image data of a case where a tail edge correction according to Example 1 is performed on the image data in FIG. 29A and then image recording is performed, FIG. 29C is a view illustrating image data of a case where the correction of the related art is performed on the image data in FIG. 29A and then image recording is performed, and FIG. 29D is a view illustrating image data of a case where image recording is performed without correction of the image data in FIG. 29A;

FIG. 30A is a graph of a case where brightness of a medium is measured in a case where an image is recorded without correction, FIG. 30B is a graph illustrating a correction value on the image of FIG. 30A, and FIG. 30C is a graph illustrating a brightness measurement value of the image on a medium in a case where the image is corrected and recorded;

FIGS. 31A to 31D are diagrams illustrating an example of developing failure occurred on the boundary, FIG. 31A is a diagram illustrating a developing region of a case where an intermediate edge is formed, FIG. 31B is a diagram illustrating a state in which the developing roll and the photosensitive drum rotate from the state in FIG. 31A, FIG. 31C is a diagram illustrating a state in which the developing roll and the photosensitive drum rotate from a state in FIG. 31B, and FIG. 31D is a perspective diagram illustrating the developing region when viewed from the upstream side in the sub scanning direction;

FIG. 32A is a view illustrating image data before correction of a defect is performed, FIG. 32B is a view illustrating image data of a case where an intermediate edge correction according to Example 1 is performed on the uncorrected image data, FIG. 32C is a view illustrating image data of a case where correction of the related art is performed on the uncorrected image data, FIG. 32D is a view illustrating a case where image recording is performed based on the image data in FIG. 32A, FIG. 32E is a view illustrating a case where image recording is performed based on the image data in FIG. 32B, and FIG. 32F is a view illustrating a case where the image data in FIG. 32C is recorded; FIG. 33A is a graph illustrating a function evaluation of the tail edge in a defect region, and FIG. 33B is a graph illustrating a function evaluation of the intermediate edge in the defect region.

DETAILED DESCRIPTION

Figure 1:
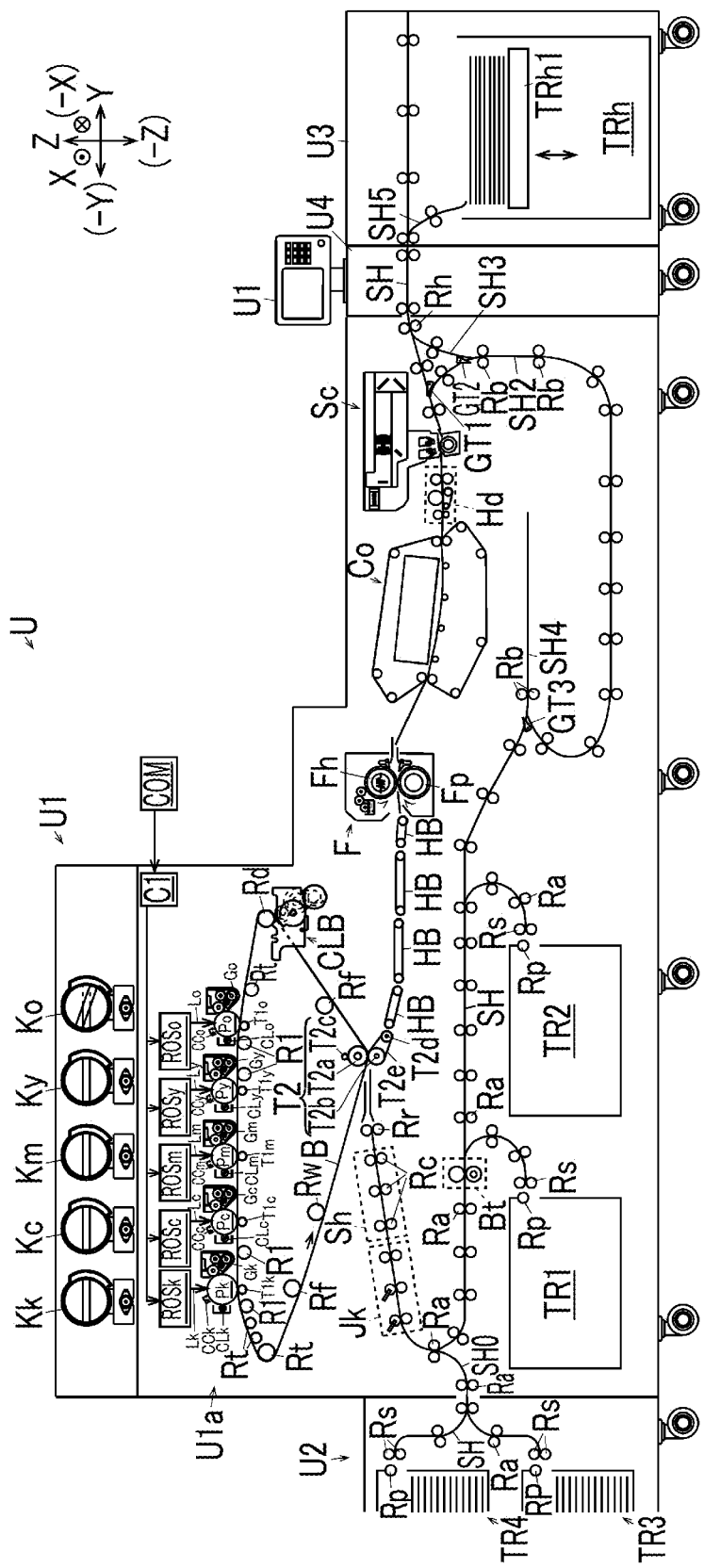
FIG. 1 is a view illustrating an entire image forming apparatus according to Example 1 of the invention.

Next, a specific example (hereinafter, described as Example) of an exemplary embodiment of the invention will be described with reference to the drawings; however, the invention is not limited to the following example.

In order to facilitate easy understanding of the following description, in the drawings, a front-rear direction is an X axis direction, a horizontal direction is a Y axis direction, and a vertical direction is a Z axis direction, and directions or sides represented by arrows X, −X, Y, −Y, Z, −Z are forward, rearward, rightward, leftward, upward, and downward, or the front side, the rear side, the right side, the left side, the upper side, and the lower side.

In addition, in the drawings, "O" with "•" therein means an arrow directing from the back to the front of a paper surface, and "O" with "x" therein means an arrow directing from the front to the back of the paper surface.

In a description with respect to the following drawings, members other than necessary members are appropriately omitted in order to facilitate easy understanding.

Example 1

Description of Entire Configuration of Printer U According to Example 1

FIG. 1 is a view illustrating an entire image forming apparatus according to Example 1 of the invention.

Figure 2:
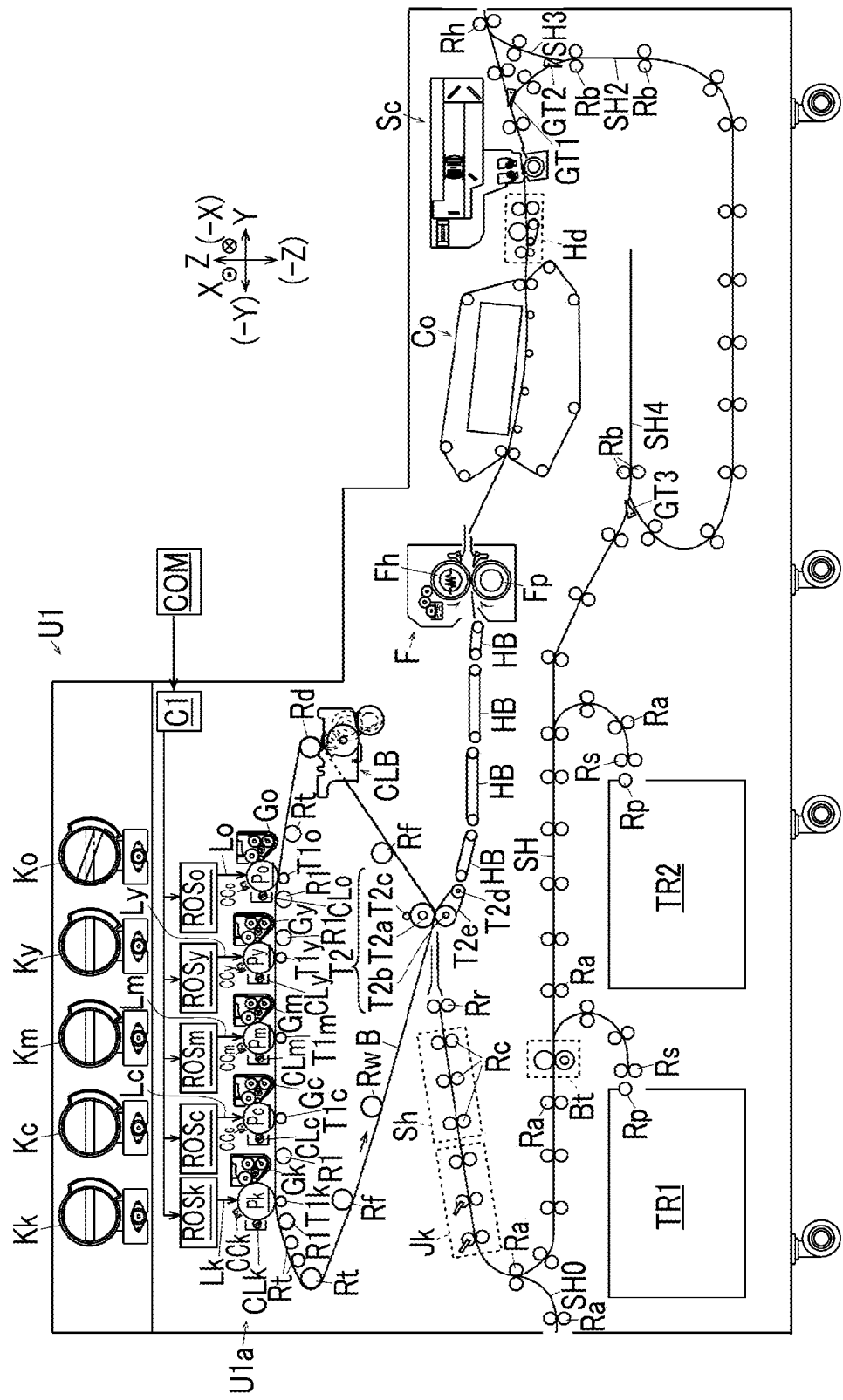
FIG. 2 is a view illustrating principal components of the image forming apparatus according to Example 1 of the invention.

FIG. 2 is a view illustrating principal components of the image forming apparatus according to Example 1 of the invention.

In FIGS. 1 and 2, a printer U as an example of the image forming apparatus according to Example 1 includes a printer main body U1, a feeder unit U2 as an example of a supply device that supplies a medium to the printer main body U1, a discharge unit U3 as an example of a discharge device through which the medium on which an image is recorded is discharged, an interface module U4 as an example of a connection unit that connects between the main body U1 and the discharge unit U3 and an operation unit UI through which a user performs operation.

Description of Configuration of Marking According to Example 1

In FIGS. 1 and 2, the printer main body U1 includes a controller C1 that performs control of the printer U, a communication unit (not illustrated) which receives image information transmitted from a print image server COM as an example of an information transmission device connected to an external device outside of the printer U through a dedicated cable (not illustrated), a marking section U1a as an example of an image recording unit that records an image on a medium, and the like. A personal computer PC as an example of an image transmission device is connected to the print image server COM through a line such as cable or LAN: Local Area network and image information which is printed by the printer U is transmitted.

The marking section U1a includes photosensitive drums Py, Pm, Pc, and Pk for each color of Y: yellow, M: magenta, C: cyan, K: black as an example of an image holder, and a photosensitive drum Po for making the image glossy in a case where a photo-image or the like is printed. The photosensitive drums Py to Po have a surface which is configured of a photosensitive dielectric.

In FIGS. 1 and 2, around the black photosensitive drum Pk, a charging device CCk, an exposure device ROSk as an example of a latent image forming device, developing device Gk, a primary transferring roll T1k as an example of a primary transferring device, and a photosensitive drum cleaner CLk as an example of a cleaner for an image holder are disposed along a rotation direction of the photosensitive drum Pk.

Similarly, around the other photosensitive drums Py, Pm, Pc, and Po, charging devices CCy, CCm, CCc, and CCo, exposure devices ROSy, ROSm, ROSc, and ROSo, developing devices Gy, Gm, Gc, and Go, primary transferring rolls T1y, T1m, T1c, and T1o, and photosensitive drum cleaners CLy, CLm, CLc, and CLo are disposed.

Inside the marking section U1a, as an example of a container, toner cartridges Ky, Kc, Km, Kk, and Ko in which developer that is fed to the developing devices Gy to Go is contained are supported attachably and detachably.

Below the photosensitive drums Py to Po, as an example of an intermediate transferring member, an intermediate transferring belt B is disposed as an example of an image holder and the intermediate transferring belt B is nipped between the photosensitive drums Py to Po and the primary transferring rolls T1y to T1o. The back surface of the intermediate transferring belt B is supported by a drive roll Rd as an example of a drive member, a tension roll Rt as an example of a tension applying member, walk roller Rw as an example of a belt walk prevention member, plural idler rolls Rf as an example of a driven member, a backup roll T2a as an example of a facing member for secondary transferring, plural retract rolls R1 as an example of a moving member, and the primary transferring rolls T1y to T1o.

On the surface of the intermediate transferring belt B, a belt cleaner CLB as an example of a cleaner of an intermediate transferring member is disposed in the vicinity of the drive roll Rd.

The backup roll T2a is disposed to face a secondary transferring roll T2b as an example of a secondary transferring member and the intermediate transferring belt B is nipped therebetween. In addition, a contact roll T2c as an example of a contact member is in contact with the backup roll T2a so as to apply a voltage having a polarity opposite to a charging polarity of the developer to the backup roll T2a. A transport belt T2e as an example of a transport member is stretched over the secondary transferring roll T2b according to Example 1 and the drive roll T2d as an example of a drive member disposed on the lower right side.

A secondary transferring device T2 according to Example 1 is configured to include the backup roll T2a, the secondary transferring roll T2b, and the contact roll T2c and the transferring devices T1, B, and T2 according to Example 1 are configured to include the primary transferring rolls T1y to T1o, the intermediate transferring belt B, the secondary transferring device T2, and the like.

Below the secondary transferring device T2, paper feed trays TR1 and TR2 are provided as an example of an storage unit in which a recording sheet S is stored as an example of a medium. On the upper oblique-right side of the paper feed trays TR1 and TR2, a pick-up roll Rp as an example of an extracting member and a pick-out roll Rs as an example of a pick-out member are disposed. A transport path SH through which the recording sheet S is transported extends from the pick-out roll Rs and plural transport rolls Ra are disposed along the transport path SH as an example of a transport member which transports a recording sheet S to the downstream side.

On the downstream side in a transport direction of the recording sheet S from a position where the transport paths SH from the two paper feed trays TR1 and TR2 are joined together, a deburring device Bt as an example of a unnecessary parts removing device is disposed. The deburring device Bt nips the recording sheet S using a preset pressure and transports the recording sheet S to the downstream side and performs removing of unnecessary parts from the edge of the recording sheet S, that is, deburring.

On the downstream side from the deburring device Bt, a detection device Jk is disposed so as to measure a thickness of the passed recording sheet S and to detect whether the plural recording sheets S are stacked, that is, multi-sheet feeding.

On the downstream side from the multi-sheet feeding detection device Jk, as an example of a posture correction device, a correction roll Rc that corrects inclination of the recording sheet S with respect to the transport direction, that is, skew, is disposed. On the downstream side from the correction roll Rc, a registration roll Rr is disposed as an example of an adjustment member that adjusts transport time of the recording sheet S to the secondary transferring device T2.

Similar to the paper feed trays TR1 and TR2, the pick-up roll Rp, the pick-out roll Rs, and the transport rolls Ra, paper feed trays TR3 and TR4 or like are provided in the feeder unit U2 and transport paths SH from the paper feed trays TR3 and TR4 are joined to the transport path SH of the printer main body U1 on the upstream side from the multi-sheet feeding detection device Jk.

Plural transport belts HB that retains the recording sheet S on the surface thereof and transports the recording sheet S to the downstream side are disposed on the downstream side in the transport direction of the recording sheet S from the transport belt T2e.

A fixing device F is disposed on the downstream side in the transport direction of the recording sheet S from the transport belts HB.

A cooler Co that cools the recording sheet S is disposed on the downstream side of the fixing device F.

On the downstream side from the cooler Co, a decurler Hd that applies pressure to the recording sheet S and corrects bending, that is, curling of the recording sheet S, is disposed.

On the downstream side from the decurler Hd, an image reading device Sc that reads an image recorded on the recording sheet S is disposed.

On the downstream side from the image reading device Sc, a reverse path SH2 is formed as an example of a transport path that is formed where the transport path SH that extends toward the interface module U4 branches. In the branch section of the reverse path SH2, a first gate GT1 is disposed as an example of a switching member of the transport direction.

Plural switch-back rolls Rb as an example of a transport member that may rotate forward and reversely are disposed on the reverse path SH2. On the upstream side from the switch-back rolls Rb, a connection path SH3 is formed as an example of a transport path which starts from a branch position from the upstream section of the reverse path SH2 and is joined to the transport path SH on the downstream side from the branch section of the reverse path SH2 from the transport path SH. In the branch section of the connection path SH3 from the reverse path SH2, a second gate GT2 is disposed as an example of a switching member of the transport direction.

On the downstream side from the reverse path SH2, a turn-back path SH4 for reversing the transport direction of the recording sheet S, that is, switching-back, is disposed below the cooler Co.

On the turn-back path SH4, a switch-back roll Rb is disposed as an example of a transport member that may rotate forward and reversely. In addition, at the entrance of the turn-back path SH4, a third gate GT3 is disposed as an example of a switching member of the transport direction.

The transport path SH on the downstream side from the turn-back path SH4 is joined to the transport path SH of the paper feed trays TR1 and TR2.

A transport path SH that extends toward the discharge unit U3 is formed in the interface module U4.

In the discharge unit U3, a stacker tray TRh is disposed as an example of a stacking container in which the discharged recording sheets S are stacked and a discharge path SH5 that starts from a branch position from the transport path SH and extends to the stacker tray TRh is disposed. The transport path SH according to Example 1 is configured to be able to transport the recording sheet S with respect to an added device in a case where an additional discharge unit or a post-processing device (not illustrated) is added and is mounted on the right side of the discharge unit U3.

Operation of Marking

When image information transmitted from a personal computer PC is received in the printer U through the print image server COM, a job that is an image forming operation is started. When the job is started, the photosensitive drums Py to Po, the intermediate transferring belt B, or the like rotate.

The photosensitive drums Py to Po rotate and are driven by a drive source (not illustrated).

The charging devices CCy to CCo are applied with a preset voltage and charge the surfaces of the photosensitive drums Py to Po.

The exposure devices ROSy to ROSo output laser beams Ly, Lm, Lc, Lk, and Lo as an example of a light beam to write a latent image in accordance with a control signal from the controller C and write an electrostatic latent image on the charged surfaces of the photosensitive drums Py to Po.

The developing devices Gy to Go develop the electrostatic latent image on the surfaces of the photosensitive drums Py to Po into visible images.

The toner cartridges Ky to Ko performs feeding of the developer consumed for developing by the developing devices Gy to Go.

The primary transferring rolls T1y to T1o are applied with a primary transferring voltage having a polarity opposite to a charging polarity of the developer and transfer the visible image on the surfaces of the photosensitive drums Py to Po onto the surface of the intermediate transferring belt B.

The photosensitive drum cleaners CLy to CLo remove developer remaining on the surfaces of the photosensitive drums Py to Po after the primary transferring and performs cleaning.

The intermediate transferring belt B, on which images are transferred and stacked in the order of O, Y, M, C, and K when passing through the primary transferring region that faces the photosensitive drums Py to Po, passes through a secondary transferring region Q4 that faces the secondary transferring device T2. In a case of a monochromatic image, a single-color image is transferred and is sent to the secondary transferring region Q4.

The pick-up roll Rp sends out a recording sheet S from the paper feed trays TR1 to TR4 from which the recording sheet S is supplied in accordance with a size of the received image information or specifying of the recording sheet S and size, type, or the like of the contained recording sheets S.

The pick-out roll Rs separates and picks out the recording sheets S sent from the pick-up roll Rp one by one.

The deburring device Bt applies the preset pressure to the passing recording sheet S and removes a burr.

The multi-sheet feeding detection device Jk detects a thickness of the passing recording sheet S and detects the multi-sheet feeding of the recording sheets S.

The correction roll Rc causes the passing recording sheet S to come into contact with a wall surface (not illustrated) and corrects the skewing.

The registration roll Rr sends out the recording sheet S in accordance with a time when the image on the surface of the intermediate transferring belt B is sent to the secondary transferring region Q4.

A secondary transferring voltage having the same polarity as the preset charging polarity of the developer is applied to the backup roll T2a through the contact roll T2c and the secondary transferring device T2 transfers the image on the intermediate transfer belt B to the recording sheet S.

The belt cleaner CLB removes developer remaining on the surface of the intermediate transfer belt B after the image is transferred at the secondary transferring region Q4 and performs cleaning.

The transport belts T2e and HB retain the recording sheet S on which the image is transferred by the secondary transferring device T2 on the surfaces thereof and transport the recording sheet S to the downstream side.

The fixing device F includes a heating roll Fh as an example of a heating member and a pressing roll Fp as an example of a pressing member and a heater as an example of a heat source is contained inside the heating roll Fh. The fixing device F presses and heats the recording sheet S passing through a region in which the heating roll Fh and the pressing roll Fp are in contact with each other and fixes an unfixed image onto the surface of the recording sheet S.

The cooler Co cools the recording sheet S heated by the fixing device F.

The decurler Hd applies pressure onto the recording sheet S passed through the cooler Co and removes bending, that is, curling on the recording sheet S.

The image reading device Sc reads the image on the surface of the recording sheet S passed through the decurler Hd.

In a case where duplex printing is performed, the first gate GT1 operates and the recording sheet S passed through the decurler Hd is transported to the reverse path SH2, is switched back at the turn-back path SH4, and is transported back to the registration roll Rr through the transport path SH. Then, printing is performed on the second surface of the recording sheet S.

The recording sheet S discharged to the discharge tray TRh is transported through the transport path SH and is discharged into the stacker tray TRh. At this time, in a case where the recording sheet S is discharged to the stacker tray TRh in a state in which the surface thereof is reversed, the recording sheet S is temporarily transported into the reverse path SH2 from the transport path SH and, after the trailing end of the recording sheet S in the transport direction passes the second gate GT2, the second gate GT2 is switched. Then, the switch-back rolls Rb rotate reversely, and the recording sheet S is transported through the connection path SH3 and is transported to the stacker tray TRh.

The recording sheets S are stacked in the stacker tray TRh and a stacking plate TRh1 automatically rises and goes down such that the uppermost surface matches a preset height depending on a stacked amount of the recording sheets S.

Description of Marking Section U1a According to Example 1

Figure 3:
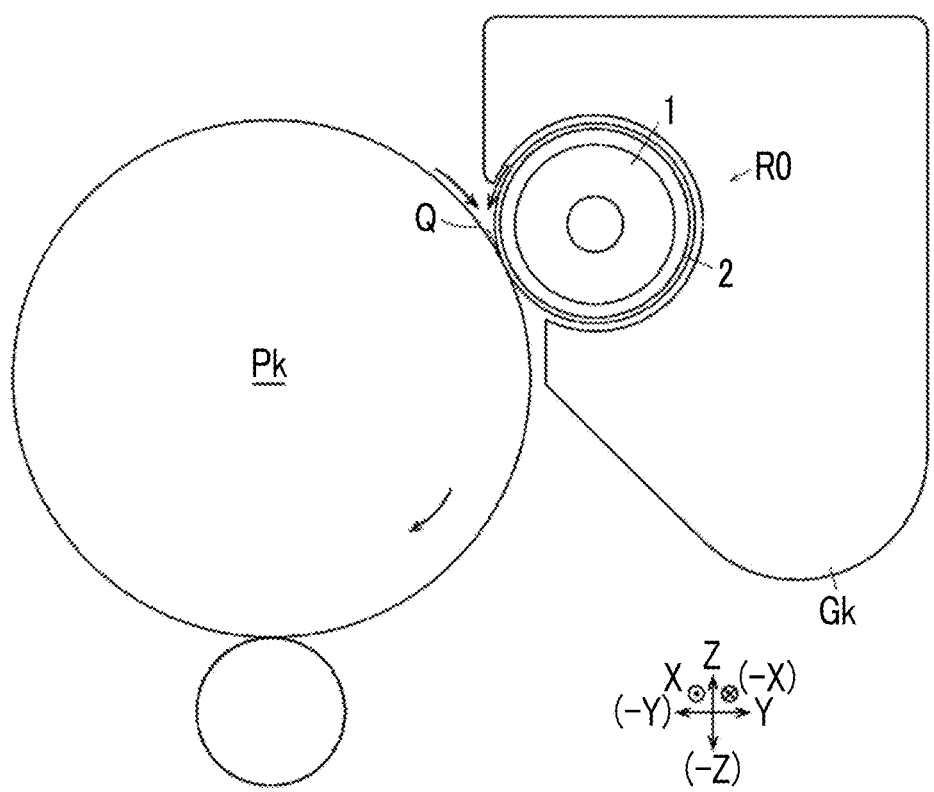
FIG. 3 is an enlarged view illustrating principal components of a marking section according to Example 1 of the invention.

FIG. 3 is an enlarged view illustrating principal components of a marking section according to Example 1 of the invention.

In FIG. 3, the black developing device Gk includes a developing roll R0 as an example of a developer retaining member. The developing roll R0 is disposed to face the photosensitive drum Pk as an example of an image holder. A developing region Q as an example of a facing region is formed between the photosensitive drum Pk and the developing roll R0. The developing roll R0 includes a magnet roll 1 as an example of a magnet member. The magnet roll 1 extends along the photosensitive drum Pk. In addition, the magnet roll 1 is supported in a fixed way. A developing sleeve 2 as an example of a cylindrical member is supported rotatably around the magnet roll 1. The developing sleeve 2 according to Example 1 rotates, as an example, in the same direction as the rotating direction of the photosensitive drum Pk in the developing region Q. In addition, the developing sleeve 2 according to Example 1 is, as an example, set to have a greater surface speed than a surface speed of the photosensitive drum Pk. Accordingly, the developer is promptly supplied easily. According to Example 1, a two-component developer including toner and a carrier is used as an example of a developer. Since the developing devices Gy to Go of the other colors Y, M, C, and O are configured to be the same as the black developing device Gk, the description of the developing devices Gy to Go of the other colors Y, M, C, and O is omitted.

Description of Controller According to Example 1

Figure 4:
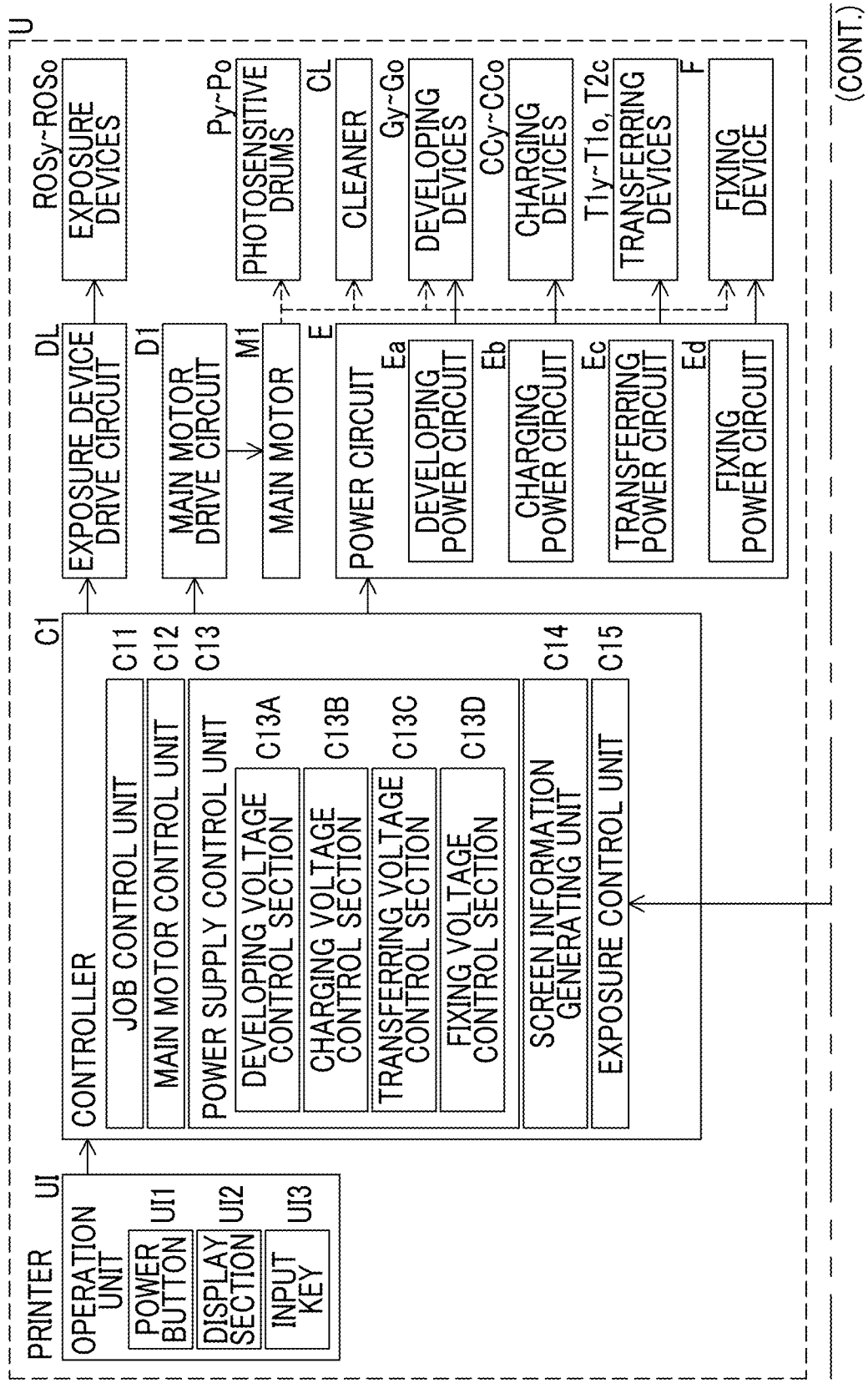
FIG. 4 is a functional block diagram of each function which is provided to a controller of the image forming apparatus and a print image server according to Example 1 of the invention.

FIG. 4 is a diagram illustrating a functional block diagram of each function which is provided to a controller of the image forming apparatus and the print image server according to Example 1 of the invention.

Figure 5:
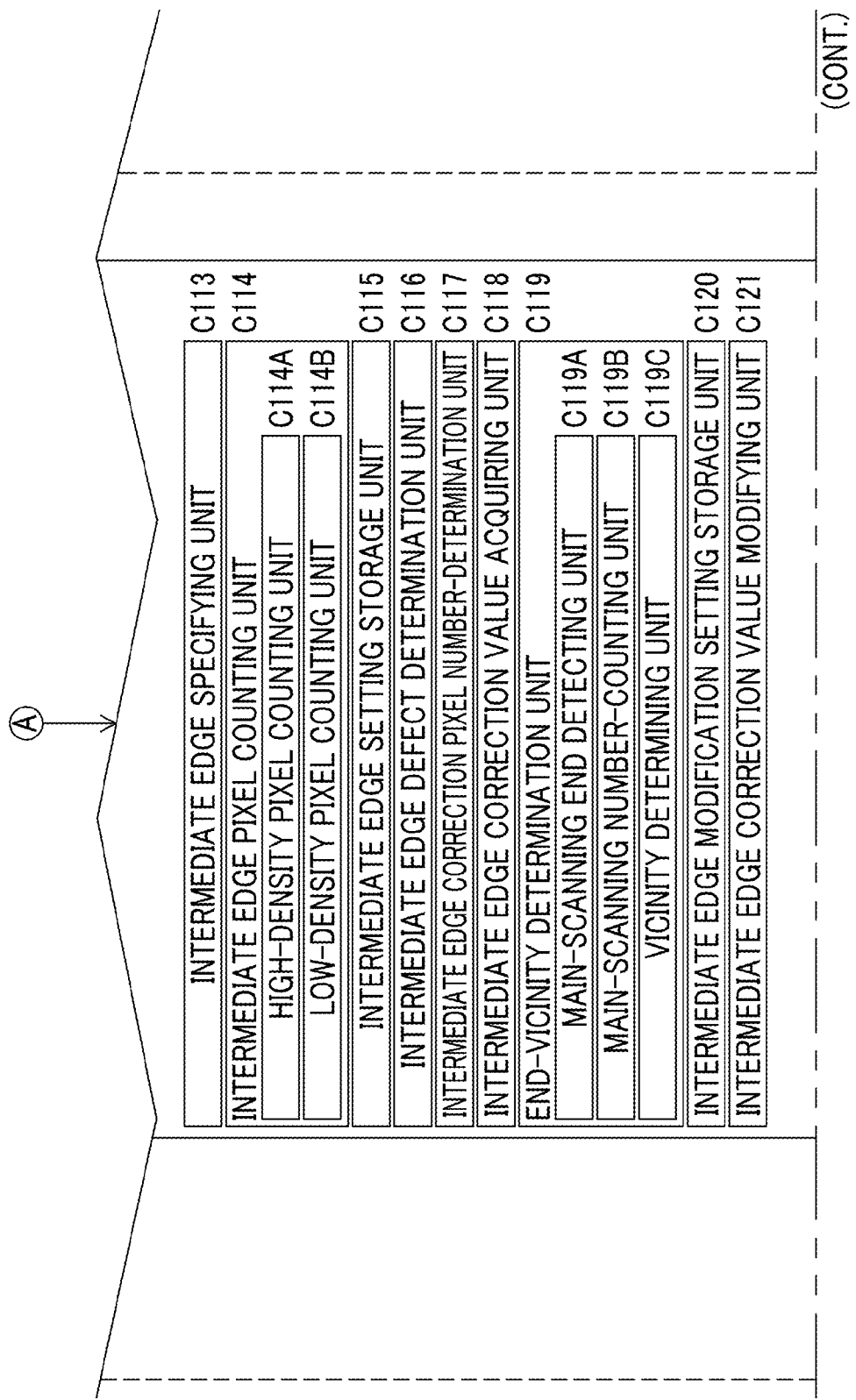
FIG. 5 is a functional block diagram of each function which is provided to the controller of the image forming apparatus and the print image server according to Example 1 of the invention and is continued from FIG. 4.

FIG. 5 is a diagram illustrating a functional block diagram of each function which is provided to the controller of the image forming apparatus and the print image server according to Example 1 of the invention and is continued from FIG. 4.

In FIGS. 4 and 5, the controller C1 of the printer U according to Example 1 is configured of a small-sized image processing apparatus, that is, a microcomputer and includes an I/O that performs input and output of a signal with respect to an external device, regulating an input or output signal level, or the like, a ROM as an example of a storage medium in which a program for executing a required process, data, and the like are stored, a RAM for temporarily storing necessary data, an HDD, a CPU that performs a process according to the program stored in the ROM, the ROM or HDD, or the like, a clock oscillator, and the like. Thus, the execution of the program stored in the ROM or the like makes it possible to realize various functions.

Signal Input Element Connected to Controller

An output signal from a signal output element such as an operation unit UI is input to the controller C1.

The operation unit UI includes a power button UI1 as an example of a power feeding section through which power of the printer U turns on and off, a display section UI2, various input keys UI3 such as an arrow key as an example of a direction input button.

Controlled Element Connected to Controller C1

The controller C1 outputs control signals of the next controlled elements DL, D1, and E.

DL: Exposure Device Drive Circuit

The exposure device drive circuit DL controls the exposure devices ROSy to ROSo so as to form a latent image on the surfaces of the photosensitive drums Py, Pm, Pc, Pk, Po.

D1: Main Motor Drive Circuit

The main motor drive circuit D1 as an example of a drive circuit of a main drive source drives a main motor M1 as an example of the main drive source, thereby driving the photosensitive drums Py to Po or the like to rotate.

E: Power Circuit

The power circuit E includes a developing power circuit Ea, a charging power circuit Eb, a transferring power circuit Ec, a fixing power circuit Ed, and the like.

Ea: Developing Power Circuit

The developing power circuit Ea applies a developing voltage to the developing roll of the developing devices Gy to Go.

Eb: Charging Power Circuit

The charging power circuit Eb applies a charging voltage for charging the surfaces of the photosensitive drums Py to Po to the charging devices CCy to CCo.

Ec: Transferring Power Circuit

The transferring power circuit Ec applies the primary transferring voltage to the primary transferring rolls T1y to T1o and applies the secondary transferring voltage to the contact roll T2c of the secondary transferring device T2.

Ed: Fixing Power Circuit

The fixing power circuit Ed supplies power for heating of the heater to the heating roll Fh of the fixing device F.

Function of Controller C1 of Printer U

The controller C1 of the printer U executes a process according to the input signal from the signal output element and has a function of output of the control signal to the control elements. That is, the controller C1 has the following functions.

C11: Job Control Unit

The job control unit C11 as an example of an image forming control unit controls operations of the photosensitive drums Py to Po, the exposure devices ROSy to ROSo, the charging devices CCy to CCo, the fixing device F, or the like so as to execute a job as an example of the image forming operation.

C12: Main Motor Control Unit

The main motor control unit C12 as an example of a main drive source control unit controls the drive of the main motor M1 through the main motor drive circuit D1 so as to control the drive of the photosensitive drums Py to Po or the developing devices Gy to Go, the heating roll Fh of the fixing device F, the discharge roll Rh, or the like.

C13: Power Supply Control Unit

The power supply control unit C13 includes a developing voltage control section C13A, a charging voltage control section C13B, a transferring voltage control section C13C, and a fixing power control section C13D. The power supply control unit C13 controls the operation of the power circuit E so as to control the voltage or power supply to each member.

C13A: Developing Voltage Control Section

The developing voltage control section C13A controls the developing power circuit Ea so as to control the developing voltage application to the developing devices Gy to Go.

C13B: Charging Voltage Control Section

The charging voltage control section C13B controls the charging power circuit Eb so as to control the charging voltage application to the charging devices CCy to CCo.

C13C: Transferring Voltage Control Section

The transferring voltage control section C13C controls the transferring power circuit Ec so as to control the transferring voltage that is applied to the primary transferring rolls T1y to T1o or the like.

C13D: Fixing Power Control Section

The fixing power control section C13D controls the fixing power circuit Ed and controls ON an OFF of the fixing device F so as to control a fixing temperature.

C14: Screen Information Generating Unit

The screen information generating unit C14 as an example of a unit that generates print information generates screen information that is expanded to binary pixel information, as an example of print information, based on the image information received from the print image server COM.

C15: Exposure Control Unit

The exposure control unit C15 controls the exposure device drive circuit DL based on the screen information so as to drive the exposure devices ROSy to ROSo and to form latent images on the surfaces of the photosensitive drums Py to Po.

Description of Function of Print Image Server COM

In FIGS. 4 and 5, a main body COM1 of the print image server COM according to Example 1 is configured of the image processing apparatus, that is, a personal computer and includes an I/O that performs input and output of a signal with respect to an external device, regulating of an input or output signal level, or the like, a ROM as an example of a storage medium in which a program for executing a required process, data, and the like are stored, a RAM for temporarily storing necessary data, an HDD, a CPU that performs a process according to the program stored in the ROM, the ROM or HDD, or the like, a clock oscillator, and the like. Thus, the execution of the program stored in the ROM or the like makes it possible to realize various functions.

Signal Input Element Connected to Main Body COM1

An output signal from a signal output element such as a keyboard COM2 or a mouse COM3 as an example of an input member is input to the main body COM1 of the print image server COM. In addition, an output signal from the printer U is also input to the main body COM1 according to Example 1.

Controlled Element Connected to Main Body COM1

The main body COM1 of the print image server COM outputs a control signal to a display COM4 as an example of a display section which is a controlled element. In addition, the main body COM1 according to Example 1 outputs a signal to the printer U connected electrically through a power line such as a cable.

Function of Main Body COM1 of Print Image Server COM

C101: Image Information Reception Unit

The image information reception unit C101 receives data of PDL: Page Description language as an example of the image information transmitted from an external personal computer PC.

C102: Analyzing Unit

The analyzing unit C102 analyzes a position, a shape, a color, or the like in a printing target character or image based on the received data of the PDL.

C103: Rasterization Unit

The rasterization unit C103 as an example of an image information acquiring unit and a pixel image generating unit generates a raster image, which is image information configured of plural pixels and which is an example of first image information that includes density information for each pixel, based on the analysis of the data of the PDL. The rasterization unit C103 according to Example 1 generates a raster image for each color of R, G, and B. According to Example 1, a pixel value of the raster image is high such as 8 bits/pixel, that is, a 256-gradation raster image is generated for each pixel.

C104: Color Conversion Unit

The color conversion unit C104 converts an RGB color space into a YMCKO color space corresponding to the colors of the developing devices Gy to Go of the printer U and converts the raster image for each of the RGB colors into a raster image for each of the YMCKO colors. The color conversion unit C104 according to Example 1 performs conversion into a raster image for each of the colors Y to O based on information corresponding to the preset colors.

C105: Total Amount Regulating Unit

The total amount regulating unit C105 as an example of a color conversion unit for regulating a total amount of the developer converts the color such that a total amount of the toner is regulated for each pixel in a case where printing is performed on the recording sheet S. The total amount regulating unit C105 according to Example 1 converts a pixel value of each pixel of the raster image based on the information corresponding to the preset colors such that reproducibility of the colors is not changed. For example, in a case where the Y, M, and C have the same pixel value, the corresponding pixel value is decreased in the Y, M, and C colors and is increased in the K color, which means a so-called under color removal, such that it is possible to regulate the total amount. Since the total amount regulation is performed by a known technique, the description is omitted.

C106: Raster Image Adjustment Unit

The raster image adjustment unit C106 as an example of a pixel image adjustment unit performs a sharpness correction and a γ correction as an example of a pixel image adjustment. Accordingly, a pixel value of a pixel of the raster image is adjusted for each color of the Y to O.

Figure 6:
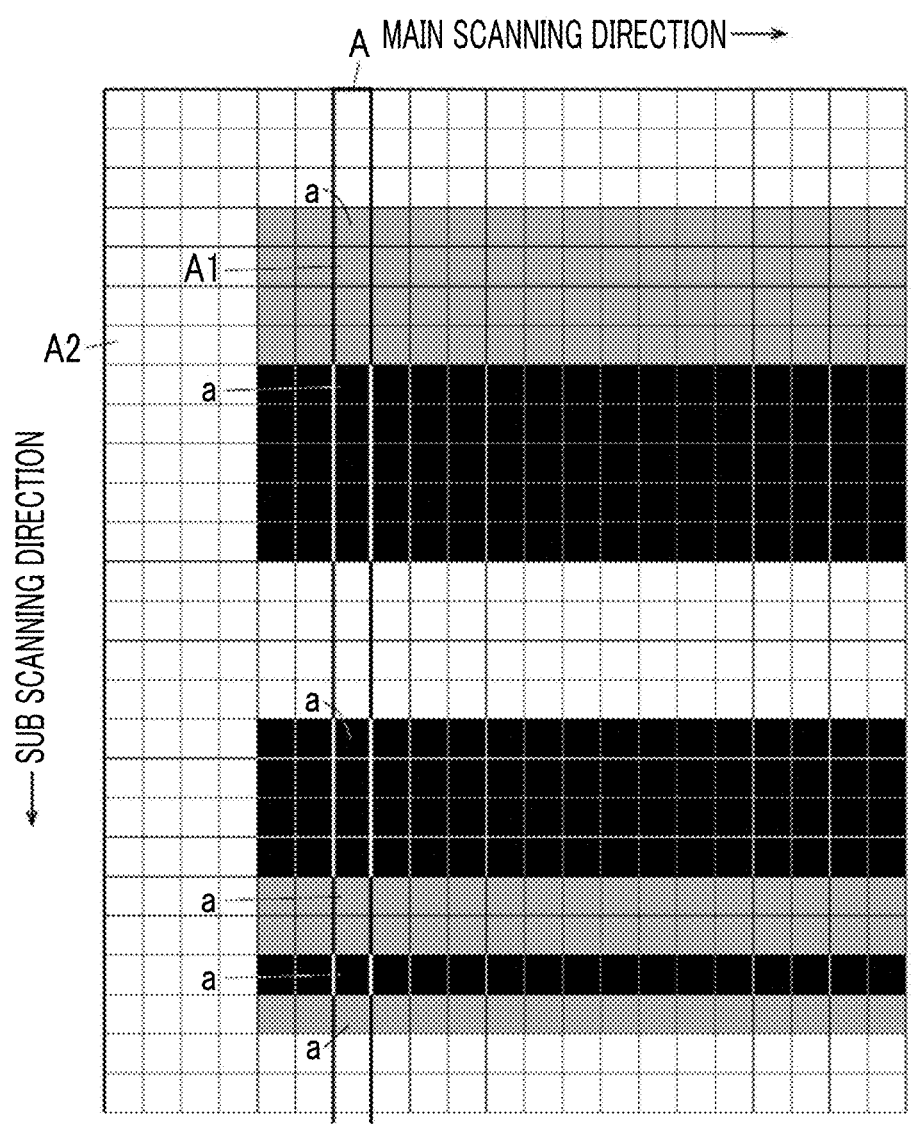
FIG. 6 is a view illustrating an example of a raster image according to Example 1 of the invention.

FIG. 6 is a view illustrating an example of the raster image according to Example 1 of the invention.

FIG. 7 is a diagram illustrating an example of a pixel value of a pixel in a sub scanning direction.

C107: Edge Detecting Unit

The edge detecting unit C107 as an example of a boundary detecting unit includes a sub-scanning detecting section C107A. The edge detecting unit C107 detects a boundary of pixels having different densities from each other. According to Example 1, the edge detecting unit C107 detects a boundary on each raster image of the colors Y to O as an example of the image information based on a pixel value as an example of density information. That is, the edge detecting unit C107 according to Example 1 detects a boundary of a pixel group which has a different density in a pixel group that is configured of plural pixels.

The edge detecting unit C107 and the following units C108 to C124 and sections C130A to C130C perform a process for each color of the colors Y to O. Accordingly, in the units C107 to C124 and sections C130A to C130C, description of only the color Y is provided and description of each color of M, C, K, and O is omitted.

C107A: Sub-Scanning Detecting Section

The sub-scanning detecting section C107A as an example of a boundary detecting unit in the sub scanning direction detects a boundary pixel of a pixel group which has a different density on the raster image in the sub scanning direction corresponding to the rotating direction of the developing roll R0. The detecting section C107A detects a sub-scanning edge a as an example of a boundary pixel in a column of pixels arranged in the sub scanning direction based on whether or not the density is changed to be equal to or higher than a preset density within the preset number of pixels. According to Example 1, two pixels are set as an example of the preset number of pixels. In addition, a threshold value Z0 of the pixel value is set as an example of the preset density. Specifically, in FIGS. 6 and 7, the sub-scanning detecting section C107A performs a process for each sub-scanning pixel column A as an example of a column of pixel arranged in the sub scanning direction.

That is, the detecting section C107A selects a pixel A1 in the sub-scanning pixel column A. The detecting section C107A calculates a difference Δv obtained by subtracting a pixel value v of the pixel A1 from a pixel value v of a pixel A2 that is adjacent to the pixel A1 on the downstream side in the sub scanning direction. The detecting section C107A determines whether or not the size |Δv| of the difference Δv is equal to or higher than the preset threshold value Z0. In a case where the difference |Δv| is equal to or higher than the preset threshold value Z0, the detecting section C107A detects the pixel A2 on the downstream side as a sub-scanning edge a. When the detection is completed on all of the pixels in the sub-scanning pixel column A, the detecting section C107A performs detection on a sub-scanning pixel column A shifted by one pixel in the main scanning direction. Similarly, the detecting section C107A detects the sub-scanning edge a on the entire sub-scanning pixel columns A. The threshold value Z0 according to Example 1 is set to a value with which a boundary between a non-image section and an image section is detectable. According to Example 1, the threshold value Z0 is preset based on a difference between a halftone dot area ratio which is difficult to reproduce in the printer U and the minimum halftone dot area ratio which is reproducible.

C108: Tail Edge Specifying Unit

The tail edge specifying unit C108 is an example of a unit that detects a boundary pixel in the sub scanning direction in which densities of the pixels change from low to high and is an example of a unit that detects a first boundary. The tail edge specifying unit C108 specifies a boundary pixel in the sub scanning direction, in which density changes from a low density of a pixel which is equal to or lower than the preset density to a high density of a pixel which is higher than the low density, in the sub scanning direction based on the raster image. The specifying unit C108 according to Example 1 specifies a sub-scanning edge a as a tail edge a1 at a portion where change occurs from a pixel corresponding to the non-image section as an example of a low-density pixel to a pixel corresponding to the image section as an example of a high-density pixel. Specifically, in FIG. 7, the specifying unit C108 according to Example 1 acquires pixel values v of pixels that are adjacent on the upstream of the sub-scanning edge a in a case where the sub-scanning edge a is detected. The specifying unit C108 determines whether or not the pixel value v on the upstream from the sub-scanning edge a is less than a preset threshold value Z1. The specifying unit C108 specifies the detected sub-scanning edge a as a tail edge a1 in a case where the pixel value v on the upstream from the sub-scanning edge a is less than the threshold value Z1. The threshold value Z1 is set in advance corresponding to a pixel value of which the halftone dot area ratio is difficult to reproduce in the printer U. The sub scanning direction on the raster image according to Example 1 corresponds to the rotating direction of the photosensitive drum Py. Accordingly, in a case where a portion of the tail edge a1 is recorded on the recording sheet S by the printer U, the sub scanning direction corresponds to the tail side with respect to a sheet transporting direction even on the recording sheet S.

C109: Tail Edge Pixel Counting Unit

The tail edge pixel counting unit C109 as an example of a counting unit of a pixel width of the tail edge in the sub scanning direction measures the number n of pixels of the image section on the downstream side in the sub scanning direction with the tail edge a1 as a reference. In FIGS. 6 and 7, in a case where the tail edge a1 is specified, the tail edge pixel counting unit C109 according to Example 1 continues the measurement on the downstream side of the tail edge a1 and measures the number n of the pixels of which the pixel value v is equal to or higher than the threshold value Z1.

Figure 8A:
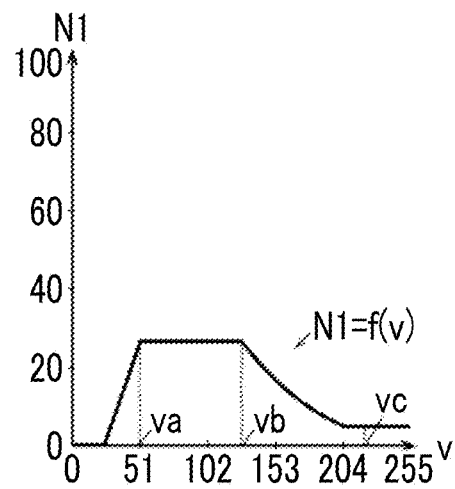
FIGS. 8A to 8C are graphs illustrating a setting value of a tail edge correction according to Example 1 of the invention.
Figure 8B:
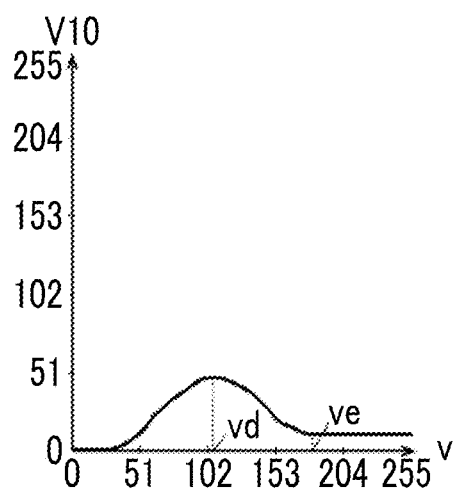
Figure 8C:
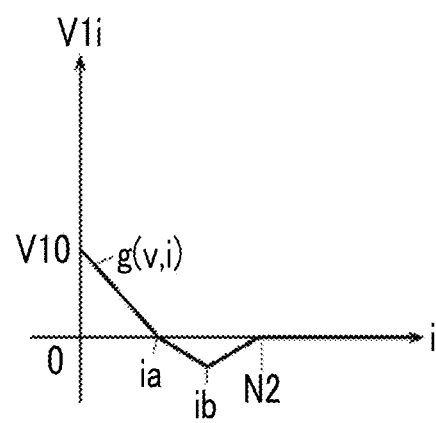

FIGS. 8A to 8C are graphs illustrating a setting value of a tail edge correction according to Example 1 of the invention, FIG. 8A is a graph illustrating an example of a relationship between a pixel value of the tail edge and the lower limit number of target pixels, FIG. 8B is a graph illustrating an example of a relationship between the pixel value of the tail edge and a correction value of the tail edge, and FIG. 8C is a graph illustrating an example of a relationship between the number of pixels from the tail edge and the correction value.

C110: Tail Edge Setting Storage Unit

The tail edge setting storage unit C110 is an example of a corresponding information storage unit and is an example of a tail edge correction setting value storage unit in the sub scanning direction. The tail edge setting storage unit C110 stores correction setting values N1, N2, and V1k in a case where the density correction is performed with the tail edge a1 as the reference. The tail edge setting storage unit C110 stores the number N2 of the target pixels as an example of the preset number of pixels, of which the density correction is performed, on the downstream side from the tail edge a1 in the sub scanning direction. In addition, the tail edge setting storage unit C110 stores the corresponding information with which a positive correction value V1$i$ (>0) is associated as an example of a correction amount which causes the density to become higher on the upstream section in a range of the number N2 of the target pixels and with which a negative correction value V1$i$ (<0) is associated as an example of a correction amount which causes the density to become lower on the downstream section in a range of the number N2 of the target pixels. Further, The tail edge setting storage unit C110 according to Example 1 stores the lower limit number N1 of the target pixels with which the correction is performed.

The tail edge setting storage unit C110 according to Example 1 stores correction setting values N1, N2, and V1$i$ by functions f and g as an example of corresponding information. In FIG. 8A, the storage unit C110 stores a corresponding relationship between the pixel value v of the tail edge a1 and the lower limit number N1 of the target pixels as a function of N1=f(v). In the function f according to Example 1, in a case where the pixel value v is small or large, the lower limit number N1 of the target pixels is set to be small. That is, in the function f according to Example 1 illustrated in FIG. 8A, in a case where the pixel value v is less than va with respect to preset pixel values va, vb, and vc (0<va<vb<vc), the lower limit number N1 is increased depending on the increase of v. When the pixel value v is from va to vb, the lower limit number N1 is constant even when v changes. When the pixel value v is from vb to vc, the lower limit number N1 is decreased as v increases. When the pixel value v is equal to or larger than vc, the lower limit number N1 becomes a constant number greater than 0 even when v changes. That is, in Example 1, in a case where the density of the tail edge a1 is too low or too high, the lower limit number N1 of the target pixels is set to be smaller compared to in a case of medium density.

In addition, in FIGS. 8B and 8C, the storage unit C110 stores a corresponding relationship between the correction value V1$i$, the pixel value v of the tail edge a1, and the number i of pixels which are spaced from the tail edge a1 in the sub scanning direction as a function g of V1$i$=g(v, i). In the function g according to Example 1, first, a relationship between the pixel value v and a correction value V10 of the tail edge a1, which means a case i=0, is described. In the function g according to Example 1 illustrated in FIG. 8B, in a case where the pixel value v of the tail edge a1 is close to 0 with respect to preset pixel values vd and ve (0<vd<ve), the correction value V10 of the tail edge a1 becomes 0. When the pixel value v is from 0 to vd, the correction value V10 increases as v increases. When the pixel value v is from vd to ve, the correction value V10 decreases as v increases. When the pixel value v is equal to or greater than ve, the correction value V10 becomes a constant value greater than 0. That is, in a case where the density of the tail edge a1 is too low or too high, the correction value V10 of the tail edge a1 according to Example 1 is set to be smaller compared to a case of a medium density. In addition, the correction value V10 of the tail edge a1 becomes equal to or greater than 0.

Next, in the function g, a relationship between a pixel that is spaced from the tail edge a1 by the number i and the correction value V1$i$ of a pixel that is spaced by i is described. In the function g according to Example 1 illustrated in FIG. 8C, with respect to the preset numbers of pixels ia and ib (0<ia<ib), as a pixel is separated from the tail edge a1 by i in the sub scanning direction, the correction value V1$i$ decreases toward 0. When i is ia, the correction value V1$i$ becomes 0. When i becomes greater than ia, the correction value V1$i$ becomes a negative value and the correction value V1$i$ decreases until i becomes ib. When i is ib, the correction value V1$i$ becomes the minimum value. When i becomes greater than ib, the correction value V1$i$ increases. When i becomes greater than the number N2 of the target pixels, the correction value V1$i$ becomes constant 0. The function g is measured and set in advance. In FIG. 8C, ia, of which the positive correction value V1$i$ (>0) and the negative correction value V1$i$ (<0) are switched, is set in advance according to a measurement of carrier resistance in the developer, a configuration of the printer main body, and the like.

C111: Tail Edge Defect Determination Unit

The tail edge defect determination unit C111 is an example of a unit that determines whether or not developing failure occurs on the downstream side with the tail edge a1 as a reference and is an example of a determination unit of a tail edge developing failure region in the sub scanning direction. The tail edge defect determination unit C111 determines whether or not developing failure occurs on the preset number of pixels on the downstream side in the sub scanning direction with the tail edge a1 as a reference. The tail edge defect determination unit C111 determines whether or not the downstream side from the tail edge a1 in the sub scanning direction is a defect region D1 as an example of the developing failure region based on the number n of the pixels with the tail edge a1 as the reference. That is, the determination unit C111 determines whether or not the downstream side of the tail edge a1 is to be corrected. The determination unit C111 according to Example 1 performs the process for each tail edge a1. In FIG. 7, the determination unit C111 acquires a pixel value v of the tail edge a1.

The determination unit C111 acquires the lower limit number N1 of the target pixels corresponding to the pixel value v of the tail edge a1 based on the function f. The determination unit C111 determines whether the number n of pixels from the tail edge a1 is equal to or higher than N1. The determination unit C111 determines that the downstream side from the tail edge a1 in the sub scanning direction as the defect region in a case where the number n of the pixels from the tail edge a1 is equal to or more than N1. That is, the determination unit C111 determines that correction is performed on the pixels on the downstream side from the tail edge a1 in the sub scanning direction. Accordingly, according to Example 1, in a case where the determination unit C111 determines the downstream side as the defect region D1, pixels that are adjacent on the upstream side from the tail edge a1 are pixels corresponding to the non-image section. In addition, a difference in pixel values between the pixel that is adjacent to the upstream side and a pixel of the tail edge a1 becomes equal to or higher than Z0. Further, the number n of the pixels obtained with the tail edge a1 as a reference becomes equal to or higher than N1.

C112: Tail Edge Correction Value Acquiring Unit

The tail edge correction value acquiring unit C112 is an example of a first correction amount acquiring unit and is an example of a tail edge correction value setting unit in the sub scanning direction. The tail edge correction value acquiring unit C112 acquires the correction value V1$i$ of the pixel in the defect region D1. The tail edge correction value acquiring unit C112 according to Example 1 performs a process for each tail edge a1. That is, the acquiring unit C112 acquires the correction value V1$i$ of the pixel in the defect region D1 for each tail edge a1 that is determined as the defect region D1 based on the pixel value v of the tail edge a1 and the number i (i=0, 1, 2, . . . , N1) of the pixels which are spaced from the tail edge a1. That is, the correction value V1$i$ is acquired based on V1$i$=g(v, i).

C113: Intermediate Edge Specifying Unit

The intermediate edge specifying unit C113 is an example of a unit that detects a boundary pixel in the sub scanning direction in which densities of the pixels change from high to low and is an example of a unit that detects a first boundary. The intermediate edge specifying unit C113 specifies a boundary pixel in the sub scanning direction, in which density changes from a high density of a pixel to a low density of a pixel which is lower than the high density of the pixel, in the preset sub scanning direction based on the raster image. In the specifying unit C113 according to Example 1, a halftone section in which the pixel value is equal to or greater than Z1 is set as an example of a low-density pixel. That is, the specifying unit C113 specifies a sub-scanning edge a, as an intermediate edge a2, where the density in the sub scanning direction decreases so as to change into the halftone section. Specifically, in FIG. 7, the specifying unit C113 according to Example 1 determines whether or not the difference $\Delta v$ obtained by subtracting a pixel value from the other pixel value of pixels adjacent to each other on the upstream side from the sub-scanning edge a is less than preset threshold value Z2 (Z2<0) in a case where the sub-scanning edge a is detected. In a case where the difference $\Delta v$ is less than the preset threshold value Z2, the specifying unit C113 acquires a pixel value v at the sub-scanning edge a. The specifying unit C113 determines whether or not the pixel value v at the sub-scanning edge a is equal to or greater than the preset threshold value Z1 (Z1>0). The specifying unit C113 specifies the sub-scanning edge a as an intermediate edge a2 in a case where the pixel value v at the sub-scanning edge a is equal to or greater than the preset threshold value Z1. The threshold value Z2 is set in advance based on a density difference which causes developing failure to occur.

C114: Intermediate Edge Pixel Counting Unit

The intermediate edge pixel counting unit C114 as an example of a counting unit of a pixel width of the intermediate edge in the sub scanning direction includes a high-density pixel counting unit C114A and a low-density pixel counting unit C114B. The intermediate edge pixel counting unit C114 measures the number nL and nH of pixels in the sub scanning direction on both side with the intermediate edge a2 as a boundary.

C114A: High-Density Pixel Counting Unit

The high-density pixel counting unit C114A counts the number nH of pixels on the high-density side with the intermediate edge a2 as a boundary. In FIG. 7, the high-density pixel counting unit C114A according to Example 1 counts the number nH of the pixels for each intermediate edge a2. That is, the counting unit C114A detects the sub-scanning edge a closest to the intermediate edge a2 on the upstream side in the sub scanning direction. The counting unit C114A counts up by 1 to the number of pixels which are positioned between the intermediate edge a2 and the sub-scanning edge a so as to measure the number nH of pixels.

C114B: Low-Density Pixel Counting Unit

The low-density pixel counting unit C114B counts the number nL of pixels on the low-density side with the intermediate edge a2 as a boundary. In FIG. 7, the low-density pixel counting unit C114B according to Example 1 counts the number nL of the pixels for each intermediate edge a2. That is, the counting unit C114B detects the sub-scanning edge a closest to the intermediate edge a2 on the downstream side in the sub scanning direction. The counting unit C114B counts up by 1 to the number of pixels which are positioned between the intermediate edge a2 and the sub-scanning edge a so as to measure the number nL of pixels.

Figure 9A:
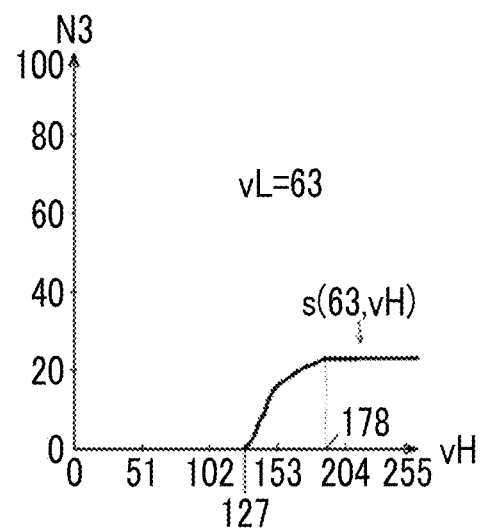
FIGS. 9A to 9C are graphs illustrating a setting value of an intermediate edge correction according to Example 1 of the invention.
Figure 9B:
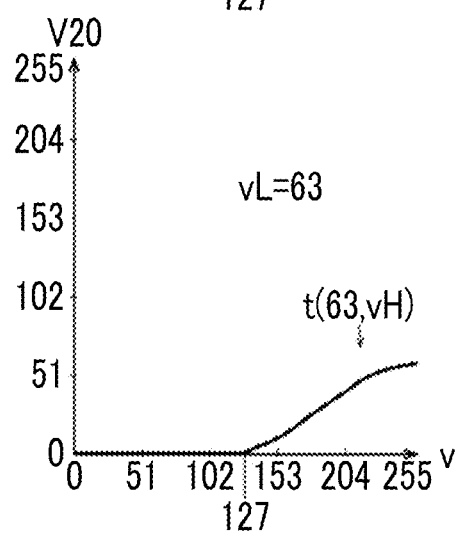
Figure 9C:
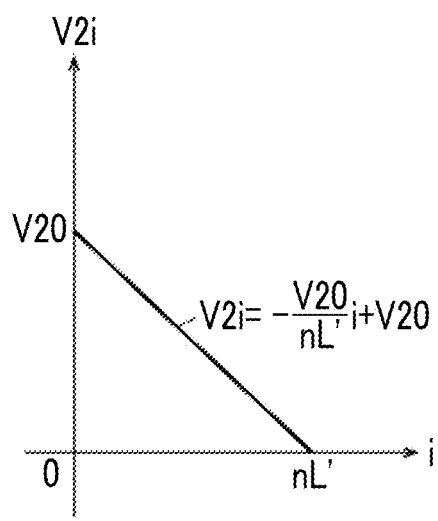

FIGS. 9A to 9C are graphs illustrating a setting value of an intermediate edge correction according to Example 1 of the invention, FIG. 9A is a graph illustrating an example of a relationship between a pixel value of an intermediate edge and the number of target pixels, FIG. 9B is a graph illustrating an example of a relationship between the pixel value of the intermediate edge and a correction value of the intermediate edge, and FIG. 9C is a graph illustrating an example of a relationship between the number of pixels from the intermediate edge and the correction value.

C115: Intermediate Edge Setting Storage Unit

The intermediate edge setting storage unit C115 is an example of a corresponding information storage unit and is an example of an intermediate edge correction setting value storage unit in the sub scanning direction. The intermediate edge setting storage unit C115 stores correction setting values N3 and V2$i$ in a case where the density correction is performed with the intermediate edge a2 as the reference. The intermediate edge setting storage unit C115 stores the number N3 of the target pixels as an example of the preset range, in which the density correction is performed, on the downstream side from the intermediate edge a2 in the sub scanning direction. In addition, the intermediate edge setting storage unit C115 stores the corresponding information of the correction value V20 as an example of a correction amount with which correction of the pixels in a range of the number N3 of the target pixels is performed.

The intermediate edge setting storage unit C115 according to Example 1 stores correction setting values N3 and V2$i$ by functions s and t as an example of corresponding information. In FIG. 9A, the storage unit C115 stores a corresponding relationship between the pixel value vL and the high-density pixel value vH of the intermediate edge a2 and the upper limit number N3 of the target pixels as a function of N3=s (vL, vH). In the function s according to Example 1 in FIG. 9A, for example, in a case where the vL=63 which corresponds to density of 25%, the number N3 of the pixels becomes 0 when vH is 0 to 127. In addition, when the pixel value vH is 128 to 178, the number N3 of the pixels increases as v increases. When the pixel value vH is 179 to 255, the number N3 of the pixels is constant even when vH is changed. That is, the greater the pixel value vH on the high-density side, the greater the difference |$\Delta v$|=vH−vL. Accordingly, in Example 1, when the pixel value vH is greater compared to a case of being small, the number N3 of the target pixels is likely to be set to be greater. The function s is measured and set in advance.

In addition, in FIG. 9B, the storage unit C115 stores a corresponding relationship between the correction value V20 of the intermediate edge a2, the pixel value vL of the intermediate edge a2, and the pixel value vH on the high-density side as a function t of V20=t(vL, vH). For example, in a case where vL=63, in a function I according to Example 1 illustrated in FIG. 9B, the correction value V20 of the intermediate edge a2 becomes 0 when the pixel value vH is 0 to 127. When the pixel value vH is 127 to 255, the correction value V20 increases as v increases. That is, the greater the pixel value vH on the high-density side, the greater the difference |$\Delta v$|=vH−vL. Accordingly, in Example 1, when the pixel value vH is greater compared to a case of being small, the correction value V20 is likely to be set to be greater. The function t is measured and set in advance.

C116: Intermediate Edge Defect Determination Unit

The intermediate edge defect determination unit C116 is an example of a unit that determines whether or not developing failure occurs on the downstream side with the intermediate edge a2 as a reference and is an example of a determination unit of an intermediate edge developing failure region in the sub scanning direction. The intermediate edge defect determination unit C116 determines whether or not developing failure occurs on the preset number of pixels on the downstream side in the sub scanning direction with the intermediate edge a2 as a reference. The determination unit C116 determines whether or not the downstream side from the intermediate edge a2 in the sub scanning direction is a defect region D2 as an example of the developing failure region based on the number nH of high-density pixels on the upstream side in the sub scanning direction with the intermediate edge a2 as a reference. That is, the determination unit C116 determines whether or not the downstream side of the intermediate edge a2 is to be corrected. The determination unit C116 according to Example 1 performs a process for each intermediate edge a2. That is, the determination unit C116 determines whether or not the number nH of the pixels on the high-density side from the intermediate edge a2 is equal to or greater than a preset number N4 of pixels. In a case where the number nH of pixels from the intermediate edge a2 is equal to or greater than the preset number N4 of pixels, the determination unit C116 determines that the downstream side from the intermediate edge a2 in the sub scanning direction is a defect region. That is, the determination unit C116 determines that the correction of the pixels on the downstream side from the intermediate edge a2 in the sub scanning direction is to be performed.

Accordingly, according to Example 1, in a case where the determination unit C116 determines that the downstream side is the defect region D2, the pixels on the downstream side with the intermediate edge a2 as the reference are pixels in the halftone section. In addition, the intermediate edge a2 is a boundary pixel in which the density decreases in the sub scanning direction and which becomes the halftone section. Further, a pixel that is adjacent to the upstream side from the intermediate edge a2 has a pixel value which is equal to or greater than |Z2| compared to the halftone section. Further, the number nH of the pixels on the high-density side with the intermediate edge a2 as the boundary is equal to or greater than N4.

C117: Intermediate Edge Correction Pixel Number-Determination Unit

The intermediate edge correction pixel number-determination unit C117 determines the number nL' of the pixels to be corrected of the pixels on the downstream side from the intermediate edge a2 in the sub scanning direction. The determination unit C117 according to Example 1 performs a process for each intermediate edge a2. That is, in a case where the downstream side from the intermediate edge a2 is determined as the defect region D2, the determination unit C117 acquires the pixel value vL of the intermediate edge a2 and the pixel value vH on the high-density side. The determination unit C117 acquires the number N3 of the target pixels which correspond to the pixel values vL and vH based on the function s. The determination unit C117 determines whether or not the number nL of the pixels on the low-density side from the intermediate edge a2 is equal to or greater than N3. In a case where the number nL of the pixels from the intermediate edge a2 is equal to or greater than N3, the determination unit C117 determines that the number nL' of the pixels to be corrected is equal to N3. In addition, in a case where the number nL of the pixels from the intermediate edge a2 is less than N3, the determination unit C117 determines that the number nL' of the pixels to be corrected is equal to nL.

C118: Intermediate Edge Correction Value Acquiring Unit

The intermediate edge correction value acquiring unit C118 as an example of an intermediate edge correction value acquiring unit in the sub scanning direction acquires the correction value $V2i$ of the pixel in the defect region. The intermediate edge correction value acquiring unit C118 according to Example 1 performs a process for each intermediate edge a2. That is, the acquiring unit C118 acquires the correction value $V2i$ of the pixel in the defect region D2 for each intermediate edge a2 that is determined as the defect region D2 based on the pixel value vL of the intermediate edge a2, the pixel value vH on the high-density side, and the number i (i=0, 1, 2, . . . , nL') of the pixels which are spaced from the intermediate edge a2. Specifically, in FIG. 9C, the correction value $V2i$ is acquired based on a linear equation in which the correction value $V2i$ becomes V20 of the intermediate edge a2 and becomes 0 on the pixel which is spaced by nL' from the intermediate edge a2. That is, the acquiring unit C118 according to Example 1 acquires the correction value $V2i$ based on the following Equation (1).

$$V2i = -(V20/nL') \times i + V20 \qquad \text{Equation (1)}$$

Figure 10A:
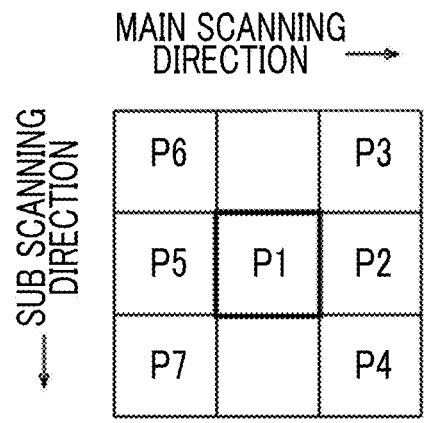
FIGS. 10A to 10C are views illustrating an end in a main scanning direction according to Example 1 of the invention.
Figure 10B:
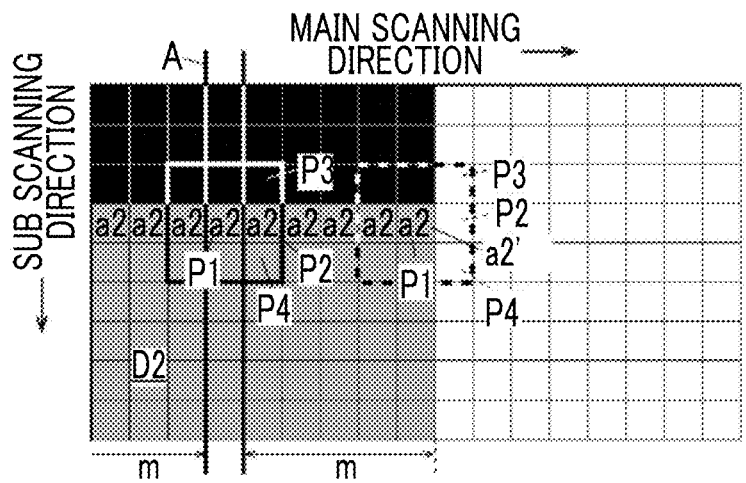
Figure 10C:
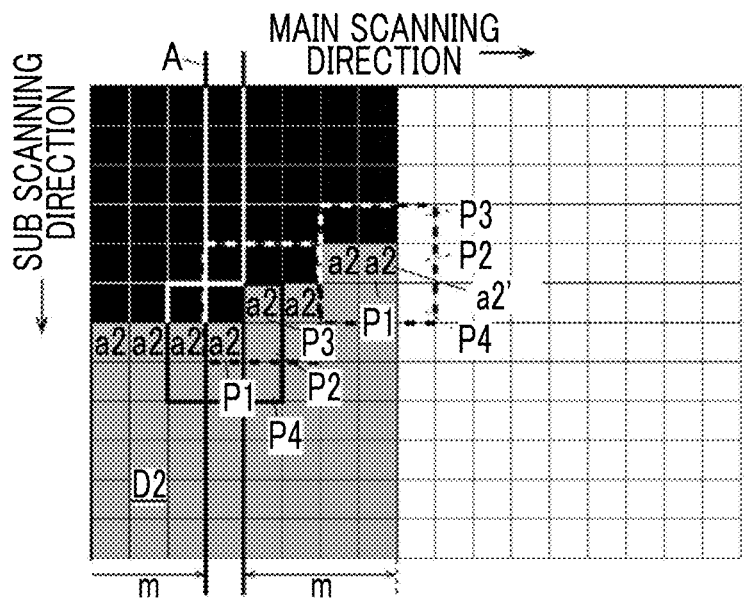

FIGS. 10A to 10C are views illustrating an end in a main scanning direction according to Example 1 of the invention, FIG. 10A is a view illustrating setting of a notable pixel and neighboring pixels, FIG. 10B is a view illustrating an example of processing target image information, and FIG. 10C is a view illustrating an example of processing target image information different from FIG. 10B.

C119: End-Vicinity Determination Unit

The end-vicinity determination unit C119 as an example of a unit that detects closeness from the end of the developing failure region in the main scanning direction includes a main-scanning end detecting unit C119A, a main-scanning number-counting unit C119B, and a vicinity determination unit C119C. The end-vicinity determination unit C119 determines whether or not the intermediate edge a2 is present in the vicinity of the end of the defect region D2 in the main scanning direction.

C119A: Main-Scanning End Detecting Unit

The main-scanning end detecting unit C119A as an example of a unit that detects the end of the developing failure region in the main scanning direction detects a pixel at the end in the main scanning direction of the intermediate edges a2 arranged in the main scanning direction in a case where the intermediate edges a2 at which it is determined that developing failure is to be occurred are arranged in the main scanning direction. According to Example 1, an end in the main scanning direction of the defect region D2 which is configured of plural intermediate edges a2 is detected. The detecting unit C119A according to Example 1 determines whether or not another intermediate edge a2 is present among preset neighboring pixels P2 to P4 and P5 to P7 around the notable pixel P1 in a case where the intermediate edge a2 becomes the notable pixel P1. By repeating these processes, the detecting unit C119A detects the end of the defect region D2 in the main scanning direction.

In FIG. 10A, according to Example 1, as an example of pixels arranged in the main scanning direction of P1 and as an example of a neighboring pixel on the downstream side in the main scanning direction, three pixels of the pixel P2 that is adjacent to the notable pixel P1 on the downstream side in the main scanning direction, the pixel P3 that is adjacent to P2 on the upstream side in the sub scanning direction, and the pixel P4 that is adjacent to P2 on the downstream side in the sub scanning direction are set. In addition, according to Example 1, as an example of a neighboring pixel on the upstream side in the main scanning direction, three pixels of the pixel P5 that is adjacent to P1 on the upstream side in the main scanning direction, the pixel P6 that is adjacent to P5 on the upstream side in the sub scanning direction, and the pixel P7 that is adjacent to P5 on the downstream side in the sub scanning direction are set. Accordingly, the detecting unit C119A according to Example 1 detects the end of the defect region D2 in the main scanning direction. According to Example 1, the pixels arranged in the main scanning direction include, as well as the pixels P2 and P5 which are adjacent to each other in the main scanning direction, the preset number of pixels P3, P4, P6, and P7 in the sub scanning direction with respect to the pixels P2 and P5 which are adjacent to each other in the main scanning direction.

Specifically, in FIGS. 10B and 10C, according to Example 1, the detecting unit C119A selects a determination target intermediate edge a2 in the vicinity. The detecting unit C119A sets the determination target intermediate edge a2 as a notable pixel P1. The detecting unit C119A determines whether or not the neighboring pixel P2 of P1 is the intermediate edge a2. In a case where P2 is not the intermediate edge a2, it is determined whether or not the neighboring pixel P3 of P1 is the intermediate edge a2. In a case where P3 is not the intermediate edge a2, it is determined whether or not the neighboring pixel P4 of P1 is the intermediate edge a2. At this time, in a case where the intermediate edge a2 is detected from the neighboring pixels P2, P3, and P4, the detected intermediate edge a2 becomes a new notable pixel P1. That is, a position of a searching target is shifted on the downstream side in the main scanning direction.

The detecting unit C119A repeats the same determination for neighboring pixels P2 to P4 of a new notable pixel P1. In a case where the intermediate edge a2 is not detected among the neighboring pixels P2 to P4, the detecting unit C119A determines that a pixel a2' of a downstream end in the main scanning direction is detected in a defect region to which the determination target intermediate edge a2 in the vicinity belongs. That is, the pixel a2 detected last is detected as the pixel a2' at the end. In a case where it is determined that the downstream end in the main scanning direction is detected, the detecting unit C119A sets the determination target intermediate edge a2 in the vicinity as the notable pixel P1 again. The detecting unit C119A repeats the same processes as for the neighboring pixels P2 to P4 on the downstream side, with respect to the neighboring pixels P5 to P7 on the upstream side from P1. A pixel a2' on the upstream end in the main scanning direction is detected.

C119B: Main-Scanning Number-Counting Unit

The main-scanning number-counting unit C119B counts the number m of the pixels from the determination target intermediate edge a2 in the vicinity to the end of the defect region D2 in the main scanning direction. The main-scanning number-counting unit C119B according to Example 1 counts the number of times of determining that the intermediate edge a2 is present among the neighboring pixels P2 to P4 on the downstream side such that the number m of the pixels is counted to the downstream end. In addition, in a case where it is determined that the intermediate edge a2 is not present among the neighboring pixels P2 to P4, the counting unit C119B initializes the number m of the pixels to 0. The counting unit C119B counts the number of times of determining that the intermediate edge a2 is present among the neighboring pixels P5 to P7 on the upstream side such that the number m of the pixels is counted to the upstream end.

C119C: Vicinity Determining Unit

The vicinity determining unit C119C as an example of a unit that determines the closeness to the end of the developing failure region in the main scanning direction determines whether a distance between the intermediate edges a2 arranged in the main scanning direction and the pixel a2' at the end of the main scanning direction is within the preset number M1 of the pixels such that it is determined whether or not each of the intermediate edges a2 and the pixel a2' at the end are close to each other. According to Example 1, the determining unit C119C performs determination for each intermediate edge a2. That is, the determining unit C119C determines whether or not the number m of the pixels counted by the main-scanning number-counting unit C119B is equal to or less than the preset number M1. In a case where the number m of the pixels is equal to or less than the number M1, the determining unit C119C determines that the determination target intermediate edge a2 in the vicinity is closer to the pixel a2' at the end in the main scanning direction. In a case where the number m of the pixels is greater than M1, the determining unit C119C determines that the determination target intermediate edge a2 in the vicinity is spaced apart from the pixel a2' at the end in the main scanning direction.

Figure 11A:
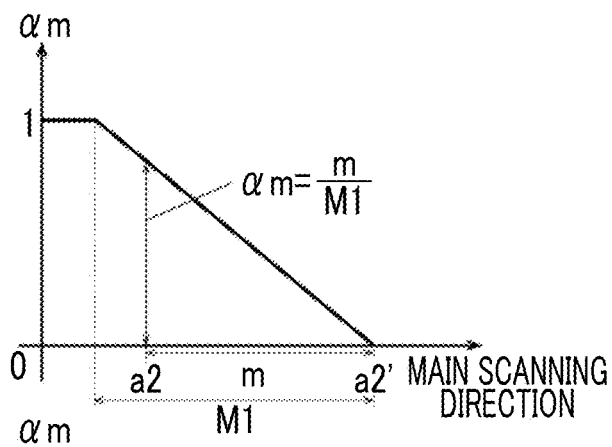
FIGS. 11A to 11D are graphs illustrating an example of correction of an intermediate edge correction value according to the invention.
Figure 11B:
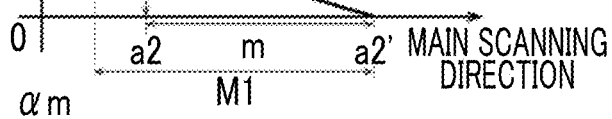
Figure 11C:
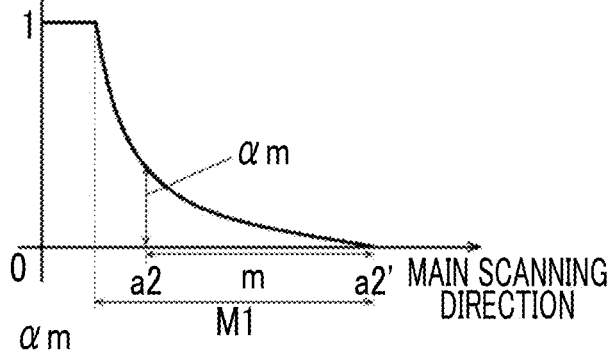
Figure 11D:
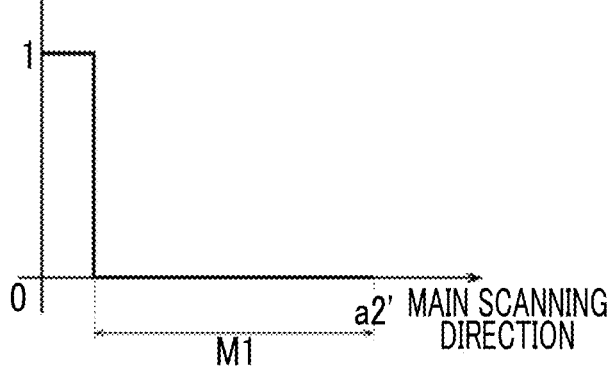

FIGS. 11A to 11D are graphs illustrating an example of correction by a modified intermediate edge correction value according to the invention, FIG. 11A is a graph illustrating Example 1 of the invention, FIG. 11B is a graph illustrating another modification example with respect to Example 1, FIG. 11C is a graph illustrating still another modification example different from FIG. 11B with respect to Example 1, and FIG. 11D is a graph illustrating still another modification example different from FIGS. 11B and 11C with respect to Example 1.

C120: Intermediate Edge Modification Setting Storage Unit

The intermediate edge modification setting storage unit C120 is an example of a corresponding information storage unit and is an example of a setting value storage unit for modifying of correction value. The intermediate edge modification setting storage unit C120 stores a setting value am for modifying of the correction value V2$i$ of the intermediate edge a2. In a case where the intermediate edge a2 is closer to the end of the defect region D2 in the main scanning direction, the intermediate edge modification setting storage unit C120 stores a coefficient cm that is used to modify the correction value of the pixel in the defect region D2 of the intermediate edge a2. In FIG. 11A, in a case where m>M1 with respect to the number m of the pixels of the intermediate edges a2 which are spaced from the pixel a2', 1 is set in the storage unit C120. In addition, in a case where the number m of the pixels is equal to or less than M1, 1 is set when m=M1 and 0 is set when m=0 based on a linear equation. That is, in the storage unit C120 according to Example 1, the coefficient αm based on the following Equation (2) is stored.

$$\alpha m = (m/M1) \qquad \text{Equation (2)}$$

The coefficient αm is not limited to the configuration of the linear equation. In FIGS. 11A to 11D, it is possible to set an arbitrary coefficient αm which decreases the correction amount for high density of the intermediate edge a2 which is determined to be close to the pixel a2' at the end so as to be smaller than the correction amount for the intermediate edge a2 that is determined to be spaced apart. Accordingly, it is possible to form a non-linear coefficient αm such as αm=(m/M1)$^2$ as illustrated in FIG. 11B. In addition, it is possible to have a configuration in which, as a value in FIG. 11C, information corresponding to each αm is stored in a look-up table. Further, in a case where m<M1, αm=0, that is, it is possible to have a configuration in which correction is not performed. In a configuration in which, in a case where m<M1, αm=0, it is possible to remove the intermediate edge modification setting storage unit C120.

C121: Intermediate Edge Correction Value Modifying Unit

The intermediate edge correction value modifying unit C121 is an example of a first correction amount acquiring unit and is an example of an intermediate edge correction value resetting unit in the sub scanning direction. The intermediate edge correction value modifying unit C121 decreases the correction amount V2$i$ for high density of the intermediate edge a2 which is determined to be close to the pixel a2' at the end so as to be smaller than the correction amount V2$i$ for the intermediate edge a2 that is determined to be spaced apart. According to Example 1, the correction value V2$i$ of the pixel of the defect region D2 of the intermediate edge a2 is modified for each intermediate edge a2 that is determined to be close to the pixel a2' at the end. According to Example 1, the intermediate edge correction value modifying unit C121 performs a process based on the stored information in the intermediate edge modification setting storage unit C120. According to Example 1, in a case where the intermediate edge a2 is determined to be spaced apart from the pixel a2' at the main scanning end, the correction value V2$i$ of the defect region of the intermediate edge a2 is not modified. In a case where it is determined that the intermediate edge a2 is close to the main scanning boundary, as illustrated in FIG. 11A, the modifying unit C121 multiplies the correction value V2$i$ of each pixel of the defect region D2 of the intermediate edge a2 by (m/M1) such that the correction value V2$i$ is modified to a new correction value V2$i$.

Figures 12A, 12B:
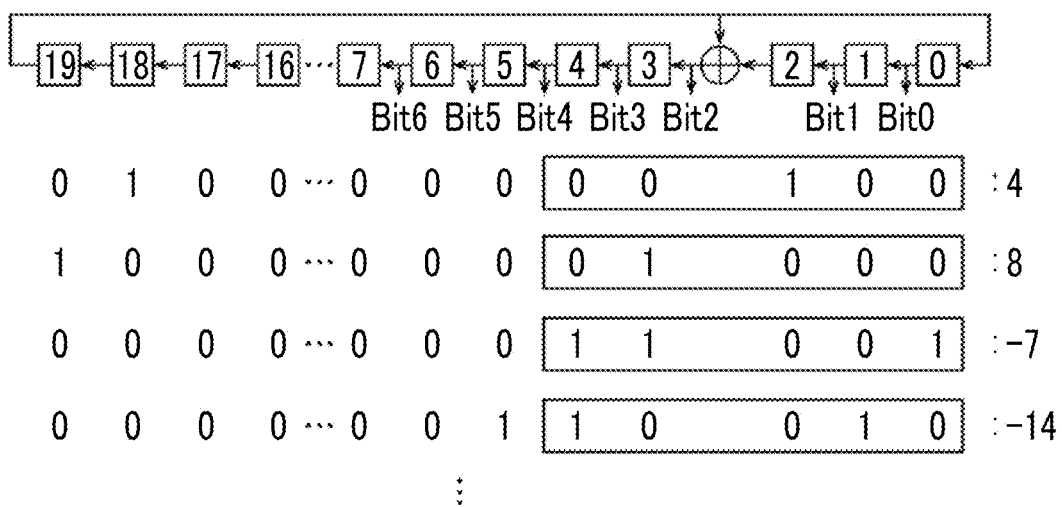
FIGS. 12A and 12B are diagrams illustrating random number generation according to Example 1 of the invention.

FIGS. 12A and 12B are diagrams illustrating random number generation according to Example 1 of the invention, FIG. 12A is a diagram illustrating the random number generation, and FIG. 12B is a diagram illustrating a random number and a random number correction value.

C122: Random Number Generating Unit

The random number generating unit C122 generates a random number. The random number generating unit C122 according to Example 1 generates the random number based on an M-sequence random number based on a 20-bit primitive polynomial of $X^{20}+X^3+1$.

The random number is generated by repeating appropriate processes based on a preset initial value. Here, the random number based on $X^{20}+X^3+1$ is described based on the drawing illustrating a generation circuit or a so-called LFSR. In FIG. 12A, first, the initial value of a binary number is set at each digit of Bit 0 to Bit 19. In a case where the next random number is generated, a value at each digit before being generated is subjected to a process in which the value is moved to a position before an arrow. In addition, at a symbol portion of a circle having + inside, an XOR processing is performed. The XOR processing corresponds to computation in which, in a case where only one side is "1", "1" is obtained.

Accordingly, for example, when Bit 2 and Bit 18 are "1" and a value having a remainder of "0" becomes an initial value, in FIG. 12A, the entire values have original values of the arrows except for Bit 3 in a case where next values are generated. In addition, in Bit 3, the XOR processing is performed on "0" of Bit 19 and "1" of Bit 2 such that the value becomes "1". Therefore, the next values are generated such that Bit 19 and Bit 3 are "1" and the remainders of Bits are "0". Similarly, the generated values are set as the original values, the process is repeated, and the next values are generated. Here, for example, when the top bit is used for coding based on Bit 4 to Bit 0 and "0" represents positive and "1" represents negative so as to be changed into decimals, the values becomes 4, 8, −7, and −14 in the order and values with irregularity may be generated. In this way, the random number generating unit C122 according to Example 1 generates the random number. The generating unit C122 according to Example 1 generates the random number for each pixel to be corrected. In addition, the generating unit C122 according to Example 1 is set in advance such that a different random number is generated for each of the colors Y to O. According to Example 1, a different initial value is set for each of the colors Y to O. The random number generation is not limited to the configuration and any configuration of the related art may be applied.

C123: Random Number Correction Value Acquiring Unit

The random number correction value acquiring unit C123 is an example of a first correction amount acquiring unit and an example of a random number correction amount acquiring unit. The random number correction value acquiring unit C123 acquires a random number correction value V3$i$ based on the generated random number. According to Example 1, the random number correction value acquiring unit C123 acquires the random number correction value V3$i$ for each pixel to be corrected. In FIG. 12B, in the random number correction value acquiring unit C123 according to Example 1, as an example, in a case where the pixel value v is 0 to 63, the superimposed bit number is set to 2 bit such that the random number correction value V3$i$ of −2 to 1 is acquired. In addition, in a case where the pixel value v is 64 to 127, the superimposed bit number is set to 3 bit such that the random number correction value V3$i$ of −4 to 3 is acquired. Further, in a case where the pixel value v is 128 to 191, the superimposed bit number is set to 4 bit such that the random number correction value V3$i$ of −8 to 7 is acquired. In addition, in a case where the pixel value v is 192 to 255, the superimposed bit number is set to 5 bit such that the random number correction value V3$i$ of −16 to 15 is acquired.

The random number correction value V3$i$ which is acquired by the random number correction value acquiring unit C123 is not limited to the configuration described above. For example, in a case where the random number correction value V3$i$ is acquired, it is possible to select arbitrarily a bit number that is selected from the random numbers. In addition, the configuration in which the superimposed bit number is changed depending on the pixel value v is illustrated; however, it is possible to employ a configuration in which the superimposed bit number is fixed. Further, it is possible to employ a configuration in which the top bit is not assigned with the positive or negative signs.

C124: Correction Unit

The correction unit C124 as an example of a first correction unit corrects density of a pixel such that image failure based on developing failure does not occur. The correction unit C124 adds correction values V1$i$ and V2$i$ and the random number correction value V3$i$ to the pixel value vi for each pixel which acquires the correction values V1$i$ and V2$i$ of the defect regions D1 and D2 such that the pixel value is modified to a new pixel value vi. That is, vi=vi+V1$i$+V3$i$ and vi=vi+V2$i$+V3$i$. Accordingly, the correction value vi before being corrected, that is, is modified into a state in which the raster image before correction is removed. In the following description, in a case where the corrected correction values v and vi are described, "'" is attached so as to be represented by the correction values v' and vi'.

C125: Post-Correction Storage Unit

The post-correction storage unit C125 as an example of a unit that stores image information corrected by the first correction unit stores image information, of which defect correction is completed in which the pixel value vi of the defect regions D1 and D2 is corrected, as an example of second image information. That is, according to Example 1, a raster image based on the pixel value v' corrected for each color of Y, M, C, K, and O is stored.

C126: Preview Determination Unit

The preview determination unit C126 as an example of a determination unit of an image display before image recording determines whether or not the preview display is to be performed as an example of the image display before the image recording. According to Example 1, it is determined whether or not there is a preset input of performing the preview, by the input devices COM2 and COM3. The determination unit C126 determines that the preview is performed in a case where the input of performing the preview is present.

C127: Print-Start Determination Unit

The print-start determination unit C127 as an example of a determination unit of the start of the image recording determines whether or not printing is to be performed based on correction data. According to Example 1, it is determined whether or not there is a preset input of performing the print-start, by the input devices COM2 and COM3. It is determined that the print-start is performed in a case where the preset input of performing the print-start is present.

C128: Tone Correcting Unit

The tone correcting unit C128 performs tone correcting process of an image based on the corrected image information. The tone correcting unit C128 according to Example 1 performs a tone correction such as density adjustment by a user as an example of an operator, brightness adjustment, or calibration of deterioration with age.

C129: Transmission Unit

The transmission unit C129 transmits the image information, of which the tone correction is completed, as second image information to the printer U from the print image server COM. That is, the transmission unit C129 transmits image information based on image information acquired from the post-correction storage unit C125.

C130: Preview Processing Unit

The preview processing unit C130 as an example of a processing unit for display before the image recording includes an image information acquiring section C130A, a reversing correction value acquiring section C130B, a reverse correction section C130C, and a preview display section C130D. The preview processing unit C130 performs a preview display on the display COM4 in order for a user to check an image before printing.

C130A: Image Information Acquiring Section

The image information acquiring section C130A acquires image data stored in the post-correction storage unit C125. That is, the correction values V1$i$, V2$i$, and V3$i$ are added such that the corrected pixel value v' is acquired.

C130B: Reversing Correction Value Acquiring Section

The reversing correction value acquiring section C130B causes the units C107 to C123 to process the corrected image data acquired by the image information acquiring section C130A and then acquires the correction values V1$i$ and V2$i$ or the random number correction value V3$i$. That is, according to Example 1, the edge detecting unit C107 functions as a second boundary detecting unit, as well as the first boundary detecting unit. In addition, according to Example 1, the tail edge correction value acquiring unit C112, the intermediate edge correction value acquiring unit C118, the intermediate edge correction value modifying unit C121, or random number correction value acquiring unit C123 functions as a second correction amount acquiring unit as well as the first correction amount acquiring unit. In the following description, in a case where the correction values V1$i$, V2$i$, and V3$i$ acquired by the reversing correction value acquiring section C130B are described, "'" is attached so as to be represented by correction values V1$i$', V2$i$', and V3$i$'.

C130C: Reverse Correction Section

The reverse correction section C130C as an example of a second correction unit performs reverse correction so as to cancel the correction performed by the first correction unit based on density of a pixel of the second image information. The reverse correction section C130C according to Example 1, as an example of reverse correction for cancelling, subtracts the correction values V1$i$' and V2$i$' and the random number correction value V3$i$' from the pixel value vi' for each pixel of which the correction values V1$i$' and V2$i$' for reverse correction are acquired such that a new pixel value vi is obtained. That is, vi=vi−V1$i$'−V3$i$' and vi=vi−V2$i$'−V3$i$'. In the following description, in a case where the pixel values v and vi acquired by reversing correction value acquiring section C130B are described, "''" is attached so as to be represented by v" and vi".

C130D: Preview Display Section

The preview display section C130D is an example of a third image information display section and is an example of a display section of an image before image recording. The preview display section C130D displays a preview on the display COM4 based on the pixel value vi" which is reversely corrected by the reverse correction section C130C, as an example of third image information. When the preview display section C130D performs display, the image information before correction of the correction unit C124 is already removed when the correction unit C124 performs correction.

Description of Flowchart of Example 1

Next, processes of the printer U according to Example 1 will be described with reference to flowcharts.

Description of Flowchart of Main Process

FIG. 13 is a flowchart of a main process according to Example 1.

A process of each ST: step in the flowchart of FIG. 13 is performed in accordance with a program stored in a hard disk or the like of the main body COM1 of the print image server COM. In addition, the process is executed along with other various processes of the printer U.

The flowchart in FIG. 13 starts when power of the print image server COM is supplied.

In ST1 in FIG. 13, it is determined that the PDL data is received from the personal computer PC. In a case where the answer is yes (Y), the process proceeds to ST2 and, in a case where the answer is no (N), ST1 is performed repeatedly.

In ST2, analysis of the PDL data is performed. The process proceeds to ST3.

In ST3, a raster image is generated based on the analyzed data. The process proceeds to ST4.

In ST4, color conversion is performed such that the raster image is converted into the raster image for each of the colors Y to O. The process proceeds to ST5.

In ST5, a pixel value for each color is converted such that the toner total amount is regulated. The process proceeds to ST6.

In ST6, a sharpness correction or the like is performed and the pixel value of the pixel of the raster image is adjusted. The process proceeds to ST7.

In ST7, a defect correction process is performed. The process proceeds to ST8.

In ST8, density adjustment is performed. The process proceeds to ST9.

In ST9, data transmission to the printer U is performed. The process returns to ST1.

Description of Flowchart of Defect Correction Process

FIG. 14 is a flowchart of a defect correction process according to Example 1, and of a subroutine of ST7 in FIG. 13.

In ST101 in FIG. 14, an edge detecting process is performed. The process proceeds to ST102.

In ST102, a tail edge correction value acquiring process is performed. The process proceeds to ST103.

In ST103, an intermediate edge correction value acquiring process is performed. The process proceeds to ST104.

In ST104, a main scanning end modifying process is performed. The process proceeds to ST105.

In ST105, a correction value adding process is performed. The process proceeds to ST106.

In ST106, image information in which a correction value adding process is performed is stored. The process proceeds to ST107.

In ST107, it is determined whether or not there is an input to perform a preview. In a case where the answer is yes (Y), the process proceeds to ST109 and, in a case where the answer is no (N), the process proceeds to ST108.

In ST108, it is determined whether or not there is an input to perform print-start. In a case where the answer is yes (Y), the defect correction process ends and the process returns to the main process illustrated in FIG. 13. In a case where the answer is no (N), the process returns to ST107.

In ST109, a reverse correction process is performed. The process proceeds to ST110.

In ST110, a preview display is performed based on reversely corrected image information. The process proceeds to ST111.

In ST111, it is determined whether or not there is an input to perform print-start. In a case where the answer is yes (Y), the defect correction process ends and the process returns to the main process illustrated in FIG. 13. In a case where the answer is no (N), ST111 is performed repeatedly.

Description of Flowchart of Edge Detecting Process

Figure 15:
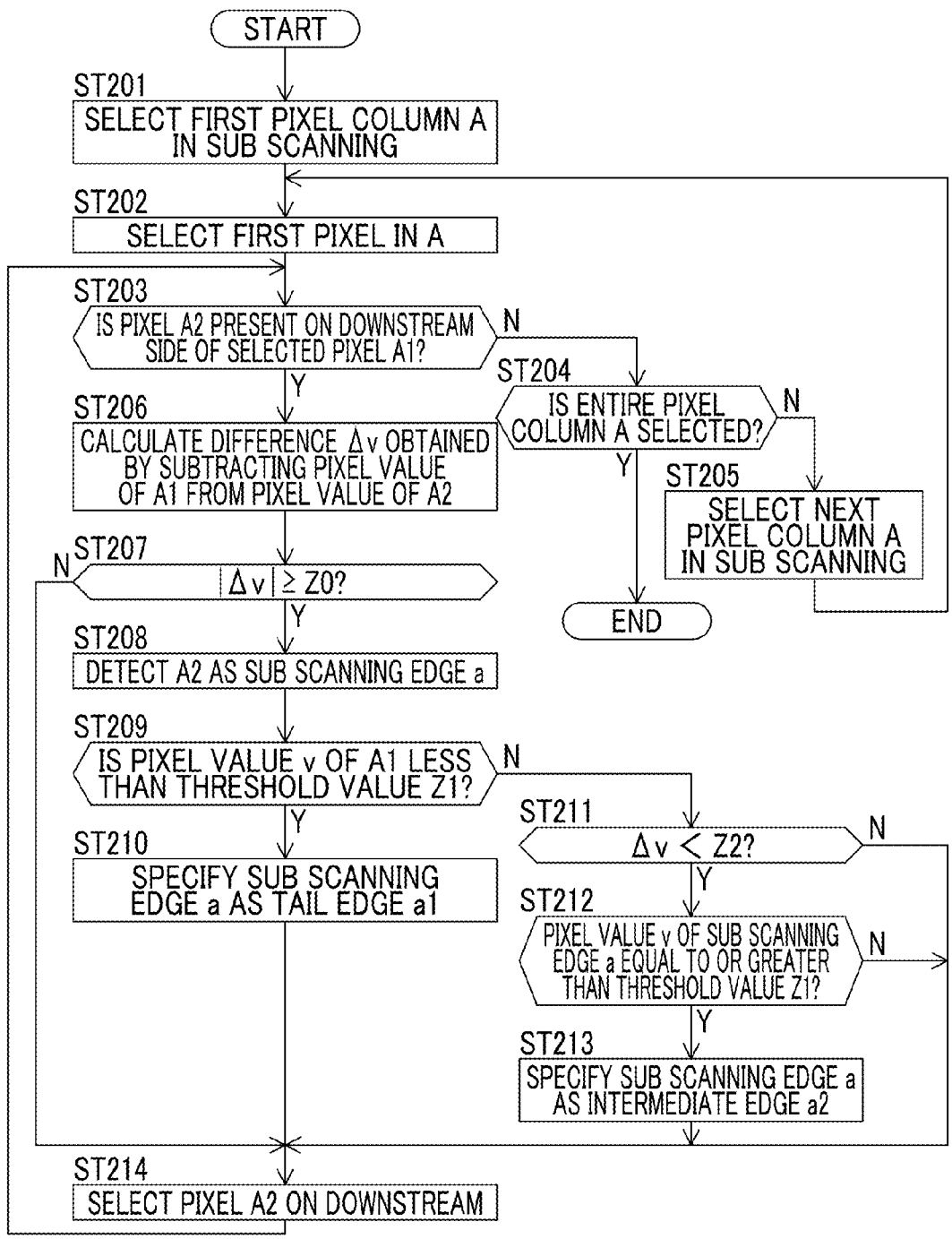
FIG. 15 is a flowchart of an edge detecting process according to Example 1, and of a subroutine of ST101 in FIG. 14 or ST702 in FIG. 21.
Figure 21:
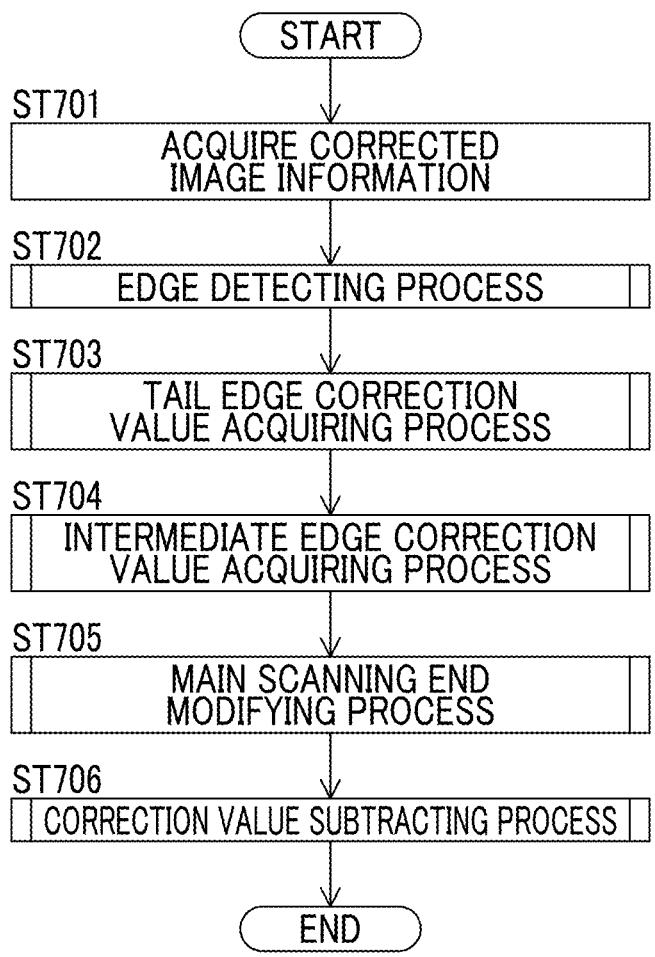
FIG. 21 is a flowchart of a reverse correction process according to Example 1, and of a subroutine of ST109 in FIG. 14.

FIG. 15 is a flowchart of an edge detecting process according to Example 1, and of a subroutine of ST101 in FIG. 14 or ST702 in FIG. 21.

In ST201 in FIG. 15, the first pixel column A in sub scanning is selected. The process proceeds to ST202.

In ST202, the first pixel in the pixel column A is selected. The process proceeds to ST203.

In ST203, it is determined whether or not a pixel A2 is present on the downstream side of the selected pixel A1 in the sub scanning direction. That is, it is determined whether or not the selected pixel A1 is the last pixel in the pixel column A. In a case where the answer is yes (Y), the process proceeds to ST206 and, in a case where the answer is no (N), the process proceeds to ST204.

In ST204, it is determined whether or not the entire pixel column A in the sub scanning is selected. In a case where the answer is yes (Y), the edge detecting process ends and the process returns to an invoker and, in a case where the answer is no (N), the process proceeds to ST205.

In ST205, the next pixel column A in sub scanning is selected. The process returns to ST202.

In ST206, the difference Δv obtained by subtracting the pixel value of the pixel A1 selected from the pixel value of the pixel A2 on the downstream side is calculated. The process proceeds to ST207.

In ST207, it is determined whether or not a size of the difference |Δv| is equal to or greater than the threshold value Z0. In a case where the answer is yes (Y), the process proceeds to ST208 and, in a case where the answer is no (N), the process proceeds to ST214.

In ST208, the pixel A2 on the downstream side is detected as a sub scanning edge a. The process proceeds to ST209.

In ST209, it is determined whether or not the pixel value v of the selected pixel is less than the threshold value Z1. That is, it is determined whether or not the section is the non-image section. In a case where the answer is yes (Y), the process proceeds to ST210 and, in a case where the answer is no (N), the process proceeds to ST211.

In ST210, the sub scanning edge a is specified as the tail edge a1. The process proceeds to ST214.

In ST211, it is determined whether or not the difference Δv is less than threshold value Z2 (Z2<0). In a case where the answer is yes (Y), the process proceeds to ST212 and, in a case where the answer is no (N), the process proceeds to ST214.

In ST212, it is determined whether or not the pixel value of the pixel on the downstream side, that is, the pixel value of the sub-scanning edge a is equal to or greater than the threshold value Z1. In a case where the answer is yes (Y), the process proceeds to ST213 and, in a case where the answer is no (N), the process proceeds to ST214.

In ST213, the pixel on the downstream side, that is, the sub scanning edge a is specified as the intermediate edge a2. The process proceeds to ST214.

In ST214, the pixel on the downstream is selected. The process returns to ST203.

Description of Flowchart of Tail Edge Correction Process

Figure 16:
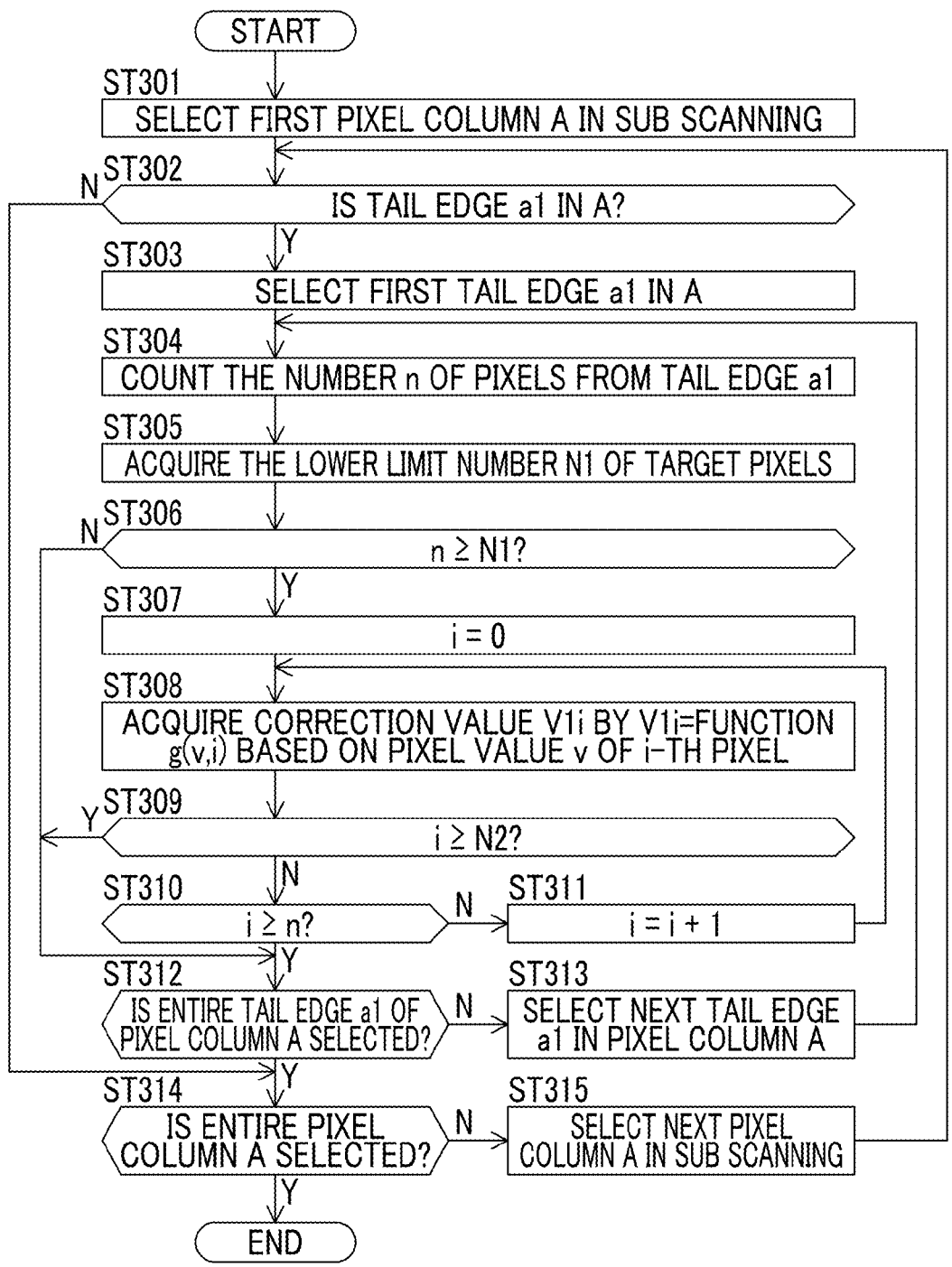
FIG. 16 is a flowchart of an acquisition process of a tail edge correction value according to Example 1, and of a subroutine of ST102 in FIG. 14 or ST703 in FIG. 21.

FIG. 16 is a flowchart of an acquisition process of a tail edge correction value according to Example 1, and of a subroutine of ST102 in FIG. 14 or ST703 in FIG. 21.

In ST301 in FIG. 16, the first pixel column A in the sub scanning is selected. The process proceeds to ST302.

In ST302, it is determined whether or not the tail edge a1 is present in the pixel column A. In a case where the answer is yes (Y), the process proceeds to ST303 and, in a case where the answer is no (N), the process proceeds to ST314.

In ST303, the first tail edge a1 is selected in the pixel column A. The process proceeds to ST304.

In ST304, the number n of the pixels which are continued from the tail edge a1 in the sub scanning direction and of which the pixel value is equal to or greater than the Z1 are counted up. The process proceeds to ST305.

In ST305, the lower limit number N1 of the target pixels is acquired based on the pixel value v of the tail edge a1 and the function f. The process proceeds to ST306.

In ST306, it is determined whether or not n≥N1. That is, it is determined whether or not the image region from the tail edge a1 in the sub scanning direction is the defect region. In a case where the answer is yes (Y), the process proceeds to ST307 and, in a case where the answer is no (N), the process proceeds to ST312.

In ST307, a relationship of i=0 is satisfied. That is, i is initialized. The process proceeds to ST308.

In ST308, a correction value V1$i$ of the i-th pixel from the tail edge a1 is acquired based on the function g (v, i). The process proceeds to ST309.

In ST309, it is determined whether or not the number i of the pixels is equal to or greater than the number N2 of the target pixels. In a case where the answer is yes (Y), the process proceeds to ST312 and, in a case where the answer is no (N), the process proceeds to ST310.

In ST310, it is determined whether or not i≥n. That is, it is determined whether or not the i-th pixel reaches downstream end of the image section. In a case where the answer is yes (Y), the process proceeds to ST312 and, in a case where the answer is no (N), the process proceeds to ST311.

In ST311, a relationship of i=i+1 is satisfied. That is, 1 is added to i. The process returns to ST308.

In ST312, it is determined whether or not the entire tail edges a1 in the pixel column A are selected. In a case where the answer is yes (Y), the process proceeds to ST314 and, in a case where the answer is no (N), the process proceeds to ST313.

In ST313, the next tail edge a1 in the pixel column A is selected. The process returns to ST304.

In ST314, it is determined whether or not the entire pixel column A in the sub scanning is selected. In a case where the answer is yes (Y), the tail edge correction value acquiring process ends and returns to the invoker. In a case where the answer is no (N), the process proceeds to ST315.

In ST315, the next pixel column A in the sub scanning is selected. The process returns to ST302.

Figure 17:
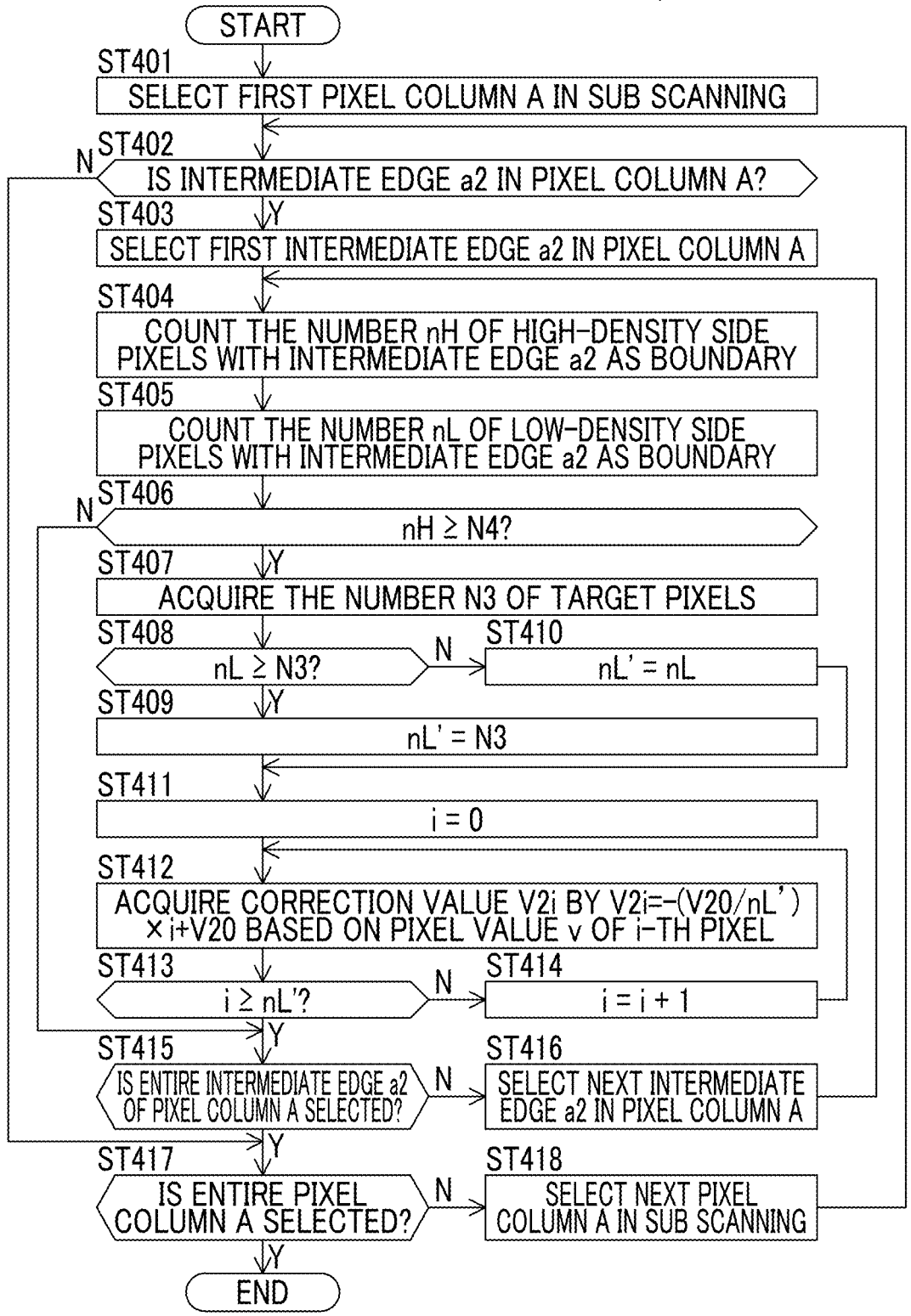
FIG. 17 is a flowchart of an acquisition process of an intermediate edge correction value according to Example 1, and of a subroutine of ST103 in FIG. 14 or ST704 in FIG. 21.

Description of Flowchart of Intermediate Edge Correction Value Acquiring Process FIG. 17 is a flowchart of an acquisition process of an intermediate edge correction value according to Example 1, and of a subroutine of ST103 in FIG. 14 or ST704 in FIG. 21.

In ST401 in FIG. 17, the first pixel column A in the sub scanning is selected. The process proceeds to ST402.

In ST402, it is determined whether or not the intermediate edge a2 is present in the pixel column A. In a case where the answer is yes (Y), the process proceeds to ST403 and, in a case where the answer is no (N), the process proceeds to ST417.

In ST403, the first intermediate edge a2 in the pixel column A is selected. The process proceeds to ST404.

In ST404, the number nH of the pixels on the high-density side in the sub scanning direction with the intermediate edge a2 as the boundary is counted. The process proceeds to ST405.

In ST405, the number nL of the pixels on the low-density side in the sub scanning direction with the intermediate edge a2 as the boundary is counted. The process proceeds to ST406.

In ST406, it is determined whether or not the number nH of the pixels on the high-density side is equal to or greater than the number N4 of the pixels. In a case where the answer is yes (Y), the process proceeds to ST407 and, in a case where the answer is no (N), the process proceeds to ST415.

In ST407, the number N3 of the target pixels is acquired based on the pixel value v of the intermediate edge a2 and the function s. The process proceeds to ST408.

In ST408, it is determined whether or not nL≥N3. That is, it is determined whether or not the number of the pixels in the image region in the sub scanning direction from the intermediate edge a2 exceeds the target range. In a case where the answer is yes (Y), the process proceeds to ST409 and, in a case where the answer is no (N), the process proceeds to ST410.

In ST409, a relationship of nL'=N3 is satisfied. The process proceeds to ST411.

In ST410, a relationship of nL'=nL is satisfied. The process proceeds to ST411.

In ST411, a relationship of i=0 is satisfied. That is, i is initialized. The process proceeds to ST412.

In ST412, the pixel value V2$i$ of the i-th pixel from the intermediate edge a2 is acquired when V2$i$=−(V20/nL')×i+ V20 based on V20=t(nL, nH) and nL'. The process proceeds to ST413.

In ST413, it is determined whether or not i≥nL'. That is, it is determined whether or not the pixel values of the entire correction target pixels are acquired. In a case where the answer is yes (Y), the process proceeds to ST415 and, in a case where the answer is no (N), the process proceeds to ST414.

In ST414, a relationship of i=i+1 is satisfied. That is, 1 is added to i. The process returns to ST412.

In ST415, it is determined whether or not the entire intermediate edges a2 in the pixel column A are selected. In a case where the answer is yes (Y), the process proceeds to ST417 and, in a case where the answer is no (N), the process proceeds to ST416.

In ST416, the next intermediate edge a2 in the pixel column A is selected. The process returns to ST404.

In ST417, it is determined whether or not the entire pixel column A in the sub scanning is selected. In a case where the answer is yes (Y), the intermediate edge correction value acquiring process ends and returns to the invoker. In a case where the answer is no (N), the process proceeds to ST418.

In ST418, the next pixel column A in the sub scanning is selected. The process returns to ST402.

Description of Flowchart of Main-Scanning End Modifying Process

Figure 18:
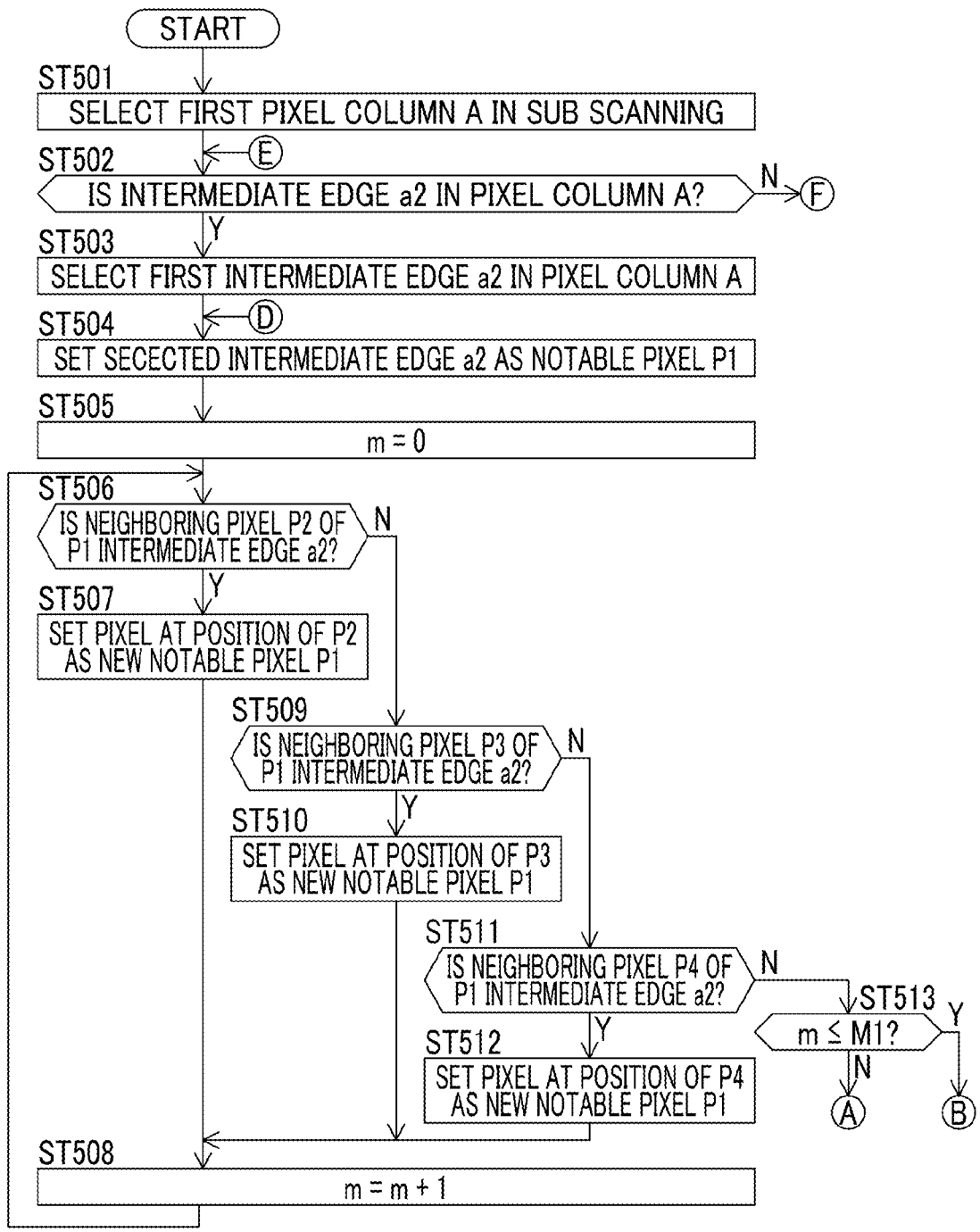
FIG. 18 is a flowchart of a modification process at an end of main scanning according to Example 1, and of a subroutine of ST104 in FIG. 14 or ST705 in FIG. 21.

FIG. 18 is a flowchart of a modification process at an end of main scanning according to Example 1, and of a subroutine of ST104 in FIG. 14 or ST705 in FIG. 21.

Figure 19:
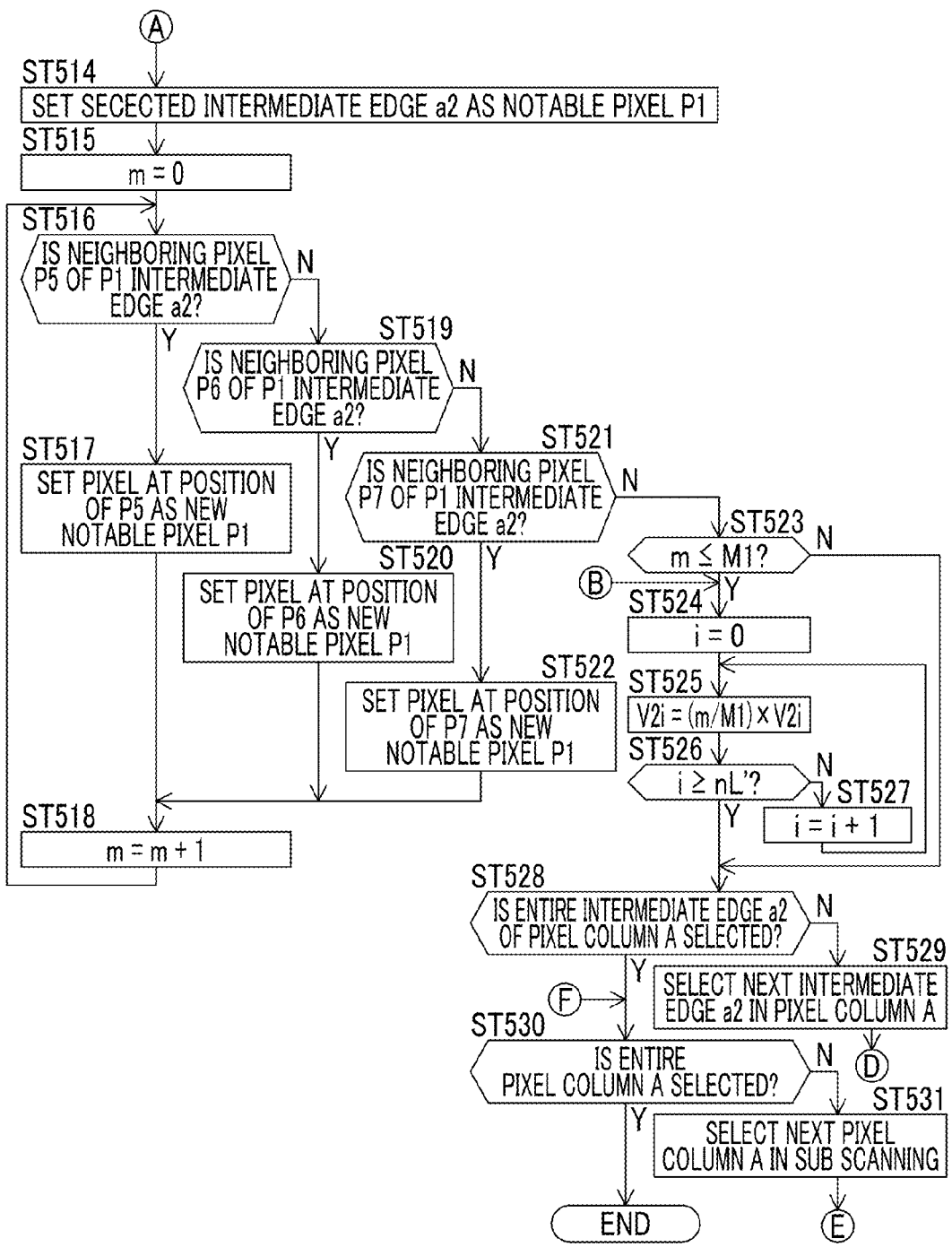
FIG. 19 is a flowchart of the modification process at the end of the main scanning according to Example 1, which is continued from FIG. 18.

FIG. 19 is a flowchart of the modification process at the end of the main scanning according to Example 1, which is continued from FIG. 18.

In ST501 in FIG. 18, the first pixel column A in the sub scanning is selected. The process proceeds to ST502.

In ST502, it is determined whether or not the intermediate edge a2 is present in the pixel column A. In a case where the answer is yes (Y), the process proceeds to ST503 and, in a case where the answer is no (N), the process proceeds to ST530 illustrated in FIG. 19.

In ST503, the first intermediate edge a2 in the pixel column A is selected. The process proceeds to ST504.

In ST504, the selected intermediate edge a2 becomes the determination target pixel and becomes the first notable pixel P1. The process proceeds to ST505.

In ST505, a relationship of m=0 is satisfied. That is, the number m of times of moving in the sub scanning direction is initialized. The process proceeds to ST506.

In ST506, it is determined whether or not the neighboring pixel P2 of P1 is the intermediate edge a2. In a case where the answer is yes (Y), the process proceeds to ST507 and, in a case where the answer is no (N), the process proceeds to ST509.

In ST507, a pixel at a position of P2 becomes a new notable pixel P1. The process proceeds to ST508.

In ST508, a relationship of m=m+1 is satisfied. That is, 1 is added to the number of times of moving in the main scanning direction. The process returns to ST506.

In ST509, it is determined whether or not the neighboring pixel P3 of P1 is the intermediate edge a2. In a case where the answer is yes (Y), the process proceeds to ST510 and, in a case where the answer is no (N), the process proceeds to ST511.

In ST510, a pixel at a position of P3 becomes a new notable pixel P1. The process returns to ST508.

In ST511, it is determined whether or not the neighboring pixel P4 of P1 is the intermediate edge a2. In a case where the answer is yes (Y), the process proceeds to ST512 and, in a case where the answer is no (N), the process proceeds to ST513.

In ST512, a pixel at a position of P4 becomes a new notable pixel P1. The process returns to ST508.

In ST513, it is determined whether or not m≤M1. That is, it is determined whether or not the determination target intermediate edge a2 is close to the end on the downstream side in the main scanning direction. In a case where the answer is yes (Y), the process proceeds to ST524 illustrated in FIG. 19 and, in a case where the answer is no (N), the process proceeds to ST514 illustrated in FIG. 19.

In ST514 in FIG. 19, the first selected intermediate edge a2 becomes again the determination target pixel and becomes the first notable pixel P1. The process proceeds to ST515.

In ST515, a relationship of m=0 is satisfied. That is, the number m of times of moving in the main scanning direction is initialized. The process proceeds to ST516.

In ST516, it is determined whether or not the neighboring pixel P5 of P1 is the intermediate edge a2. In a case where the answer is yes (Y), the process proceeds to ST517 and, in a case where the answer is no (N), the process proceeds to ST519.

In ST517, a pixel at a position of P5 becomes a new notable pixel P1. The process returns to ST518.

In ST518, a relationship of m=m+1 is satisfied. That is, 1 is added to the number of times of moving to the upstream side in the main scanning direction. The process returns to ST516.

In ST519, it is determined whether or not the neighboring pixel P6 of P1 is the intermediate edge a2. In a case where the answer is yes (Y), the process proceeds to ST520 and, in a case where the answer is no (N), the process proceeds to ST521.

In ST520, a pixel at a position of P6 becomes a new notable pixel P1. The process returns to ST518.

In ST521, it is determined whether or not the neighboring pixel P7 of P1 is the intermediate edge a2. In a case where the answer is yes (Y), the process proceeds to ST522 and, in a case where the answer is no (N), the process proceeds to ST523.

In ST522, a pixel at a position of P7 becomes a new notable pixel P1. The process returns to ST518.

In ST523, it is determined whether or not m≤M1. That is, it is determined whether or not the determination target intermediate edge a2 is close to the end on the upstream side in the main scanning direction. In a case where the answer is yes (Y), the process proceeds to ST524 and, in a case where the answer is no (N), the process proceeds to ST528.

In ST524, a relationship of i=0 is satisfied. That is, i is initialized. The process proceeds to ST525.

In ST525, the correction value V2$i$ from the intermediate edge a2 is multiplied by m/M1 such that the correction value V2$i$ is modified. The process proceeds to ST526.

In ST526, it is determined whether or not i≥nL'. That is, it is determined whether or not the pixel values of the entire correction target pixels are acquired. In a case where the answer is yes (Y), the process proceeds to ST528 and, in a case where the answer is no (N), the process proceeds to ST527.

In ST527, a relationship of i=i+1 is satisfied. That is, 1 is added to i. The process returns to ST525.

In ST528, it is determined whether or not the entire intermediate edges a2 in the pixel column A are selected. In a case where the answer is yes (Y), the process proceeds to ST530 and, in a case where the answer is no (N), the process proceeds to ST529.

In ST529, the next intermediate edge a2 in the pixel column A is selected. The process returns to ST504 illustrated in FIG. 18.

In ST530, it is determined whether or not the entire pixel column A in the sub scanning is selected. In a case where the answer is yes (Y), the main scanning end modifying process ends and returns to the invoker. In a case where the answer is no (N), the process proceeds to ST531.

In ST531, the next pixel column A in the sub scanning is selected. The process returns to ST502 illustrated in FIG. 18.

Description of Flowchart of Correction Value Addition Process

Figure 20:
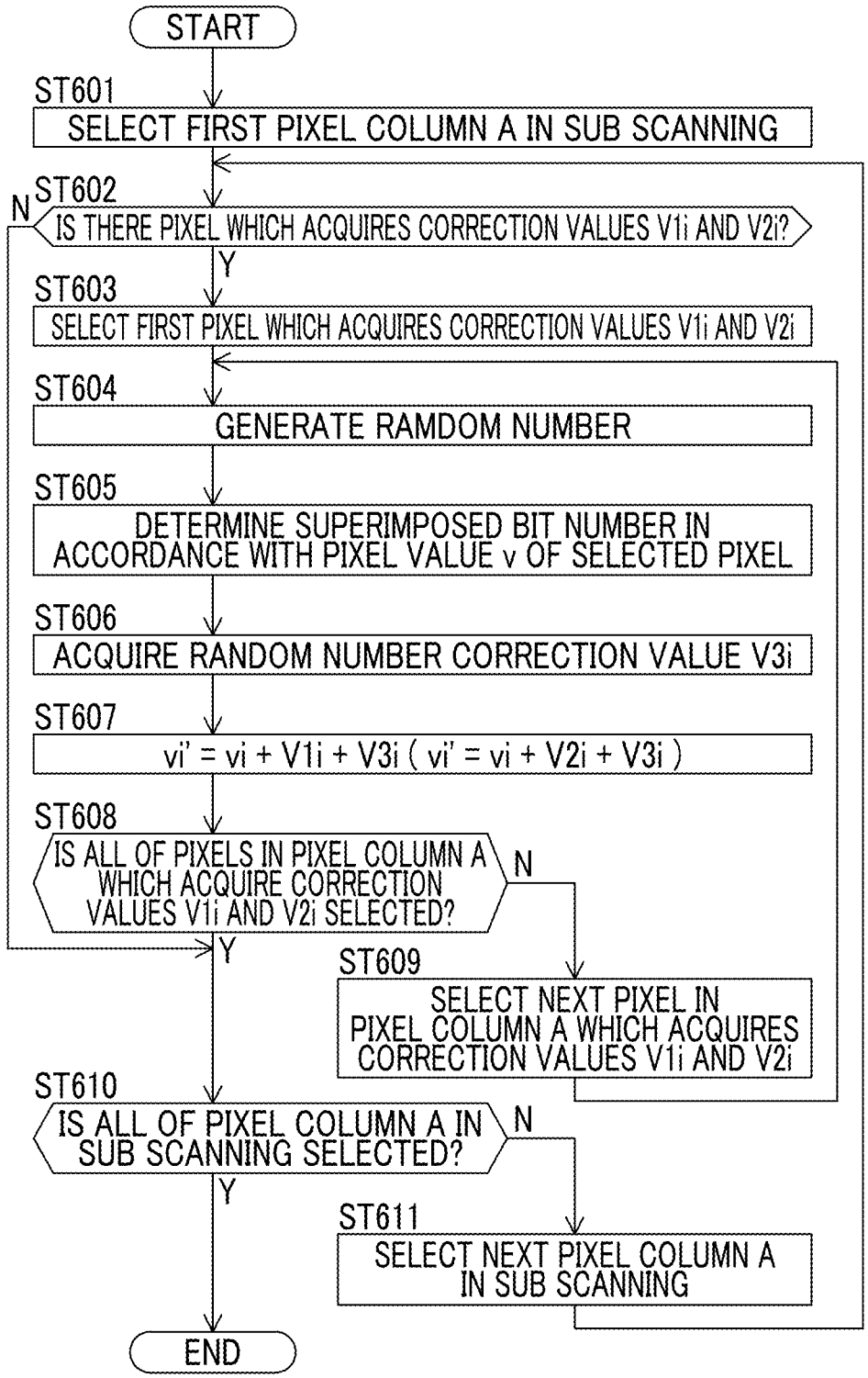
FIG. 20 is a flowchart of an addition process of a correction value according to Example 1, and of a subroutine of ST105 in FIG. 14.

FIG. 20 is a flowchart of an addition process of a correction value according to Example 1, and of a subroutine of ST105 in FIG. 14.

In ST601 in FIG. 20, the first pixel column A in the sub scanning is selected. The process proceeds to ST602.

In ST602, it is determined whether or not there is a pixel which acquires the correction values V1$i$ and V2$i$. That is, it is determined whether or not the defect region is present. In a case where the answer is yes (Y), the process proceeds to ST603 and, in a case where the answer is no (N), the process proceeds to ST610.

In ST603, the first pixel which acquires the correction values V1$i$ and V2$i$ is selected. The process proceeds to ST604.

In ST604, the random number is generated. The process proceeds to ST605.

In ST605, the superimposed bit number in accordance with the pixel value v of the selected pixel is determined. The process proceeds to ST606.

In ST606, the random number correction value V3$i$ is acquired in accordance with the random number and the determined superimposed bit number. The process proceeds to ST607.

In ST607, the pixel value vi is corrected. That is, a relationship of vi'=vi+V1$i$+V3$i$ (vi'=vi+V2$i$+V3$i$) is satisfied. The process proceeds to ST608.

In ST608, it is determined whether or not all of the pixels which acquire the correction values V1$i$ and V2$i$ are selected in the pixel column A. In a case where the answer is yes (Y), the process proceeds to ST610 and, in a case where the answer is no (N), the process proceeds to ST609.

In ST609, the next pixel which acquires the correction values V1$i$ and V2$i$ and to which the correction values V1$i$ and V2$i$ are not added is selected in the pixel column A. The process returns to ST604.

In ST610, it is determined whether or not the entire the pixel column A in the sub scanning is selected. In a case where the answer is yes (Y), the correction value adding process ends and the process returns to the invoker. In a case where the answer is no (N), the process proceeds to ST611.

In ST611, the next pixel column A in the sub scanning is selected. The process returns to ST602.

Description of Flowchart of Reverse Correction Process

FIG. 21 is a flowchart of a reverse correction process according to Example 1, and of a subroutine of ST109 in FIG. 14.

In ST701 in FIG. 21, the corrected image information is acquired. The process proceeds to ST702.

In ST702 to ST705, the same processes as in ST101 to ST104 in FIG. 14 are executed. That is, since the reverse correction process in FIG. 21 is different from the process in FIG. 14 only in that the process is performed on the stored image information which is already corrected, description of ST702 to ST705 is omitted.

In ST706, the correction value subtracting process is performed. The reverse correction process ends and the process returns to the invoker.

Description of Flowchart of Correction Value Subtraction Process

Figure 22:
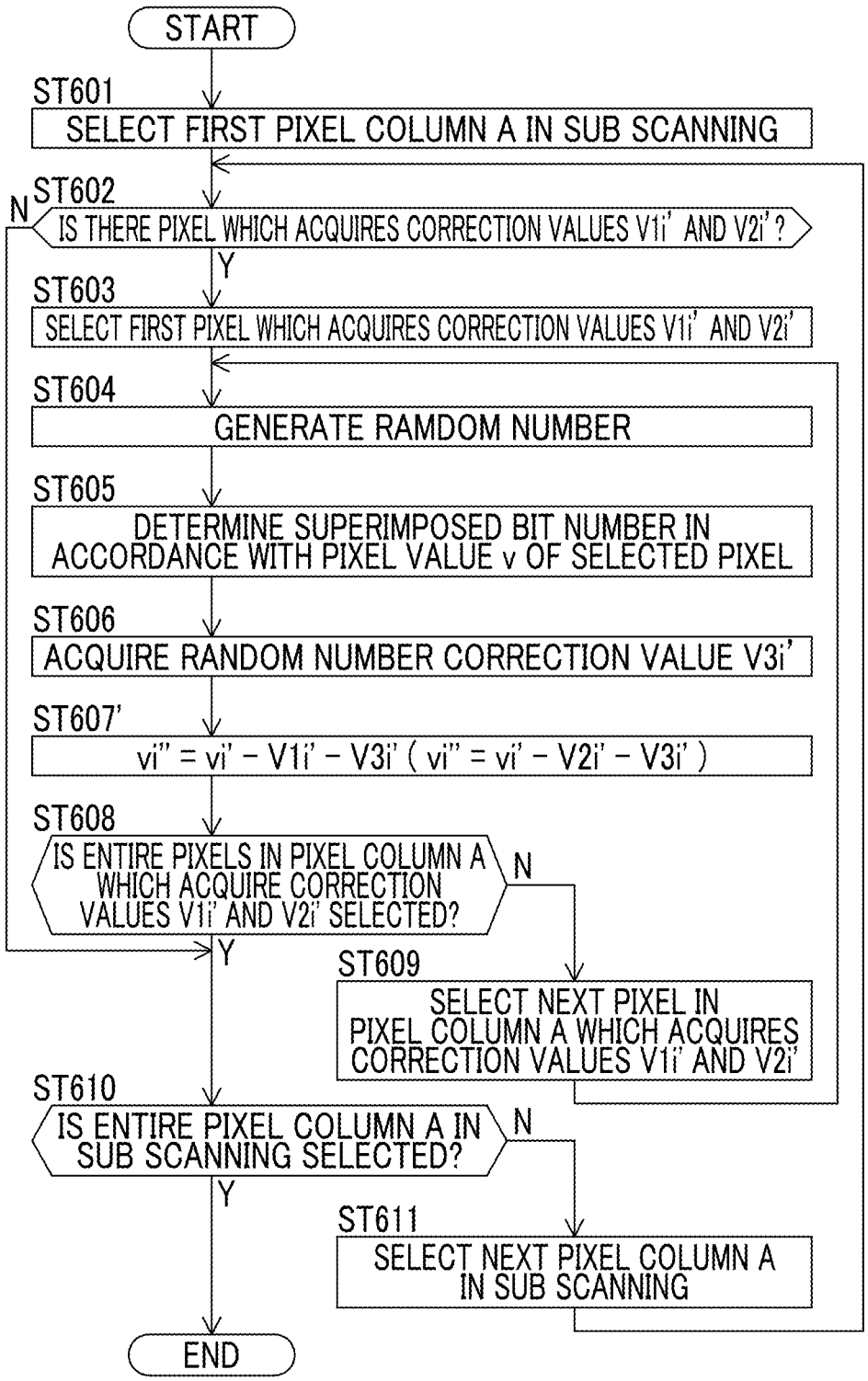
FIG. 22 is a flowchart of a subtraction process of a correction value according to Example 1, and of a subroutine of ST706 in FIG. 21.

FIG. 22 is a flowchart of a subtraction process of a correction value according to Example 1, and of a subroutine of ST706 in FIG. 21.

The correction value subtracting process in FIG. 22 executes the same process as the correction value adding process except that ST607' is executed instead of ST607 in FIG. 20. Accordingly, in FIG. 22, only ST607' is described and other STs are not described.

In ST607', the pixel value vi' is reversely corrected. That is, a relationship of vi"=vi'−V1i'−V3i'(vi"=vi'−V2i'−V3i') is satisfied.

Operation of System According to Example 1

In an image forming system COM+U according to Example 1 that is configured as above, when the print image server COM as an example of an image processing apparatus receives the PDL data, a raster image is generated based on the PDL data, and a color correction process such as the color conversion or the toner total amount regulation is performed. In addition, an adjustment process of the raster image such as a sharpness correction is performed on the raster image of which the color correction process is completed. Here, the print image server COM according to Example 1 executes the defect correction process on the raster image on which the adjustment process is completed.

Figure 23A:
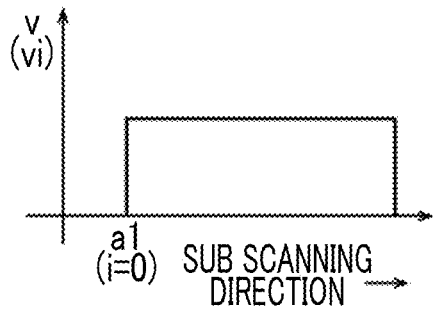
FIGS. 23A to 23H are diagrams illustrating operations according to Example 1 of the invention.
Figure 23E:
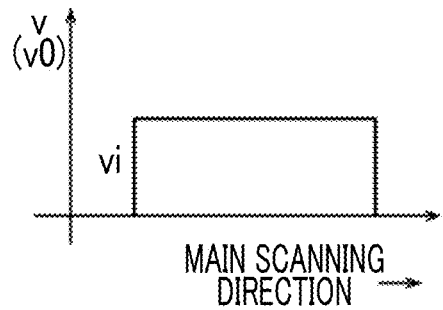
Figure 23B:
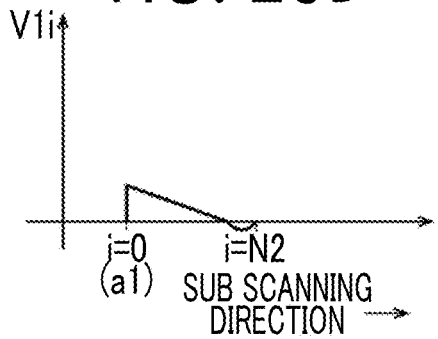
Figure 23F:
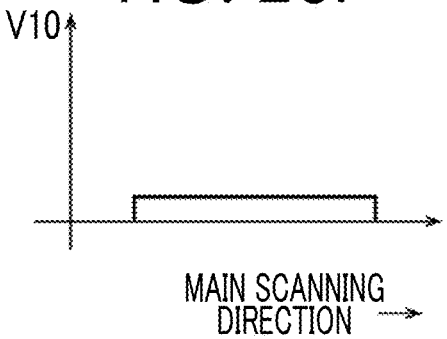
Figure 23C:
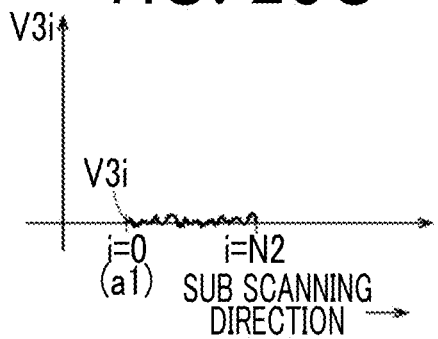
Figure 23G:
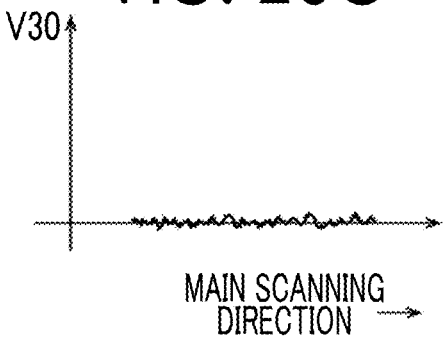
Figure 23D:
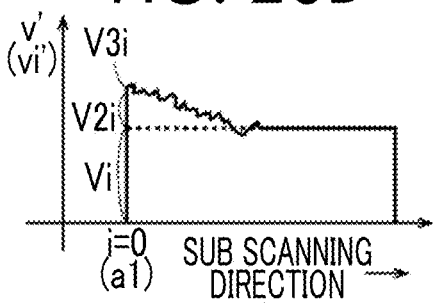
Figure 23H:
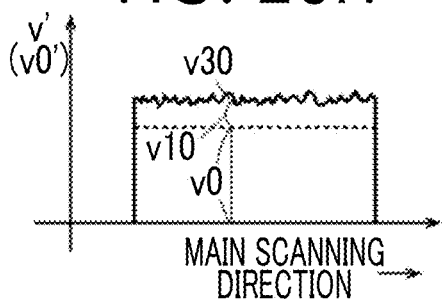

FIGS. 23A to 23H are diagrams illustrating operations according to Example 1 of the invention, FIG. 23A is a diagram illustrating an example of a pixel value before correction of the tail edge in the sub scanning direction, FIG. 23B is a diagram illustrating an example of a correction value of the tail edge in the sub scanning direction, FIG. 23C is a diagram illustrating an example of a random number correction value of the tail edge in the sub scanning direction, FIG. 23D is a diagram illustrating an example of a pixel value after correction of the tail edge in the sub scanning direction, FIG. 23E is a diagram illustrating an example of a pixel value before correction of the tail edge in the main scanning direction, FIG. 23F is a diagram illustrating an example of a correction value of the tail edge in the main scanning direction, FIG. 23G is a diagram illustrating an example of a random number correction value of the tail edge in the main scanning direction, and FIG. 23H is a diagram illustrating an example of a pixel value after correction of the tail edge in the main scanning direction.

In FIGS. 23A to 23H, in the print image server COM according to Example 1, in a case where the downstream side from the tail edge a1 in the sub scanning direction is determined as the defect region D1, the addition of the correction values V1i and V3i is performed. Here, the correction value V1i is a correction value which is positive on a side which is close to the tail edge a1 as illustrated in FIG. 23B and a negative correction value is added at a portion which is farther away than a preset distance from the tail edge a1. Accordingly, the corrected pixel value v is changed such that the density is higher at a portion close to the tail edge a1 and is changed such that the density is low at a portion which is spaced apart. In addition, a different random number correction value V3i is added based on the pixel value v of the pixel to be corrected. Thus, the pixel value v is corrected as illustrated in FIGS. 23D and 23H.

Figure 24A:
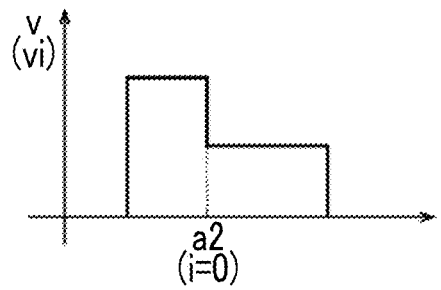
FIGS. 24A to 24H are diagrams illustrating operations according to Example 1 of the invention.
Figure 24B:
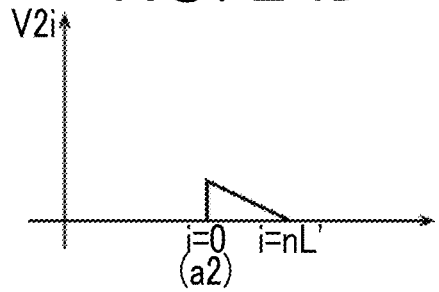
Figure 24C:
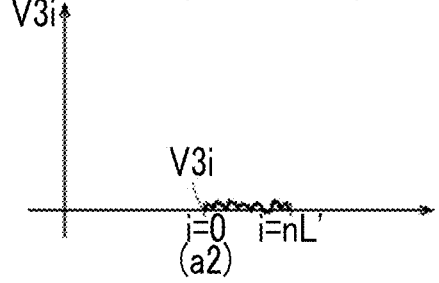
Figure 24D:
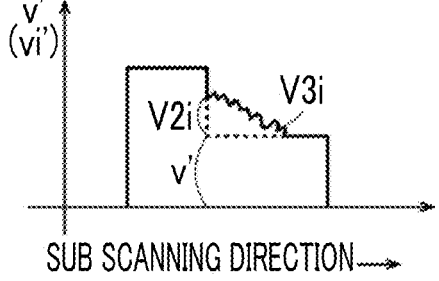
Figure 24E:
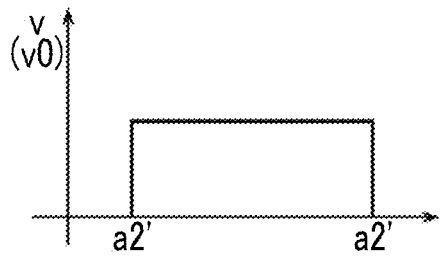
Figure 24F:
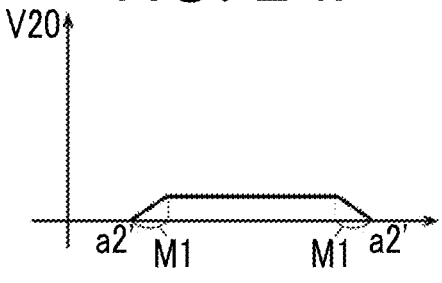
Figure 24G:
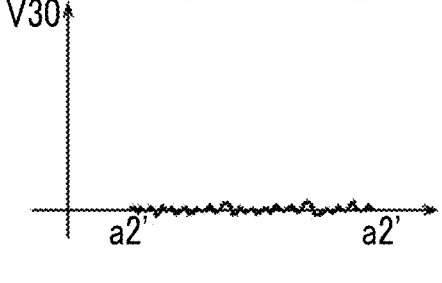
Figure 24H:
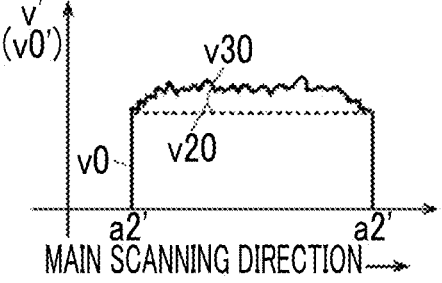

FIGS. 24A to 24H are diagrams illustrating operations according to Example 1 of the invention, FIG. 24A is a diagram illustrating an example of a pixel value before correction of the intermediate edge in the sub scanning direction, FIG. 24B is a diagram illustrating an example of a correction value of the intermediate edge in the sub scanning direction, FIG. 24C is a diagram illustrating an example of a random number correction value of the intermediate edge in the sub scanning direction, FIG. 24D is a diagram illustrating an example of a pixel value after correction of the intermediate edge in the sub scanning direction, FIG. 24E is a diagram illustrating an example of a pixel value before correction of the intermediate edge in the main scanning direction, FIG. 24F is a diagram illustrating an example of a correction value of the intermediate edge in the main scanning direction, FIG. 24G is a diagram illustrating an example of a random number correction value of the intermediate edge in the main scanning direction, and FIG. 24H is a diagram illustrating an example of a pixel value after correction of the intermediate edge in the main scanning direction.

In addition, in FIGS. 24A to 24H, in the print image server COM according to Example 1, in a case where the downstream side from the intermediate edge a2 in the sub scanning direction is determined as the defect region D2, the addition of the correction values V2i and V3i is performed. Here, the correction value V2i is added such that the closer the correction position is to the intermediate edge a2, the greater, and the farther away the correction position is from the intermediate edge a2, the less, as illustrated in FIG. 24B. At this time, in a case where the position of the intermediate edge a2 is close to the end of the defect region D2 in the main scanning direction, the correction value decreased compared to a case of being spaced apart. That is, as illustrated in FIG. 24F, in a case where the number of pixels which is spaced from the end is m and m≤M1, the correction value V2i is changed to V2i×(m/M1). In addition, a different random number correction value V3i is added based on the pixel value v of the pixel to be corrected. Thus, the pixel value v is corrected as illustrated in FIGS. 24D and 24H.

When the addition process of the correction values V1i, V2i, and V3i is completed, the image information in which the defect has been corrected, that is, image data based on the pixel value corrected by the correction values V1i to V3i is stored. When the input to start printing is issued from the input members COM2 and COM3, the corrected image data is read and density adjustment is performed. The image data on which the density adjustment is performed is transmitted to the printer U of the system COM+U. Screen information as an example of image information for printing is generated based on the corrected image data in the printer U. A visible image is formed on the marking section U1a based on the screen information and the image is printed on the recording sheet S. In a case where calibration is executed or a user adjustment curve is changed, the density adjustment is performed based on the corrected image data which is stored. That is, according to Example 1, in a case where the density adjustment is changed, the adjustment process of the raster image, the correction process of the defect, or the like does not have to be repeated.

Figure 25A:
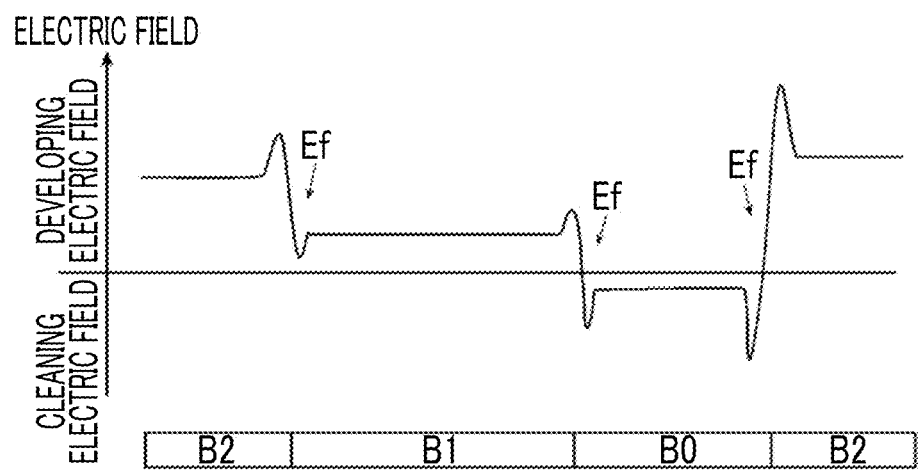
FIGS. 25A and 25B are diagrams illustrating an example of developing failure occurred on a boundary.
Figure 25B:
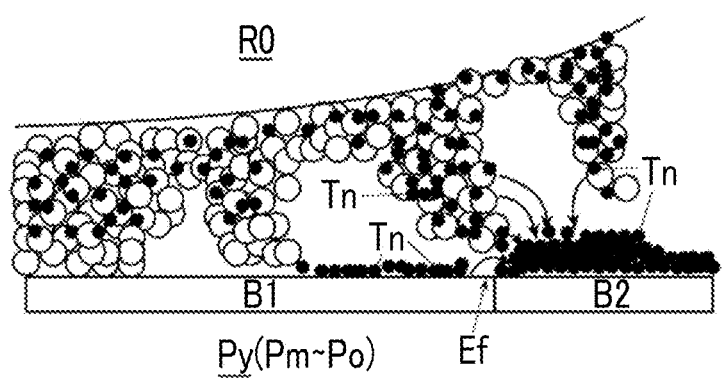

FIGS. 25A and 25B are diagrams illustrating an example of developing failure occurred on a boundary, FIG. 25A is a diagram illustrating a fringe electric field, and FIG. 25B is a diagram illustrating a movement of toner.

In FIGS. 25A and 25B, in a case where an image which has the different densities is formed, a surface potential is formed on the photosensitive drums Py to Po depending on the density of the image such as a non-image section B0, a halftone section B1, and a high-density section B2. At this time, a so-called fringe electric field Ef is produced on the boundary portion where different potentials are produced and it is known that an electric field is produced such that the potential difference is emphasized on both sides of the boundary portion. That is, as illustrated in FIG. 25B, at a portion of the photosensitive drums Py to Po where the fringe electric field is produced, the potential is even higher at a high-potential portion and the potential is even lower at a low-potential portion. Accordingly, when toner Tn moves depending on the fringe electric field Ef, the density is likely to be even higher at a high-density portion and the density is likely to be even lower at a low-density portion.

FIGS. 26A to 26C are diagrams illustrating an example of developing failure occurred on the boundary, FIG. 26A is a diagram illustrating a developing region of a case where a tail edge is formed, FIG. 26B is a diagram illustrating a state in which a developing roll and a photosensitive drum rotate from the state in FIG. 26A, and FIG. 26C is a diagram illustrating a state in which the developing roll and photosensitive drum rotate from the state in FIG. 26B.

In addition, in the developing region Q in FIG. 26A, when a surface potential corresponding to the image sections B1 and B2 is formed on the photosensitive drums Py to Po, an electric field E1 with an attracting force from the developing roll R0 to the photosensitive drums Py to Po acts on the toner of the developing region Q. In addition, in a case where the surface potential on the photosensitive drums Py to Po corresponds to the non-image section B0, an electric field E2 which has a reverse polarity with respect to the electric field E1 acts on the toner of the developing region Q. Here, for example, it is considered that a surface speed uR of the developing roll is more rapid than a surface speed uP of the photosensitive drum. At this time, when the developer retained on the developing roll R0 passes through the non-image section B0 of the photosensitive drums Py to Po, as illustrated in FIG. 26B, polarization is produced according to the electric field E2 having the reverse polarity in the developer on the developing roll R0 on the photosensitive drums Py to Po side and the developer is likely to have a polarity reverse to the toner Tn. Accordingly, when the developer on the developing roll R0 passes through the non-image section B0 on the photosensitive drums Py to Po and enters the image sections B1 and B2, the polarized developer attracts and takes away the toner from the developed image sections B1 and B2 on the photosensitive drum in some cases.

Figure 27A:
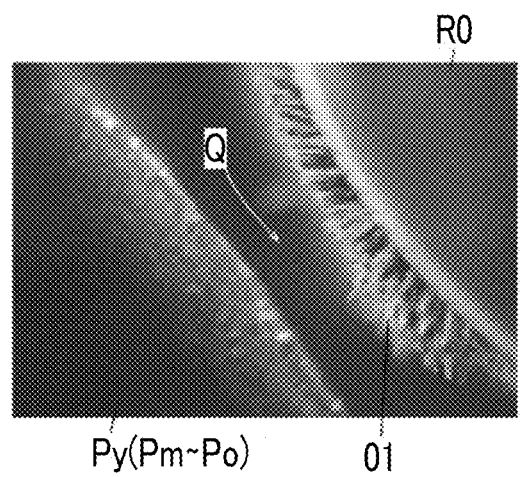
FIGS. 27A and 27B are views illustrating an example of developing failure occurred on the boundary.
Figure 27B:
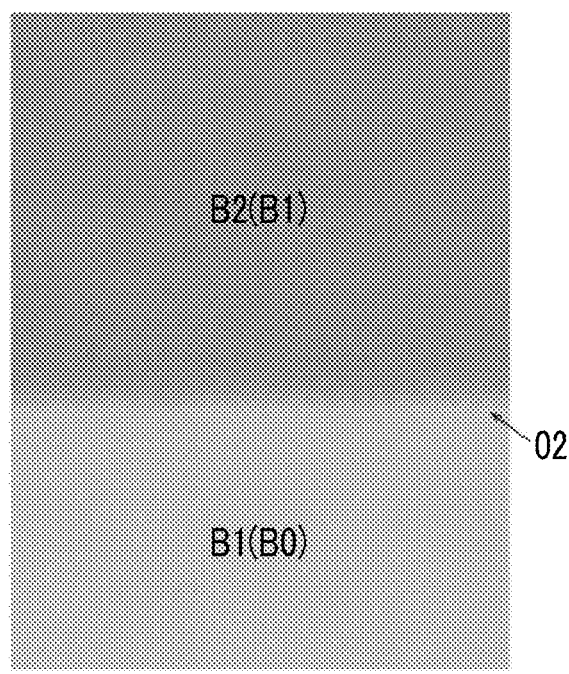

FIGS. 27A and 27B are views illustrating an example of developing failure occurred on the boundary, FIG. 27A is a view illustrating the developing region when viewed from a cross section direction, and FIG. 27B is a view illustrating a tail edge of an image section.

In addition, in FIGS. 27A and 27B, in a case where the developer is retained on the developing roll R0, the developer is retained in a crop-ear-like shape in the developing region Q, that is, a magnetic brush 01 is formed. Thus, in a case where the developer on the developing roll R0 passes through the developing region Q, the magnetic brush 01 comes into contact with the photosensitive drums Py to Po, sweeps the toner on the photosensitive drums Py to Po and, then scatters the toner in some cases. Accordingly, at the rear end of the image sections B1 and B2, that is, on the downstream side from the tail edge a1 in the sub scanning direction, roughness 02 occurs according to the shape of the magnetic brush 01 and the density becomes lower in some cases.

Thus, in the developing region Q, as illustrated in FIGS. 26A to 27B, a phenomenon in which the density becomes lower in the vicinity of the tail edge a1 of the image sections B1 and B2, that is, TED: Tail Edge Deletion occurs in some cases.

FIGS. 28A to 28C are diagrams illustrating an example of developing failure occurred on the boundary, FIG. 28A is a diagram illustrating a developing region of a case where a tail edge is formed, FIG. 28B is a diagram illustrating a state in which the developing roll and the photosensitive drum rotate from the state in FIG. 28A, and FIG. 28C is a diagram illustrating a state in which the developing roll and the photosensitive drum rotate from a state in FIG. 28B.

Further, the developing failure illustrated in FIGS. 25A to 27B occurs in combination of many factors. For example, in FIG. 28A, the fringe electric field Ef acts on the boundary between the non-image section B0 and the image sections B1 and B2 such that the density difference is likely to be emphasized. Thus, the image is likely to have a high density at the boundary portion on the image sections B1 and B2 sides. At this time, the developer on the developing roll R0 enters the image sections B1 and B2 from the non-image section B0 of the photosensitive drums Py to Po, the developer is polarized when passing through the non-image section B0. When the polarized developer enters the image sections B1 and B2, the developer takes away the toner of the developed image sections B1 and B2 on the side of the tail edge a1 in some cases. Thus, in the portions of the image sections B1 and B2 of which the density is high due to the fringe electric field Ef, the density is low on the side of the tail edge a1 and a portion that is spaced away from the tail edge a1 has a high density because the toner is not taken away in some cases.

Figure 29A:
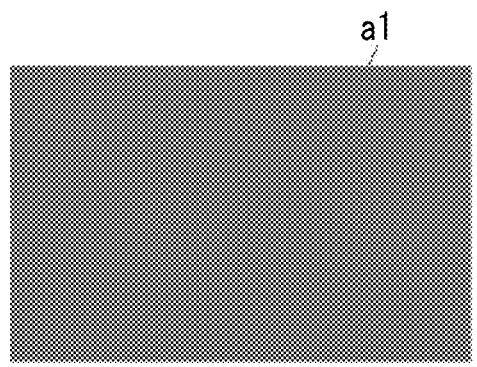
FIGS. 29A to 29D are views illustrating comparison between the operation according to Example 1 of the invention and an operation in the related art.
Figure 29B:
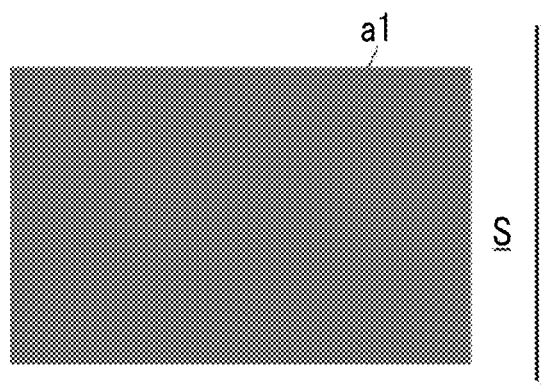
Figure 29C:
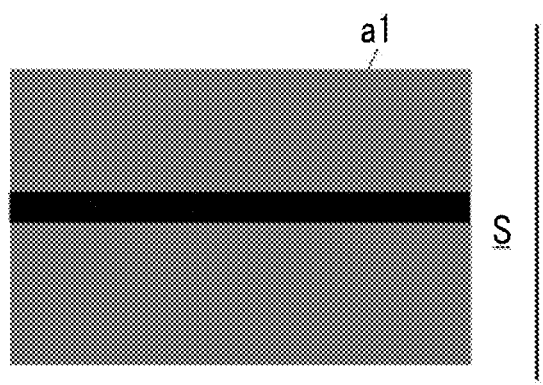
Figure 29D:
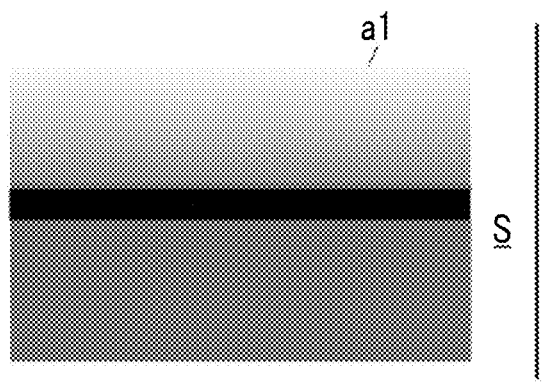

FIGS. 29A to 29D are views illustrating comparison between the operation according to Example 1 of the invention and an operation in the related art, FIG. 29A is a view illustrating image data before correction of a defect is performed, FIG. 29B is a view illustrating image data of a case where a tail edge correction according to Example 1 is performed on the image data in FIG. 29A and then image recording is performed, FIG. 29C is a view illustrating image data of a case where the correction of the related art is performed on the image data in FIG. 29A and then image recording is performed, and FIG. 29D is a view illustrating image data of a case where image recording is performed without correction of the image data in FIG. 29A.

Thus, in a case where the image is recorded without the defect correction of the image data before the correction illustrated in FIG. 29A, as illustrated in FIG. 29D, on the recording sheet S, the density is low in the vicinity of the tail edge a1 and the density becomes higher on the downstream side in a sheet transport direction. Accordingly, the shading is likely to be different from that of the expectation from the image data before correction. Here, in the configuration of the related art, a correction amount that brings about a high density in the sub scanning direction with the tail edge a1 as a reference is added. Thus, the image failure of the portion of the tail edge a1 on which the density is low is decreased. However, the image failure on the high-density portion is not corrected.

Figure 30A:
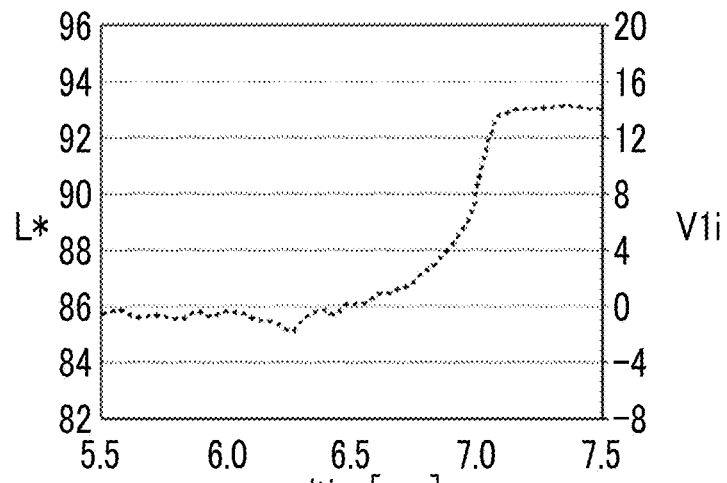
FIGS. 30A to 30C are graphs illustrating the operation according to Example 1 of the invention.
Figure 30B:
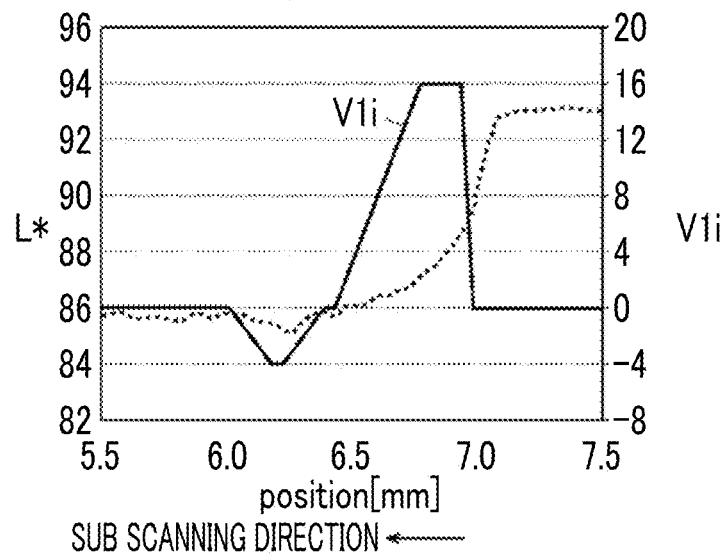
Figure 30C:
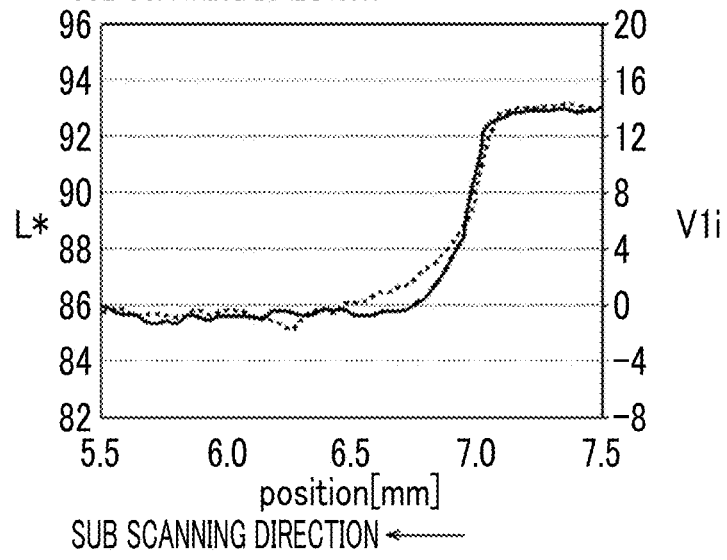

FIGS. 30A to 30C are graphs illustrating the operation according to Example 1 of the invention, FIG. 30A is a graph of a case where brightness of a medium is measured in a case where an image is recorded without correction, FIG. 30B is a graph illustrating a correction value on the image of FIG. 30A, and FIG. 30C is a graph illustrating a brightness measurement value of the image on a medium in a case where the image is corrected and recorded.

In contrast to the correction in the related art, according to Example 1, as illustrated in FIGS. 23A to 23H, the correction value with which the density becomes higher and the correction value with which the density becomes lower are added and correction is performed. Accordingly, the corrected image data has the pixel value v illustrated in FIGS. 23D and 23H. That is, according to Example 1, it is anticipated that the developing failure occurs in the marking section U1a of the printer U, and the image data is corrected. Accordingly, as illustrated in FIG. 29B, when the printing is performed based on the corrected image data, on the recording sheet S, a discernable image from the image data before defect correction is likely to be obtained. That is, a print image that is close to the original image information transmitted from the PC by a user is likely to be obtained. Accordingly, when printing is performed without correction and brightness on the sheet S is measured, the brightness illustrated in a dashed line in FIG. 30A is measured. However, when the printing is performed after correction according to Example 1, the brightness represented in a solid line which is obtained by correcting both sides of a high-density portion and a low-density portion is achieved. In FIGS. 30A to 30C, the left axis represents brightness which is represented by L-star. In addition, the right axis represents a correction value. The horizontal axis represents a position in the sub scanning direction.

FIGS. 31A to 31D are diagrams illustrating an example of developing failure occurred on the boundary, FIG. 31A is a diagram illustrating a developing region of a case where an intermediate edge is formed, FIG. 31B is a diagram illustrating a state in which the developing roll and the photosensitive drum rotate from the state in FIG. 31A, FIG. 31C is a diagram illustrating a state in which the developing roll and the photosensitive drum rotate from a state in FIG. 31B, and FIG. 31D is a perspective diagram illustrating the developing region when viewed from the upstream side in the sub scanning direction.

In addition, in FIG. 31A, in a case where the surface potential that corresponds to the halftone section B1 on the photosensitive drums Py to Po and the high-density section B2 of which the density is higher than the halftone section B1 is formed, the electric field E1 which attracts the toner from the developing roll R0 to the photosensitive drums Py to Po acts on the toner of the developing region Q. As illustrated in FIG. 31B, when the toner of the developing region Q develops the electrostatic latent image of the photosensitive drums Py to Po, the carrier in the developer has a reverse charge from the toner, that is, counter-charge occurs. Accordingly, in FIG. 31C, the developer which develops the high-density section B2 enters the halftone section B1, the developer of which counter charge occurs attracts and takes away the toner from the developed halftone section B1 in some cases.

Thus, in the developing region Q, as illustrated in FIGS. 31A to 31D, a phenomenon in which the density of the halftone section B1 becomes lower in the vicinity of the boundary between the high-density section B2 and the halftone section B1, that is, STV: starvation occurs in some cases.

Here, the counter charge is likely to occur depending on an amount of developing of the latent image on the photosensitive drum by the developer. Accordingly, in FIG. 31D, in a case where the high-density section B2 on the photosensitive drum is developed, the amount of developing is likely to be small on the end side compared to the center of high-density section B2 in the main scanning direction of the developing roll. Thus, the countercharge is unlikely to occur at the end of the high-density section B2. That is, the counter charge becomes greater on the center side in the high-density section B2 in the main scanning direction and STV is likely to be brought about. However, at a portion which is close to the end in the high-density section B2 in the main scanning direction, STV is unlikely to be brought about and the image failure is unlikely to occur.

Figure 32A:
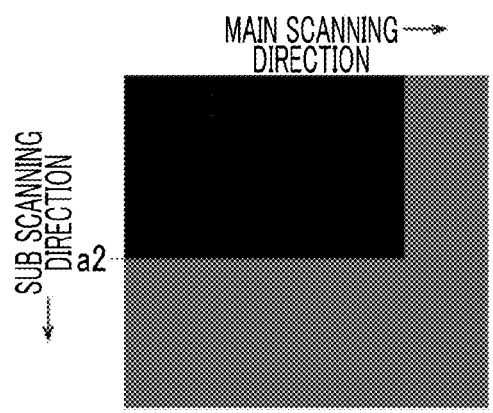
FIGS. 32A to 32F are views illustrating comparison between the operation according to Example 1 of the invention and an operation in the related art.
Figure 32D:
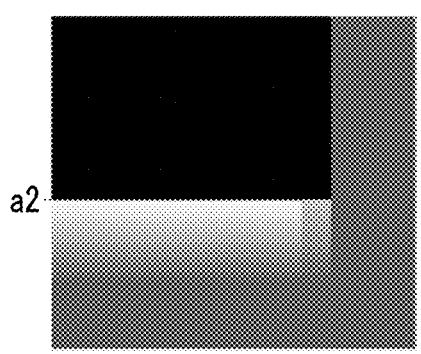
Figure 32B:
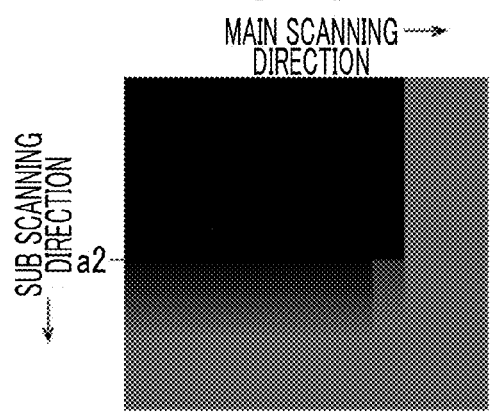
Figure 32E:
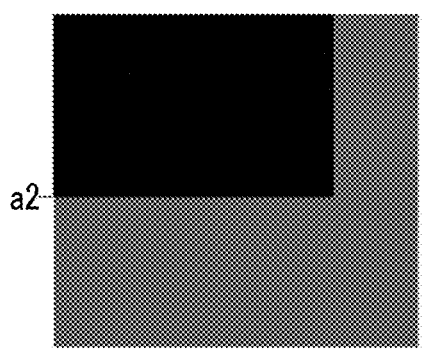
Figure 32C:
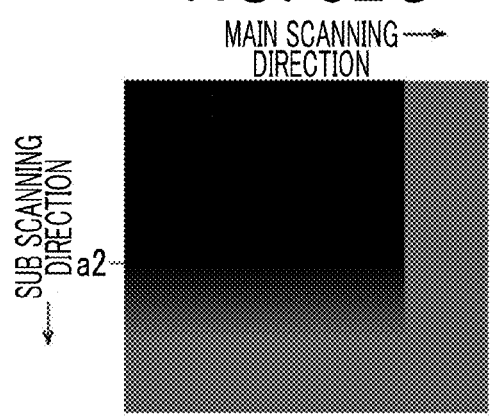
Figure 32F:
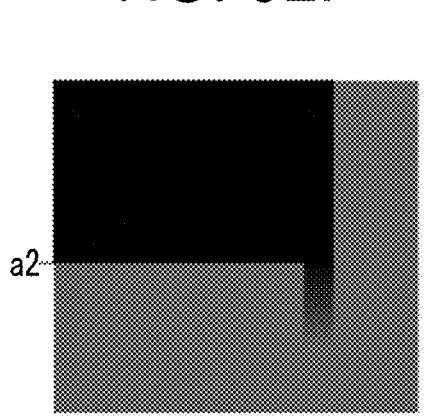

FIGS. 32A to 32F are views illustrating comparison between the operation according to Example 1 of the invention and an operation in the related art, FIG. 32A is a view illustrating image data before correction of a defect is performed, FIG. 32B is a view illustrating image data of a case where an intermediate edge correction according to Example 1 is performed on the uncorrected image data, FIG. 32C is a view illustrating image data of a case where correction of the related art is performed on the uncorrected image data and then image recording is performed, FIG. 32D is a view illustrating a case where image recording is performed based on the image data in FIG. 32A, FIG. 32E is a view illustrating a case where image recording is performed based on the image data in FIG. 32B, and FIG. 32F is a view illustrating a case where the image data in FIG. 32C is recorded.

Thus, in a case where the printing is performed based on the original image data illustrated in FIG. 32A without the defect correction, on the recording sheet S, as illustrated in FIG. 32D, the density is likely to be low on the downstream side from the intermediate edge a2 in the sheet transport direction. Here, in the configuration of the related art, a correction amount that brings about a high density in the sub scanning direction with the intermediate edge a2 as a reference is added. Accordingly, the image failure of the portion on which the density is low is decreased. However, in the configuration of the related art, when the pixel value v is not changed, the correction value in the main scanning direction is not changed. Accordingly, even when a position is changed in the main scanning direction, the correction process is performed uniformly in the sub scanning direction as long as the pixel value v is not changed. Accordingly, at the end in the main scanning direction where the STV is unlikely to occur, the same correction amount is used to perform the correction as for the portion which is spaced apart from the end and over-correction is likely to be performed. That is, in the configuration of the related art, as illustrated in FIG. 32F, the density at the end in the main scanning direction is likely to be high.

On the other hand, according to Example 1, as illustrated in FIGS. 24A to 24H, in a case where the position of the defect region D2 to be corrected is close to the end in the main scanning direction, the correction is performed with less correction value compared to a case of being spaced apart from the end. That is, in the corrected image data, the pixel value v illustrated in FIGS. 24D and 24H is obtained. Accordingly, even with respect to the defect region D2 of the intermediate edge a2, it is anticipated that developing failure occurs in the marking section U1a of the printer U and the image data is corrected. Accordingly, as illustrated in FIG. 32F, a recording image corresponding to the original image information which a user intends to obtain is likely to be obtained.

Specifically, in the defect correction process according to Example 1, when the correction values V1$i$ and V2$i$ are added, the random number correction value V3$i$ is added.

Here, in the developing devices Gy to Go, there is a concern that an amount and density of the developer in an axial direction are different depending on variations of consumed amount of the developer, time shift of the supply of the developer, a condition of stirring of the developer, or the like. Accordingly, even when the image is recorded based on the same pixel value v, density unevenness occurs in the axial direction due to the density itself of the developer in some cases. In the image on the recording sheet S, there is a concern that density unevenness occurs in the main scanning direction. At this time, when the defect correction process is performed, the pixel value is corrected in a direction in which the density unevenness is emphasized in some cases. Accordingly, there is a concern that the correction is conspicuous on the recording sheet S. On the other hand, according to Example 1, the random number correction value V3$i$ is added. Accordingly, a uniform correction is unlikely to be performed in the main scanning direction. Thus, even when density unevenness is produced in the main scanning direction, it is difficult to see. Specifically, according to Example 1, a different random number correction value V3$i$ is added for each color of the Y to O. The correction is not performed on the entire image data of colors Y to O, using a pixel at the same position, and using the same random number correction value. Accordingly, a concern in which the correction on the defect region D1 and D2 is emphasized due to accumulation of the same random number correction value of each color Y to O is reduced.

In addition, according to Example 1, when there is an input to perform the preview, a reverse correction process is performed based on the image data in which the defect correction is performed. That is, the edges a1 and a2, the tail edge correction value V1$i$', the halftone process correction value V2$i$', and the random number correction value V3$i$' or the like are acquired through the same process as in the case of the forward correction based on the pixel value v' in which the defect correction is performed, that is, the pixel value v' after the forward correction by the unit C124. The acquired correction values V1$i$', V2$i$', and V3$i$' are subtracted from the pixel value v' after the forward correction. Accordingly, the correction values V1$i$', V2$i$', and V3$i$' decrease the influence of the correction values V1$i$, V2$i$, and V3$i$ which are added during the forward correction. The preview display is performed based on the image data of the pixel value v" from which the influence of the correction values V1$i$, V2$i$, and V3$i$ during the forward correction is lowered.

Here, in a configuration in which the preview is displayed based on the corrected image data, without performing the reverse correction, an image is displayed on the display COM4 based on the corrected image data. For example, in a case where a user tries to record the image data in FIG. 32A, the image data becomes the image data as illustrated in FIG. 32B when the defect correction process is performed. Thus, on the display COM4, the image not corresponding to FIG. 32A, but corresponding to FIG. 32B is displayed as a preview. However, the defect correction process is not an image correction that the user intends to obtain in advance, but a process depending on the configuration of the printer U. Accordingly, when the image on which the defect correction is performed is displayed as the preview, there is a concern that the user falsely recognizes that image failure occurs. Accordingly, there is a concern that unnecessary operation may be caused, for example, the user corrects the image information on the personal computer so as to remove the image failure, further, the user transmits the corrected image information into the print image server COM, or the like. There is a concern that user operability deteriorates.

In addition, in a case where the preview display is performed, it is considered that the preview display is performed, based on the image data before defect correction, that is, the image data obtained after the adjustment of the raster image is finished. However, the raster image used for the correction process in the print image server COM has a large number of pixels, in general. Accordingly, the data amount of the image data is likely to be large and the storage unit for the process is likely to be great. Thus, when trying to hold the image data after adjustment, in addition to the storage unit for a defect correction process, further, another storage unit for holding is needed, such that the apparatus becomes complicated, is likely to be increased in size, and is likely to be increased in cost.

On the other hand, according to Example 1, the corrected image data is reversely corrected and displayed as a preview. Accordingly, the preview display is performed based on the image data on which the influence of the correction values V1$i$, V2$i$, and V3$i$ is decreased. Accordingly, the details of the correction depending on the configuration of the printer U, or the like is unlikely to be displayed as a preview and the image is likely to become an image which the user intends to obtain in advance. Accordingly, according to Example 1, a preview display is performed by the configuration in which the apparatus is unlikely to become complicated, to be increased in size and the user's workability is unlikely being deteriorated.

The forward-corrected pixel value v' is different from the pixel value v before the defect correction. Thus, in the reverse correction process, the position or the pixel value v' of the acquired edges a1 and a2 and the correction values V1$i$', V2$i$', and V3$i$' do not have to be matched with the position or the pixel value v of the edges a1 and a2 during forward correction and the correction values V1$i$, V2$i$, and V3$i$. However, the correction values V1$i$, V2$i$, and V3$i$ which are obtained from a corresponding relation of defect correction are small in general. Thus, the size of the pixel value after the forward correction is unlikely to be changed on the boundary of the image. Accordingly, the edges a1 and a2 are likely to be detected on the pixel at the same position, even on the image data before the defect correction, and even on the corrected image data. In addition, at this time, the correction values V1$i$' and V2$i$' which are acquired from the pixel value v' obtained after forward correction is likely to have values of 90% to 110% with respect to the correction values V1 and V2 for forward correction. Thus, even in a configuration of being subtracted from the pixel value v' after forward correction based on the correction values V1$i$' and V2$i$' for reverse correction, the pixel value v" is likely to be close to the pixel value v before the defect correction.

That is, for example, in the forward correction of a certain tail edge a1, the function g is set in advance such that in a case where the pixel value is 30, the correction value is 10 and in a case where the pixel value is 40, the correction value is 11. At this time, when the pixel value v of the tail edge a1 before defect correction is 30, the correction value of the forward correction becomes 10 by the unit C112. Accordingly, the pixel value v' after defect correction becomes 40 when the random number correction value is not taken into account. At this time, during the reverse correction of the tail edge a1 at the same position, a correction value is acquired with respect to the corrected pixel value 40. Accordingly, the correction value 11 is acquired based on the function g. Thus, in the reverse correction process, the correction value 11 is subtracted from the pixel value 40, and pixel value 29 after the reverse correction is acquired. Accordingly, the pixel value 29 after reverse correction becomes close to the pixel value 30 before the forward correction compared to the corrected pixel value 40.

Thus, according to Example 1, compared to a case where the preview display of image data obtained after defect correction process is performed, the preview display of the image before the defect correction is easily performed by a simple configuration. The difference between the pixel value v and v'' is allowed as fluctuation of the image during the preview display.

In Function Evaluation of Developing Failure

A function evaluation is performed to check whether or not the image failure of the defect regions D1 and D2 is conspicuous. In the function evaluation, a potential Vh of the non-image section on the photosensitive drum is set to −800 [V], a potential Vb on the developing sleeve is set to −650 [V], and a potential V1 of the image section on the photosensitive drum is set to −400 [V]. In addition, a charging amount of toner is 40 [μc/g]. The ratio of toner in the developer is 9.0 [%]. In addition, the grain size of the carrier is 35 [μm] and the specific gravity thereof is 4.8. Further, carrier magnetization is 58 [emu/g]. In addition, the grain size of the toner is 5.8 [μm] and the specific gravity thereof is 1.1. The surface speed of the photosensitive drum is set to 350 [mm/sec]. The peripheral speed ratio of the developing sleeve to the photosensitive drum is 1.75 and the developing sleeve rotates to a direction opposite to the rotation direction of the photosensitive drum. Further, in the developing region Q, an inclined angle of the developing magnetic pole of the magnet roll to the upstream side in the rotating direction of the developing sleeve from a position where the surface of the photosensitive drum comes closest to the surface of the developing sleeve, that is, MSA, is set to +5°. In addition, the diameter of the magnet roll is 20 [mm]. In addition, a groove extending in the axial direction is formed on the surface of the developing sleeve, the interval of the grooves in the circumferential direction is 400 [μm], and the depth of the groove is 100 [μm]. The image is recorded on the recording sheet S based on image data in which two edges a1 and a2 are present and an evaluation of an image on the recording sheet S is performed.

Figure 33A:
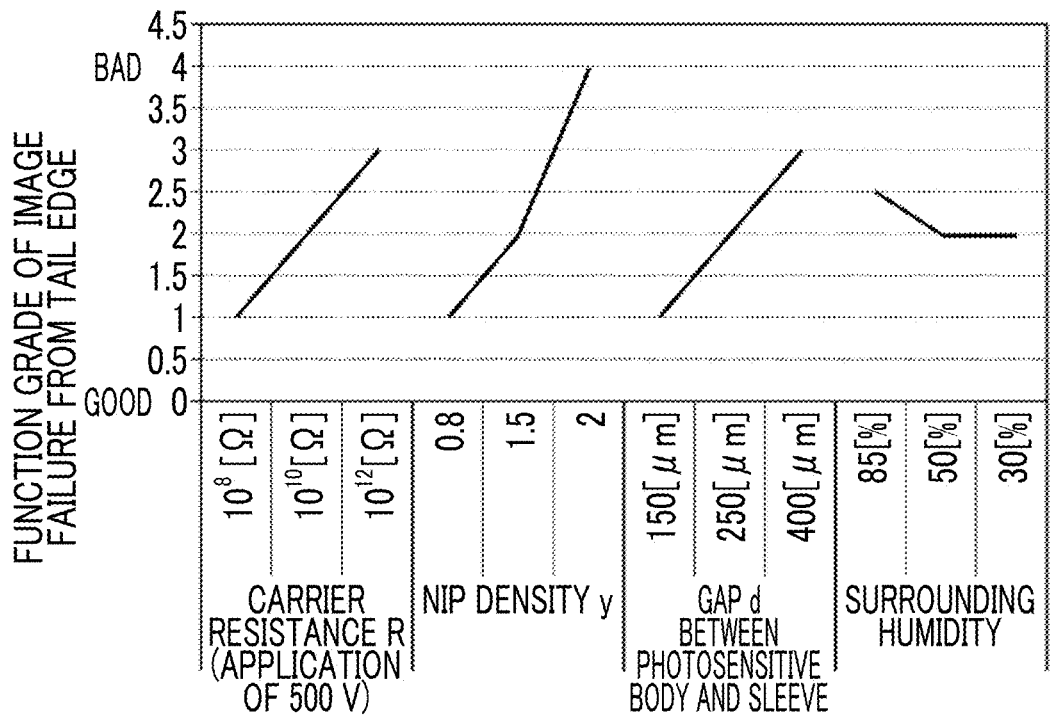
FIGS. 33A and 33B are graphs illustrating a function evaluation of image failure due to developing failure occurred on the boundary.
Figure 33B:
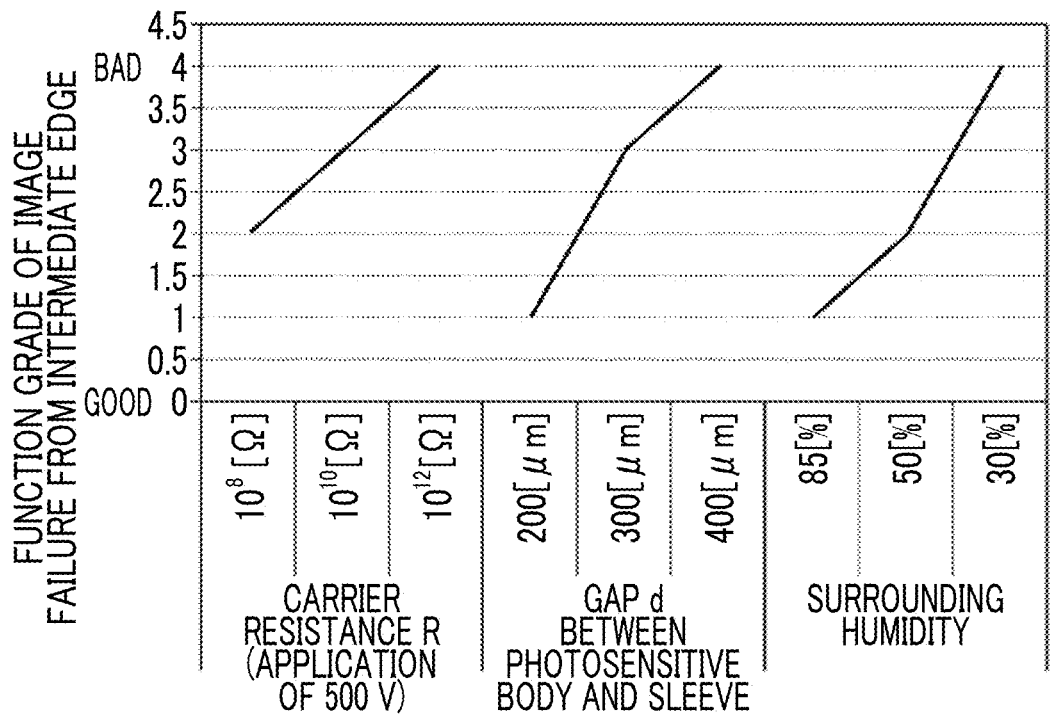

FIGS. 33A and 33B are graphs illustrating a function evaluation of image failure due to developing failure occurred on the boundary, FIG. 33A is a graph illustrating a function evaluation of the tail edge in a defect region, and FIG. 33B is a graph illustrating a function evaluation of the intermediate edge in the defect region.

FIG. 33A illustrates the result of the function evaluation of the tail edge a1 in the defect region D1. In FIG. 33A, the greater the carrier resistance R, the more the defect is conspicuous and the more the image deteriorates. In addition, the wider the gap d between the surface of the developing sleeve and the surface of the photosensitive drum, the more the defect is conspicuous and the more the image deteriorates. Further, the higher the nip density y, the more the defect is conspicuous and the more the image deteriorates. In a case where the amount of the developer which is transported for unit area of the surface of the developing sleeve is x [g/m$^2$], the nip density y is a value obtained from y=x/d. In addition, the influence of surrounding relative humidity is small compared to the carrier resistance R, the nip density y, and the gap d.

Accordingly, in a case where the carrier resistance R is high, the polarized state of the developer is unlikely to be depolarized and the density at the end of the image becomes lower, that is, it is determined that white spots are likely to be formed. In addition, in a case where the nip density y is higher, a sweeping force of the magnetic brush becomes strong and it is determined that white spots are likely to be formed. Further, in a case where the carrier resistance R is great or in a case where the gap d is wider, the fringe electric field becomes strong and it is determined that white spots are likely to be formed and the emphasis is brought about.

Thus, when the image failure due to developing failure is intended to be reduced without performing the tail edge correction process, it is considered that the carrier resistance R is lowered, the gap d is decreased, or the nip density y is lowered. However, when the carrier resistance is less than $10^5[\Omega]$, charge is likely to put to the carrier during developing. Accordingly, the carrier is likely to move to the photosensitive drum during developing and another image failure occurs. In addition, when the gap d is 150 [μm] or less, the developer is likely to clog between the photosensitive drum and developing sleeve. Further, when the nip density is 0.8 or less, the toner amount supplied to the photosensitive drums Py to Po becomes smaller, then the density is lowered, or the density is likely to become unstable.

Accordingly, particularly, the tail edge correction process according to Example 1 is preferably applicable in a case where the carrier resistance R is $10^6[\Omega]$ or more. In addition, particularly, the tail edge correction process according to Example 1 is preferably applicable in a case where the nip density y is 0.8 or more. Further, particularly, the tail edge correction process according to Example 1 is preferably applicable in a case where the gap d is 150 [μm] or more.

In addition, in FIG. 33B, in the result of the function evaluation of the intermediate edge a2, the greater the carrier resistance R, the more the STV is likely to occur and the more the image deteriorates. In addition, the wider the gap d, the more the STV is likely to occur and the more the image deteriorates. Further, the lower the surrounding relative humidity, the more the STV is likely to occur and the more the image deteriorates.

Accordingly, in a case where the carrier resistance R is high, or the surrounding humidity is high, the remaining countercharge is unlikely to be removed and it is determined that STV are likely to occur. In addition, in a case where the gap d between the photosensitive drum and the developing sleeve 2 is great, the fringe electric field becomes strong and it is determined that density of the edge is conspicuous.

Thus, when the image failure due to developing failure is intended to be reduced without performing the intermediate edge correction process, it is considered that the carrier resistance is lowered, the gap d is decreased, or the nip density y is lowered. However, when the carrier resistance R is less than $10^5[\Omega]$, other image defects occur. In addition, when the gap d is 150 [μm] or less, the developer is likely to clog.

Accordingly, particularly, the intermediate edge correction process according to Example 1 is preferably applicable in a case where the carrier resistance R is $10^6[\Omega]$ or more. Further, particularly, the intermediate edge correction process according to Example 1 is preferably applicable in a case where the gap d is 150 [μm] or more.

Modification Example

As above, Example of the invention is described; however, the invention is not limited to the Example, it is possible to perform various modifications within a scope of spirit of the invention described in the aspects. Modification examples (H01) to (H011) are described in the following examples.

(H01) In the examples, the printer U as an example of an image forming apparatus is described; however, the invention is not limited thereto, and it is possible to apply the invention to a photocopier, a facsimile, a multifunction printer which has these plural functions, or the like. In addition, the invention is not limited to a multi-color developing image forming apparatus, but a single color, that is, monochrome image forming apparatus may be configured.

(H02) In the examples, in the print image server COM, the configuration in which defect correction process is performed is described; however, the invention is not limited thereto. It is possible to employ a configuration in which the printer U performs the process.

(H03) In the examples, the configuration is described, in which the image information is transmitted from the personal computer PC; however, the invention is not limited thereto. It is possible to apply the configuration according to the invention to image information which is configured of plural pixels read by an image reading unit, that is, a scanner.

(H04) In the examples, the configuration is described, in which the random number correction values V3$i$ and V3$i$' are generated for each pixel to be corrected; however, the invention is not limited thereto. For example, it is possible to employ a configuration in which the random number is modified for each pixel in the main scanning direction and a random number correction value is generated.

(H05) In the examples, the configuration is desirable, in which the random number correction values V3$i$ and V3$i$' are added and are subtracted; however, it is possible to employ a configuration in which the random number correction values V3$i$ and V3$i$' are not added and are not subtracted. That is, it is possible to employ a configuration in which the configuration related to the random number is omitted.

(H06) In the examples, the configuration is described, in which with respect to the correction value V2$i$ of the intermediate edge a2, the correction value is acquired based on the pixel values vL and vH or the like; however, the invention is not limited thereto. For example, a corresponding relationship between the pixel value v and the exposure energy, a corresponding relationship between a difference of the exposure energies and the number of target pixels, and a corresponding relationship between a difference of the exposure energies and the correction value are measured and stored in advance. As disclosed in the related art, it is possible to employ a configuration in which the exposure energies are obtained from the low-density pixel value vL and the high-density pixel value vH respectively, and the number of target pixels and the correction value are acquired from the corresponding relationships based on the difference of the exposure energies.

(H07) In the examples, the configuration is described, in which the boundary in the sub scanning direction is detected such that the density of the pixel is corrected; however, for example, as disclosed in the related art, it is possible to employ a configuration in which, when the boundary in the main scanning direction is detected such that the density of the pixel is corrected, the reverse correction is performed such that preview display is performed.

(H08) In the examples, the configuration is described, in which the pixels arranged in the main scanning direction of P1 include a pixel that is adjacent in the main scanning direction and even a pixel which is shifted in the sub scanning direction; and the configuration is described, in which three pixels in the sub scanning direction are included; however, the invention is not limited thereto. It is possible to employ a configuration in which, depending on the occurrence of the developing failure, even when one or two, or four or more shifted pixels in the sub scanning direction are the intermediate edge a2, the pixels may be detected as pixels arranged in the main scanning direction of P1.

(H09) In the examples, it is desirable that the reverse correction process shares the corresponding information used in the first correction, that is, the forward correction; however, the invention is not limited thereto. For example, It is possible to employ a configuration in which the corresponding information only for the reverse correction is prepared in advance and during the reverse correction, the correction values V1$i$' and V2$i$' are obtained based on the corresponding information only for the reverse correction from the pixel value v' after the forward correction.

(H010) In the examples, the threshold values Z0 to Z2, the numbers N1 to N3 and M1 of pixels may be set to any value such that the regions D1 and D2 is detectable according to the regions D1 and D2 in which developing failure occurs depending on the printer U.

(H011) In the examples, the configuration is described, in which the function g is changed to be positive and negative on both sides of ia, respectively; however, the invention is not limited thereto. For example, it is possible to employ a configuration in which, at the preset number of pixels from ia, the correction value is 0 and, when the number is even greater, the correction value becomes negative. Similarly, the configuration is described, in which the correction value changes from reduction to increase on both sides of ib; however, the invention is not limited thereto. It is possible to employ a configuration in which the correction value is the same constant correction value as ib at the preset number of pixels from ib and when the number is even greater, the correction value changes to be increased.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    at least one processor;
    an acquisition unit, implemented by the at least one processor, configured to acquire first image information which is image information configured of a plurality of pixels and which includes density information for each pixel;
    a first correction unit, implemented by the at least one processor, configured to correct pixel density based on the first image information such that no image failure occurs due to developing failure in an area of a boundary between a high-density section and a low-density section;
    a first storage configured to store image information obtained after the first correction unit performs the correction as second image information;
    a second correction unit, implemented by the at least one processor, configured to perform a reverse correction so as to cancel the correction by the first correction unit based on density of a pixel of the second image information in a state in which the first image information is removed;
a display configured to display an image on a display section based on third image information which is image information obtained after the second correction unit performs the reverse correction; and
a transmission unit, implemented by the at least one processor, configured to transmit the second image information to an image forming apparatus.

2. The image processing apparatus according to claim 1, further comprising:
a first boundary detecting unit, implemented by the at least one processor, configured to detect a pixel on a boundary in a scanning direction on which density is changed between a high-density pixel and a low-density pixel of which density is lower than the high-density pixel in a preset scanning direction based on the first image information,
wherein, the first correction unit is further configured to, in a case where developing failure occurs in a preset number of pixels in the scanning direction with a boundary pixel in the scanning direction as a reference, correct the density of the pixel on which the developing failure occurs and add a density correction amount for each pixel to be corrected, and
wherein the second correction unit is further configured to subtract a correction amount corresponding to the correction amount, which is added by the first correction unit, based on the pixel density of the second image information, and perform the reverse correction.

3. The image processing apparatus according to claim 2, further comprising:
a second storage configured to store corresponding information pre-associated with a correction amount by which density of a preset number of pixels in the scanning direction with a boundary pixel as a reference is corrected based on the density of the boundary pixel;
a second boundary detecting unit, implemented by the at least one processor, configured to detect a pixel on a boundary in a scanning direction on which density is changed between a high-density pixel and a low-density pixel of which density is lower than the high-density pixel in a preset scanning direction based on the second image information;
a first correction amount acquiring unit, implemented by the at least one processor, configured to acquire a correction amount with which the first image information is corrected based on the first image information and the corresponding information; and
a second correction amount acquiring unit, implemented by the at least one processor, configured to acquire a correction amount with which the second image information is corrected based on the second image information and the corresponding information,
wherein the first correction unit is further configured to add the correction amount acquired by the first correction amount acquisition unit based on the boundary pixel of the first image information, and
wherein the second correction unit is further configured to subtract the correction amount acquired by the second correction amount acquisition unit based on the boundary pixel of the second image information.

4. An image forming system comprising:
the image processing apparatus according to claim 1; and
an image forming apparatus that includes an image holder, a charging member configured to charge a surface of the image holder, a latent image forming device configured to form a latent image on the charged surface of the image holder, a developing device configured to develop the latent image on the surface of the image holder into a visible image with a developer, a transferring device configured to transfer the visible image on the surface of the image holder onto a medium, and a fixing device configured to fix the visible image transferred onto the medium on the medium, and form an image based on the image information transmitted from the image processing apparatus.

5. An image forming apparatus comprising:
an image holder;
a charging member configured to charge a surface of the image holder;
a latent image forming device configured to form a latent image on the charged surface of the image holder;
a developing device configured to develop the latent image on the surface of the image holder into a visible image with a developer;
a transferring device configured to transfer the visible image on the surface of the image holder onto a medium;
a fixing device configured to fix the visible image transferred onto the medium on the medium;
at least one processor;
an acquisition unit, implemented by the at least one processor, configured to acquire first image information which is image information configured of a plurality of pixels and which includes density information for each pixel;
a first correction unit, implemented by the at least one processor, configured to correct pixel density based on the first image information such that no image failure due to developing failure occurs due to developing failure in an area of a boundary between a high-density section and a low-density section;
a storage configured to store image information obtained after the first correction unit performs the correction as second image information;
a second correction unit, implemented by the at least one processor, configured to perform a reverse correction so as to cancel the correction by the first correction unit based on density of a pixel of the second image information in a state in which the first image information is removed;
a display configured to display an image on a display section based on third image information which is image information obtained after the second correction unit performs the reverse correction;
a generation unit, implemented by the at least one processor, configured to generate print information based on the second image information; and
a controller, implemented by the at least one processor, configured to control the latent image forming device based on the print information.

6. An image processing apparatus comprising:
at least one processor;
an acquisition unit, implemented by the at least one processor, configured to acquire first image information which is image information configured of a plurality of pixels and which includes density information for each pixel;
a first correction unit, implemented by the at least one processor, configured to correct pixel density based on the first image information such that no image failure occurs due to developing failure;
a first boundary detecting unit, implemented by the at least one processor, configured to detect a pixel on a boundary in a scanning direction on which density is changed between a high-density pixel and a low-density pixel of which density is lower than the high-density pixel in a preset scanning direction based on the first image information,
a first storage configured to store image information obtained after the first correction unit performs the correction as second image information;
a second correction unit, implemented by the at least one processor, configured to perform a reverse correction so as to cancel the correction by the first correction unit based on density of a pixel of the second image information in a state in which the first image information is removed;
a display configured to display an image on a display section based on third image information which is image information obtained after the second correction unit performs the reverse correction; and
a transmission unit, implemented by the at least one processor, configured to transmit the second image information to an image forming apparatus,
wherein, the first correction unit is further configured to, in a case where developing failure occurs in a preset number of pixels in the scanning direction with a boundary pixel in the scanning direction as a reference, correct the density of the pixel on which the developing failure occurs and add a density correction amount for each pixel to be corrected, and
wherein the second correction unit is further configured to subtract a correction amount corresponding to the correction amount, which is added by the first correction unit, based on the pixel density of the second image information, and perform the reverse correction.

* * * * *